(12) United States Patent
John et al.

(10) Patent No.: US 12,514,929 B2
(45) Date of Patent: *Jan. 6, 2026

(54) DEFORMABLE NANO-SCALE VEHICLES (DNVS) FOR TRANS-BLOOD BRAIN BARRIER, TRANS-MUCOSAL, AND TRANSDERMAL DRUG DELIVERY

(71) Applicant: The Regents of the University of California, Oakland, CA (US)

(72) Inventors: Varghese John, Los Angeles, CA (US); Ichiro Nishimura, Venice, CA (US); Naren Subbiah, Danville, CA (US); Jesus Campagna, Playa Del Rey, CA (US); Patricia R. Spilman, Mill Valley, CA (US); Mohammad Parvez Alam, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/498,301

(22) PCT Filed: Apr. 2, 2018

(86) PCT No.: PCT/US2018/025749
§ 371 (c)(1),
(2) Date: Sep. 26, 2019

(87) PCT Pub. No.: WO2018/187240
PCT Pub. Date: Oct. 11, 2018

(65) Prior Publication Data
US 2020/0030457 A1    Jan. 30, 2020

Related U.S. Application Data

(60) Provisional application No. 62/480,924, filed on Apr. 3, 2017.

(51) Int. Cl.
*A61K 47/69* (2017.01)
*A61K 9/1272* (2025.01)
(Continued)

(52) U.S. Cl.
CPC .......... *A61K 47/6911* (2017.08); *A61K 47/22* (2013.01); *A61K 47/24* (2013.01);
(Continued)

(58) Field of Classification Search
CPC .. A61K 47/6911; A61K 47/548; A61K 47/62; A61K 47/22; A61K 47/24;
(Continued)

(56) References Cited

U.S. PATENT DOCUMENTS 4,704,355 A    11/1987   Bernstein
5,686,082 A *  11/1997   N'Guyen ................. A61K 8/67
                                                    514/846
(Continued)

FOREIGN PATENT DOCUMENTS

BR    201104941   *  7/2013
CN    1613504 A      5/2005
(Continued)

OTHER PUBLICATIONS

Scognamiglio, I et al in International Journal of Pharmaceutics, vol. 440, Issue 2, Jan. 20, 2013, pp. 179-187.*
(Continued)

*Primary Examiner* — Isaac Shomer
(74) *Attorney, Agent, or Firm* — Foley Hoag LLP; David P. Halstead; David Surry

(57) ABSTRACT

In various embodiments deformable nano-scale vehicles (DNV) are provided that are useful for the delivery of
(Continued)

Atomic Force Microscopy (AFM) - Phase Analysis therapeutic agents. In certain embodiments the DNVs are capable of transdermal delivery and can additionally cross the blood-brain barrier.

15 Claims, 36 Drawing Sheets

(51) Int. Cl.
| | |
|---|---|
| *A61K 9/19* | (2006.01) |
| *A61K 47/22* | (2006.01) |
| *A61K 47/24* | (2006.01) |
| *A61K 47/26* | (2006.01) |
| *A61K 47/28* | (2006.01) |
| *A61K 47/54* | (2017.01) |
| *A61K 47/62* | (2017.01) |
| *B82Y 5/00* | (2011.01) |
| *A61K 9/00* | (2006.01) |

(52) U.S. Cl.
CPC .............. *A61K 47/26* (2013.01); *A61K 47/28* (2013.01); *A61K 47/548* (2017.08); *A61K 47/62* (2017.08); *A61K 9/0014* (2013.01); *A61K 9/006* (2013.01); *A61K 9/1272* (2013.01); *A61K 9/19* (2013.01); *B82Y 5/00* (2013.01)

(58) Field of Classification Search
CPC ...... A61K 47/26; A61K 47/28; A61K 9/0014; A61K 9/006; A61K 9/1272; A61K 9/19; B82Y 5/00
See application file for complete search history.

(56) References Cited

U.S. PATENT DOCUMENTS

| | | | |
|---|---|---|---|
| 5,858,398 A | 1/1999 | Cho et al. | |
| 7,829,113 B2 | 11/2010 | Okada et al. | |
| 7,927,622 B1 | 4/2011 | Cevc et al. | |
| 2002/0048596 A1* | 4/2002 | Cevc ................... | A61K 9/1271 424/450 |
| 2004/0219202 A1 | 11/2004 | Fletcher et al. | |
| 2006/0276393 A1* | 12/2006 | Milburn ............... | A61K 31/065 514/183 |
| 2008/0311184 A1* | 12/2008 | Cevc ................... | A61K 9/1272 424/450 |
| 2009/0004275 A1 | 1/2009 | Martyn et al. | |
| 2009/0017108 A1 | 1/2009 | Yuzhakov | |
| 2009/0082400 A1* | 3/2009 | Lee ........................ | A61P 29/00 514/456 |
| 2009/0155256 A1* | 6/2009 | Black ..................... | C07K 16/18 424/139.1 |
| 2011/0020434 A1* | 1/2011 | O'Halloran .......... | A61K 38/193 424/649 |
| 2011/0178456 A1 | 7/2011 | Aguilar-Mendoza et al. | |
| 2012/0014936 A1 | 1/2012 | Natoli et al. | |
| 2012/0141416 A1* | 6/2012 | Demeule ................. | A61P 43/00 514/6.9 |
| 2012/0195947 A1 | 8/2012 | Perumal et al. | |
| 2013/0115273 A1 | 5/2013 | Yang et al. | |
| 2013/0259922 A1* | 10/2013 | Haas ..................... | A61K 9/1272 424/450 |
| 2014/0017302 A1 | 1/2014 | Cevc | |
| 2014/0086979 A1 | 3/2014 | De Rosa et al. | |
| 2014/0147390 A1 | 5/2014 | Exner et al. | |
| 2014/0370081 A1* | 12/2014 | Platscher ............. | A61K 9/1272 435/458 |
| 2014/0378460 A1* | 12/2014 | Catalano ............ | A61K 31/5377 506/10 |
| 2015/0110855 A1 | 4/2015 | Cipolla et al. | |
| 2015/0209282 A1* | 7/2015 | Chu ........................ | A61P 35/00 514/21.9 |
| 2015/0216899 A1 | 8/2015 | Pusic et al. | |
| 2015/0320706 A1* | 11/2015 | Imbimbo ............... | A61K 45/06 424/178.1 |
| 2016/0243192 A1 | 8/2016 | Seeger et al. | |
| 2018/0028600 A1 | 2/2018 | Hong et al. | |
| 2018/0067121 A1 | 3/2018 | Naasani | |
| 2018/0170969 A1 | 6/2018 | Bond et al. | |
| 2018/0185285 A1 | 7/2018 | Gupta et al. | |
| 2018/0305412 A1 | 10/2018 | Bond et al. | |
| 2018/0318216 A1 | 11/2018 | John et al. | |
| 2018/0339065 A1* | 11/2018 | Wilson .................... | A61P 31/12 |
| 2018/0369410 A1 | 12/2018 | Hong et al. | |
| 2019/0015331 A1 | 1/2019 | Elliman et al. | |
| 2019/0049438 A1 | 2/2019 | Liu et al. | |
| 2019/0093105 A1 | 3/2019 | Gibbings et al. | |
| 2019/0112351 A1 | 4/2019 | Ishii et al. | |
| 2019/0135873 A1 | 5/2019 | Bond et al. | |
| 2019/0151456 A1 | 5/2019 | McConnell et al. | |
| 2019/0160097 A1 | 5/2019 | Pusic et al. | |
| 2019/0231694 A1 | 8/2019 | Lim | |
| 2019/0343767 A1 | 11/2019 | Haraszti et al. | |
| 2019/0365653 A1 | 12/2019 | Hong et al. | |
| 2020/0046647 A1 | 2/2020 | Yuk | |
| 2023/0285291 A1 | 9/2023 | Campagna et al. | |

FOREIGN PATENT DOCUMENTS

| | | | | |
|---|---|---|---|---|
| CN | 1951368 | A | 4/2007 | |
| CN | 103446055 | A | 12/2013 | |
| CN | 105287382 | A | 2/2016 | |
| CN | 106389137 | A | 2/2017 | |
| EP | 0450991 | A2 | 10/1991 | |
| EP | 2431023 | A1 | 3/2012 | |
| JP | 2005213261 | A | 8/2005 | |
| JP | 2014198720 | A | 10/2014 | |
| WO | WO 91/04014 | A1 | 4/1991 | |
| WO | WO-2009087568 | A2 * | 7/2009 | ........... A61K 31/352 |
| WO | WO-2010083778 | A1 | 7/2010 | |
| WO | WO-2010095940 | A2 | 8/2010 | |
| WO | WO 2010/104865 | A2 | 9/2010 | |
| WO | WO 2010/149785 | A1 | 12/2010 | |
| WO | WO-2013/059617 | A1 | 4/2013 | |
| WO | WO-2014/015027 | A1 | 1/2014 | |
| WO | WO 2017/087685 | A1 | 5/2017 | |
| WO | WO 2018/187240 | A1 | 10/2018 | |
| WO | WO 2019/094679 | A1 | 5/2019 | |
| WO | WO-2019203706 | A1 | 10/2019 | |
| WO | WO-2021/207273 | A1 | 10/2021 | |

OTHER PUBLICATIONS

Zhi-Lan Chen et al. "Transferrin-modified liposome promotes a-mangostin to penetrate the blood-brain barrier." Nanomedicine: Nanotechnology, Biology, and Medicine, vol. 12, 2016, pp. 421-430. (Year: 2016).*
Ava J. Y. Guo et al. "Galangin, a flavonol derived from Rhizoma Alpiniae Officinarum, inhibits acetylcholinesterase activity in vitro." Chemico-Biological Interactions, vol. 187, 2010, pp. 246-248. (Year: 2010).*
Yaw-Bin Huang et al. "Elastic liposomes as carriers for oral delivery and the brain distribution of (+)-catechin." Journal of Drug Targeting, vol. 19(8), 2011, pp. 709-718. (Year: 2011).*
Oluwatosin A. Ogunsola et al. "Structural analysis of "flexible" liposome formulations: new insights into the skin-penetrating ability of soft nanostructures." Soft Matter, vol. 8, 2012, pp. 10226-10232. (Year: 2012).*
PCT International Search Report and Written Opinion dated Feb. 16, 2017 issued in PCT/US2016/062552.
PCT International Preliminary Report on Patentability and Written Opinion dated May 22, 2018 issued in PCT/US2016/062552.
PCT International Search Report and Written Opinion dated Aug. 29, 2018 issued in PCT/US2018/025749.
PCT International Preliminary Report on Patentability and Written Opinion dated Oct. 8, 2019 issued in PCT/US2018/025749.
PCT International Search Report and Written Opinion dated Feb. 28, 2019 issued in PCT/US2018/059960.

(56) References Cited

OTHER PUBLICATIONS

EP Extended Search Report dated May 28, 2019 issued in EP 16867146.9.
US Office Action dated Mar. 29, 2019 issued in U.S. Appl. No. 15/774,575.
US Final Office Action dated Oct. 22, 2019 issued in U.S. Appl. No. 15/774,575.
Burnes, (2012) "Quantifying biomass changes of single cells during antigen specific CD8+ T cell mediated cytotoxicity [electronic resource] / by Daina Laura Burnes.", *UCLA Library Catalog* 1 page; Retrieved on Nov. 8, 2017 from UCLA Library Catalog Holdings Information.
El Maghraby et al., (1999) "Skin delivery of oestradiol from deformable and traditiona liposomes: mechanistic studies." *Journal of Pharmacy and Pharmacology*, 51: 1123-1134.
Fleisher et al., (1995) "Topical Delivery of Growth Hormone Releasing Peptide Using Liposomal Systems: An in Vitro Study Using Hairless Mouse Skin." *Life Sci.* 57(13):1293-7.
Ghai et al., (2012) "A Review of Transdermal Drug Delivery Using Nano-Vesicular Carriers: Transfersomes." *Recent Patents on Nanomedicine* 2: 164-171.
Ghanbarzadeh, S. et al., (2013) "Enhanced transdermal delivery of diclofenac sodium via conventional liposomes, ethosomes, and transfersomes." *BioMed Research International*, vol. 2013, Article ID 616810, 7 pages, http://dx.doi.org/10.1155/2013/616810.
Goindi, S. et al., (2013) "Development of novel elastic vesicle-based topical formulation of cetirizine dihydrochloride for treatment of atopic dermatitis." *AAPS PharmSciTech*, 14(4): 1284-1293.
Hasan et al., (2013) "Formulation and evaluation of metformin hydrochloride-loaded niosomes as controlled release drug delivery system", *Drug Delivery*, 20(3-4): 120-126.
Holpuch et al., (2010) "Nanoparticles for Local Drug Delivery to the Oral Mucosa: Proof of Principle Studies." *Pharm Res Pharmaceutical Research* 27(7): 1224-1236.
Huang et al., (2011) "Elastic liposomes as carriers for oral delivery and the brain distribution of (+)-catechin." *Journal of Drug Targeting*, 19(8): 709-718.
Idiart et al., (2004) "Rupture of a Liposomal Vesicle." *Physical Review E* 69(6 Pt 1): 061922 (8 pages).
Jahn et al., (2010) "Microfluidic Mixing and the Formation of Nanoscale Lipid Vesicles", *ACS Nano* 4(4): 2077-2087.
Madhav et al., (2012) "Recent Trends in Oral Transmucosal Drug Delivery Systems: An Emphasis on the Soft Palatal Route." *Expert Opinion on Drug Delivery* 9(6):629-647.
Obregon et al., (2012) "Soluble amyloid precursor protein-alpha modulates beta-secretase activity and amyloid-beta generation" *Nat Commun.*, 3: 777 (9 pages).
Patel et al., (2011) "Advances in Oral Transmucosal Drug Delivery." *Journal of Controlled Release* 153(2): 106-116.
Petelin et al., (1998) "EPR Study of Mucoadhesive Ointments for Delivery of Liposomes into the Oral Mucosa." *International Journal of Pharmaceutics* 173(1-2): 193-202.
Prausnitz et al., (2008) "Transdermal Drug Delivery." *Nat Biotechnol Nature Biotechnology* 26(11): 1261-268; [NIH Public Access—Author Manuscript—18 pages].
Rai et al., (2017) "Transfersomes as versatile and flexible nanovesicular carriers in skin cancer therapy: the state of the art." *Nano Reviews & Experiments* [18 pages] https://doi.org/10.1080/20022727.2017.1325708.
Salem et al., (2015) "Targeting brain cells with glutathione-modulated nanoliposomes: in vitro and in vivo study", *Drug Design, Development and Therapy*, 9: 3705-3727.
Šentjurc et al., (1999) "Liposomes as a Topical Delivery System: The Role of Size on Transport Studied by the EPR Imaging Method." *Journal of Controlled Release* 59(1): 87-97.
Shmeeda et al., (2010) "Delivery of zoledronic acid encapsulated in folate-targeted liposome results in potent in vitro cytotoxic activity on tumor cells", *Journal of Controlled Release*, 146(1): 76-83.

Singh et al., (2009) "Elastic Liposomal Formulation for Sustained Delivery of Colchicine: In Vitro Characterization and In Vivo Evaluation of Anti-gout Activity." *The AAPS Journal* 11(1): 54-64.
Sudhakar et al., (2016) "A Comparison Study of Liposomes, Transfersomes And Ethosomes Bearing Lamivudine." *IJPSR* 7(10): 4214-4221.
Zhang et al., (2017) "Nanocapsules of therapeutic proteins with enhanced stability and long blood circulation for hyperuricemia management", *Journal of Controlled Release* 255: 54-61.
PCT International Preliminary Report on Patentability and Written Opinion dated May 12, 2020 issued in PCT/US2018/059960.
US Office Action dated Aug. 24, 2020 issued in U.S. Appl. No. 15/774,575.
Gupta et al., (2012) "Transfersomes: A Novel Vesicular Carrier for Enhanced Transdermal Delivery of Sertraline: Development, Characterization, and Performance Evaluation." *Sci. Pharm.*, 80: 1061-1080.
Yang et al., (2002) "Phospholipid Deformable Vesicles for Buccal Delivery of Insulin." *Chem. Phann. Bull.* 50(6): 749-753.
CN Office Action dated Aug. 31, 2021 issued in CN 201880034533.8.
EP Extended Search Report dated Nov. 17, 2020 issued in EP 18781490.0.
US Final Office Action dated Apr. 7, 2021 issued in U.S. Appl. No. 15/774,575.
Boakye et al., (2016) "Ultra-flexible nanocarriers for enhanced topical delivery of a highly lipophilic antioxidative molecule for skin cancer chemoprevention" *Colloids and Surfaces B: Biointerfaces* 143: 156-167.
Desmet et al., (2016) "An elastic lipsomal formulation for RNAi-based topical treatment of skin disorders: Proof-of-concept in the treatment of psoriasis." *International Journal of Pharmaceutics*, 500: 268-274.
Shao, Kun et al., (2011) "Brain-targeted Drug Nano-delivery System", *Journal of Southeast University (Medical Edition)* 30(1): 169-184.
Subbiah et al., (2017) "Deformable Nanovesicles Synthesized through an Adaptable Microfluidic Platform for Enhanced Localized Transdermal Drug Delivery." *Journal of Drug Delivery*, 12 pages, DOI: 10.1155/2017/4759839.
Elhissi, A. et al., "Nebulization of Ultra deformable Liposomes: The Influence of Aerosolization Mechanism and Formulation Excipients", International Journal of Pharmaceutics, 2012, vol. 436, pp. 519-526.
JP Office Action dated Jan. 17, 2022, in Application No. JP2020-502542 with English translation.
U.S. Non-Final office Action dated Jun. 20, 2022 in U.S. Appl. No. 15/774,575.
El-Amouri, S.S. et al., "Normalization and improvement of CNS deficits in mice with Hurler syndrome after long-term peripheral delivery of BBB-targeted iduronidase", Molecular Therapy, Sep. 9, 2014, vol. 22, No. 12, pp. 2028-2037.
EP Office Action dated Dec. 7, 2022 in Application No. EP16867146.9.
Garcia-Manrique, P., et al., "Fully Artificial Exosomes: Towards New Theranostic Biomaterials," Trends in biotechnology, Jan. 2018, vol. 36(1), pp. 10-14.
International Search Report and Written Opinion dated Sep. 23, 2021 in PCT Application No. PCT/US2021/026049.
International Preliminary Report on Patentability and written opinion dated Oct. 20, 2022 in Application PCT/US2021/026049.
International Search Report and Written Opinion dated Jan. 5, 2023 in PCT Application No. PCT/US2022/043243.
Jang, S.C., et al., "Bioinspired Exosome-mimetic Nanovesicles for Targeted Delivery of Chemotherapeutics to Malignant Tumors," ACS nano, Sep. 2013, vol. 7(9), pp. 7698-7710.
Jo, W., et al., "Microfluidic Fabrication of Cell-derived Nanovesicles as Endogenous RNA Carriers," Lab on a chip, Apr. 2014, vol. 14(7), pp. 1261-1269.
JP Office Action dated Nov. 14, 2022, in Application No. JP2020-502542 with English translation.
Koblan, L.W. et al., "Improving Cytidine and Adenine Base Editors by Expression Optimization and Ancestral Reconstruction", Nature Biotechnology, May 29, 2018, vol. 36, No. 9, pp. 843-846.

(56) References Cited

OTHER PUBLICATIONS

Li, SP., et al., "Exosomal Cargo-loading and Synthetic Exosome-mimics as Potential Therapeutic Tools," Acta pharmacologica Sinica, Apr. 28, vol. 39(4), vol. 542-551.

Lin Y T et al., APOE4 Causes Widespread Molecular and Cellular Alterations Associated with Alzheimer's Disease Phenotypes in Human iPSC-Derived Brain Cell Types, Neuron, 2018, vol. 98, pp. 1141-1154.

Pilch and Musial, "Liposomes with an Ethanol Fraction as an Application for Drug Delivery," Int J Mol Sci. Nov. 29, 2018;19(12):3806 (13 pages). doi: 10.3390/ijms19123806.

Thuronyi, B.W. et al., "Continuous Evolution of Base Editors With Expanded Target Compatibility and Improved Activity", Nature Biotechnology, Sep. 2019, vol. 37, No. 9, pp. 1070-1079.

U.S. Final Office Action dated Mar. 8, 2023 in U.S. Appl. No. 15/774,575.

U.S. Non-Final Office Action dated Oct. 27, 2023, in U.S. Appl. No. 15/774,575.

Souto et al., "Elastic and ultradeformable liposomes for transdermal delivery of active pharmaceutical ingredients (APIs)." International Journal of Molecular Sciences 22.18 (2021): 9743.

Verma et al., "Therapeutic and cosmeceutical potential of ethosomes: An overview." Journal of advanced pharmaceutical technology & research 1.3 (2010): 274-282.

Notice of Allowance for U.S. Appl. No. 15/774,575 dated Mar. 19, 2025.

\* cited by examiner

Atomic Force Microscopy (AFM) - Phase Analysis

Liposome loaded with AF-ZOL

DNV loaded with AF-ZOL

Lyophilized AF-ZOL DNV re-suspended after weeks of storage

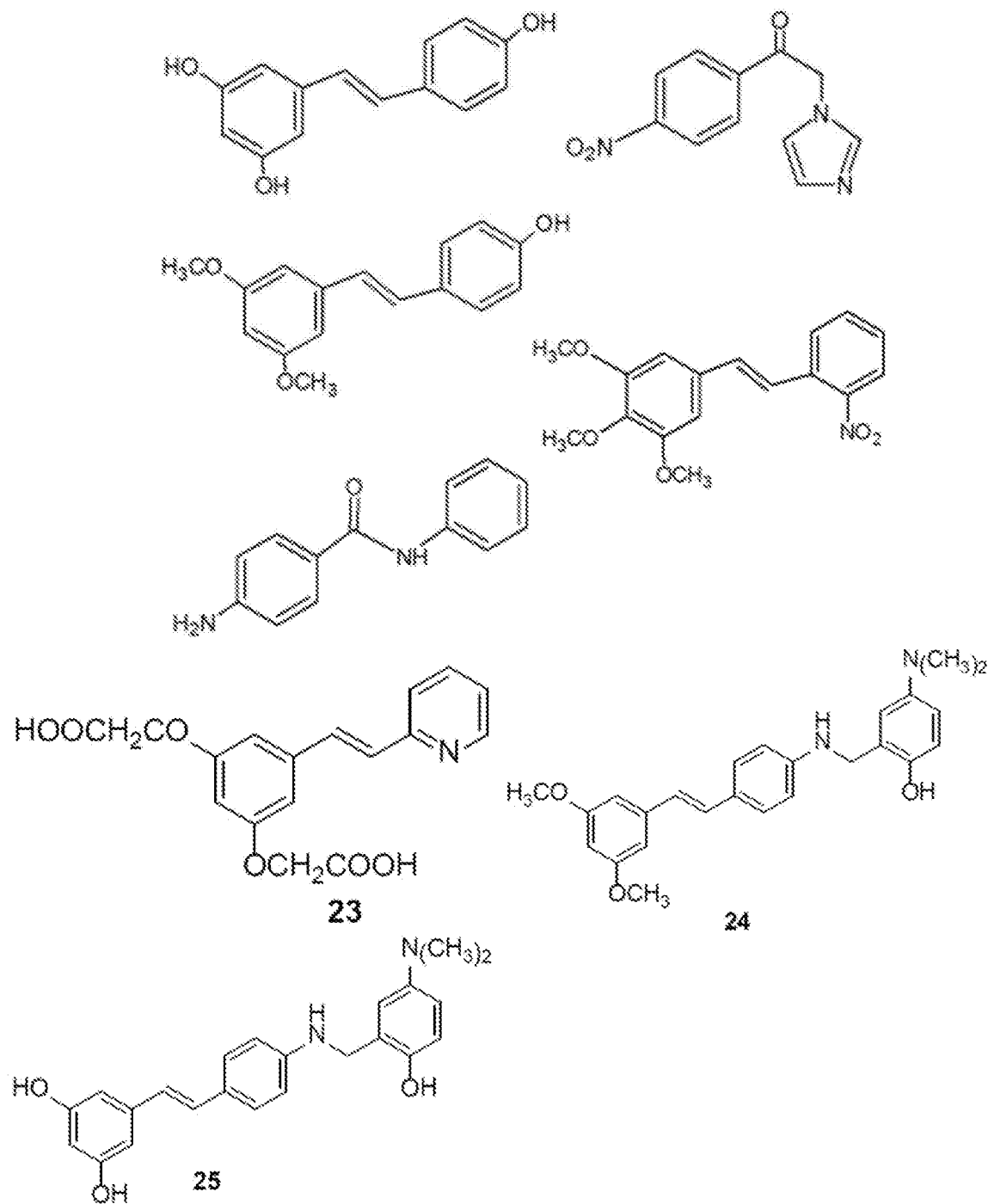
Fig. 14, cont'd.

DEFORMABLE NANO-SCALE VEHICLES (DNVS) FOR TRANS-BLOOD BRAIN BARRIER, TRANS-MUCOSAL, AND TRANSDERMAL DRUG DELIVERY

CROSS-REFERENCE TO RELATED APPLICATIONS

This application is a US 371 National Phase of PCT/US2018/025749, filed on Apr. 2, 2018 which claims benefit of and priority to U.S. Ser. No. 62/480,924, filed on Apr. 3, 2017, both of which are incorporated herein by reference in their entirety for all purposes.

STATEMENT OF GOVERNMENTAL SUPPORT

Not Applicable

BACKGROUND

Modern medicine affords us new drugs and associated delivery systems that can successfully treat various disease pathologies. However it is often the case that a drug is effective only at the target site and ineffective or even toxic in systemic circulation. A localized drug delivery system thus would have the potential to reduce the dosage and increase the efficacy of otherwise toxic drugs, and reduce or eliminate adverse effects, resulting in increased patient compliance and outcomes.

There are over nineteen approved transdermal drug delivery systems and several experimental ones including patches, microneedles, plastic polymer and lipid nanoparticles and hydrogel matrices (see, e.g., Prausnitz et al. (2008) *Nat. Biotechnol.*, 26(11): 1261-268; Petelin et al. (1998) *Int. J. Pharmaceut.* 173(1-2): 193-202; Madhav et al. (2012) *Exp. Opin. Drug Deliv.*, 9(6): 629-647; Patel et al. (2011) *J. Control. Rel.* 153(2): 106-116). These systems often suffer from failures in improvement of transport, safety and efficacy.

SUMMARY

In various embodiments deformable nano-scale vehicles (DNV) are provided that are useful for the delivery of therapeutic agents. In certain embodiments the DNVs are capable of transdermal delivery and can additionally cross the blood-brain barrier.

Various embodiments contemplated herein may include, but need not be limited to, one or more of the following:

Embodiment 1: A deformable nanoscale drug delivery vehicle, said vehicle comprising:
one or more amphipathic vesicle-forming lipids;
cholesterol; and
a non-ionic detergent; wherein said nanoscale drug delivery vehicle contains:
a flavonoid (bioflavanoid), an isoflavonoid, a neoflavonoid, or a prodrug thereof; and/or
resveratrol or a resveratrol analog; and/or
a quinone oxido reductase (NQO2) inhibitor; and/or
a bisphosphonate; and/or
an antibody; and/or
an aptamer or miRNA.

Embodiment 2: The nanoscale drug delivery vehicle of embodiment 1, wherein said nanoscale drug delivery vehicle contains a flavonoid (bioflavanoid), an isoflavonoid, a neoflavonoid, or a prodrug thereof.

Embodiment 3: The nanoscale drug delivery vehicle of embodiment 2, wherein nanoscale drug delivery vehicle contains an agent selected from the group consisting of hesperidin, quercitrin, rutin, tangeritin, luteolin, apigenin, tangeritin, quercetin, kaempferol, myricetin, fisetin, galangin, isorhamnetin, pachypodol, rhamnazin, a pyranoflavonols, a furanoflavonols, hesperetin, Naringenin, Eriodictyol, Homoeriodictyol, Taxifolin, and Dihydrokaempferol, or a prodrug thereof.

Embodiment 4: The nanoscale drug delivery vehicle of embodiment 2, wherein nanoscale drug delivery vehicle contains galangin.

Embodiment 5: The nanoscale drug delivery vehicle of embodiment 2, wherein nanoscale drug delivery vehicle contains progalangin.

Embodiment 6: The nanoscale drug delivery vehicle of embodiment 2, wherein nanoscale drug delivery vehicle contains rutin.

Embodiment 7: The nanoscale drug delivery vehicle according to any one of embodiments 1-6, wherein said nanoscale drug delivery vehicle contains resveratrol or a resveratrol analog.

Embodiment 8: The nanoscale drug delivery vehicle of embodiment 7, wherein said nanoscale drug delivery vehicle contains resveratrol.

Embodiment 9: The nanoscale drug delivery vehicle of embodiment 7, wherein said nanoscale drug delivery vehicle contains a resveratrol analog.

Embodiment 10: The nanoscale drug delivery vehicle of embodiment 9, wherein said resveratrol analogue is selected from the group consisting of 2,3',5',6-tetrahydroxy-trans-stilbene, 3,3',4,4'-tetrahydroxy-trans-stilbene.

Embodiment 11: The nanoscale drug delivery vehicle of embodiment 9, wherein said resveratrol analogue is selected from the group consisting of the resveratrol analogs shown in FIG. 14.

Embodiment 12: The nanoscale drug delivery vehicle according to any one of embodiments 1-11, wherein said nanoscale drug delivery vehicle contains an antibody.

Embodiment 13: The nanoscale drug delivery vehicle of embodiment 12, wherein said antibody is an antibody that is useful in the treatment of a neurodegenerative disorder.

Embodiment 14: The nanoscale drug delivery vehicle of embodiment 17, wherein said neurodegenerative disorder comprises a disorder selected from the group consisting of Alzheimer's disease (AD), amytrophic lateral sclerosis (ALS), cerebral palsy, dementia/Frontotemporal Dementia (FTD), Huntington's disease, mild cognitive impairment (MCI), Parkinson's disease (PD), primary lateral sclerosis (PLS), ischemia/stroke, taupathies, traumatic brain injury (TBI), and chronic traumatic encephalopathy (CTE).

Embodiment 15: The nanoscale drug delivery vehicle according to any one of embodiments 12-14, wherein said antibody binds to a protein selected from the group consisting of beta-amyloid (Aβ), alpha-synuclein (α-syn), tau, APP, and TAR DNA-binding protein 43 (TDP-43), or fragments thereof.

Embodiment 16: The nanoscale drug delivery vehicle of embodiment 15, wherein said antibodies bind to toxic oligomeric protein variants but do not bind monomeric, fibrillar or non-disease associated forms of said protein.

Embodiment 17: The nanoscale drug delivery vehicle according to any one of embodiments 12-16, wherein said antibody is an antibody that binds to Aβ or a fragment thereof.

Embodiment 18: The nanoscale drug delivery vehicle according to any one of embodiments 12-17, wherein said antibody comprise an antibody selected from the group consisting of Bapineuzumab (humanized 3D6), Solanezumab (humanized m266), Gantenerumab, Crenezumab (humanized IgG4), BAN2401 (humanized mAb158), GSK 933776 (humanized IgG1), AAB-003 (Fc-engineered bapineuzumab), and SAR228810 (humanized 13C3), BIIB037/BART (full human IgG1).

Embodiment 19: The nanoscale drug delivery vehicle according to any one of embodiments 1-18, wherein said nanoscale drug delivery vehicle contains an inhibitory RNA (e.g., miRNA) and/or an aptamer.

Embodiment 20: The nanoscale drug delivery vehicle of embodiment 19, wherein said aptamer binds to a protein selected from the group consisting of beta-amyloid (Aβ), alpha-synuclein (α-syn), tau, APP, and TAR DNA-binding protein 43 (TDP-43), or fragments thereof.

Embodiment 21: The nanoscale drug delivery vehicle of embodiment 19, wherein said inhibitory RNA inhibits expression of a protein selected from the group consisting of beta-amyloid (Aβ), alpha-synuclein (α-syn), tau, APP, and TAR DNA-binding protein 43 (TDP-43), or fragments thereof.

Embodiment 22: The nanoscale drug delivery vehicle according to any one of embodiments 1-21, wherein said nanoscale drug delivery vehicle contains a quinone oxido reductase (NQO2) inhibitor.

Embodiment 23: The nanoscale drug delivery vehicle of embodiment 22, wherein said NqO2 inhibitor is selected from the group consisting of NSC14229 (quinacrine), NSC9858, NSC11232, NSC12547, NSC13000, NSC13484, NSC17602, NSC28487, NSC64924, NSC71795, NSC76750, NSC101984, NSC140268, NSC156529, NSC164017, NSC219733, NSC270904, NSC273829, NSC305831, NSC305836, NSC322087, NSC356821, NSC374718, NSC407356, NSC617933, NSC617939, NSC620318, NSC628440, NSC633239, NSC648424, NSC658835, NSC682454, resveratrol, resveratrol analogs, and Imatinib.

Embodiment 24: The nanoscale drug delivery vehicle according to any one of embodiments 1-23, wherein said nanoscale drug delivery vehicle contains a bisphosphonate.

Embodiment 25: The nanoscale drug delivery vehicle of embodiment 24, wherein said nanoscale drug delivery vehicle contains a bisphosphonate selected from the group consisting of adendronate/cholecalciferol, etidronate, zoledronic acid (zolendronate), ibandronate, risedronate, alendronate, pamidronate, neridronate, olpadronate, and tiludronate.

Embodiment 26: The nanoscale drug delivery vehicle of embodiment 24, wherein said nanoscale drug delivery vehicle contains zoledronic acid (zolendronate).

Embodiment 27: The nanoscale drug delivery vehicle according to any one of embodiments 1-26, wherein said amphipathic vesicle forming lipids comprise phospholipids.

Embodiment 28: The nanoscale drug delivery vehicle of embodiment 27, wherein said phospholipid is selected from the group consisting of 1,2-Dipalmitoyl-sn-glycero-3-phosphocholine (DPPC), N-(2,3-Dioleoyloxy-1-propyl), trimethylammonium (DOTAP), and 1,2-Dioleoyl-sn-glycero-3-phosphoethanolamine (DOPE).

Embodiment 29: The nanoscale drug delivery vehicle according to any one of embodiments 1-28, wherein said nanoscale drug delivery vehicle comprises a micelle.

Embodiment 30: The nanoscale drug delivery vehicle according to any one of embodiments 1-28, wherein said nanoscale drug delivery vehicle comprises a liposome.

Embodiment 31: The nanoscale drug delivery vehicle according to any one of embodiments 1-30, wherein said drug delivery vehicle comprises at least two phospholipids.

Embodiment 32: The nanoscale drug delivery vehicle according to any one of embodiments 27-31, wherein said phospholipid comprises DPPC and a second phospholipid.

Embodiment 33: The nanoscale drug delivery vehicle of embodiment 32, wherein the ratio of DPPC to said second phospholipid ranges from 2:1 to 1:2.

Embodiment 34: The nanoscale drug delivery vehicle of embodiment 32, wherein the ratio of DPPC to said second phospholipid is about 1:1.

Embodiment 35: The nanoscale drug delivery vehicle according to any one of embodiments 27-34, wherein the ratio of total phospholipid to cholesterol ranges from about 12:2 to about 5:4 or about 5:3, or from about 10:2 to about 6:2.

Embodiment 36: The nanoscale drug delivery vehicle of embodiment 35, wherein the ratio of phospholipid to second phospholipid to cholesterol is about 4:4:2.

Embodiment 37: The nanoscale drug delivery vehicle of embodiment 35, wherein the ratio of phospholipid to second phospholipid is about 5:3.

Embodiment 38: The nanoscale drug delivery vehicle according to any one of embodiments 1-37, wherein the w/w ratio of lipids (including cholesterol) to non-ionic detergent ranges from about 85:5 to about 85:25, or from about 85:10 to about 85:20.

Embodiment 39: The nanoscale drug delivery vehicle of embodiment 38, wherein the w/w ratio of lipids (including cholesterol) to detergent is about 85:15.

Embodiment 40: The nanoscale drug delivery vehicle according to any one of embodiments 1-39, wherein said non-ionic detergent comprises a detergent selected from the group consisting of Span 80, Tween 20, BRIJ® 76 (stearyl poly(10)oxy ethylene ether), BRIJ® 78 (stearyl poly(20) oxyethylene ether), BRIJ® 96 (oleyl poly(10)oxy ethylene ether), and BRIJ® 721 (stearyl poly (21) oxyethylene ether).

Embodiment 41: The nanoscale drug delivery vehicle of embodiment 40, wherein said drug delivery vehicle comprises about 10% to about 20%, or about 15% Span 80 by weight.

Embodiment 42: The nanoscale drug delivery vehicle according to any one of embodiments 1-40, wherein said nanoscale drug delivery vehicle is neutral (uncharged).

Embodiment 43: The nanoscale drug delivery vehicle of embodiment 42, wherein said phospholipid comprises DPPC and DOPE.

Embodiment 44: The nanoscale drug delivery vehicle according to any one of embodiments 1-30, wherein said nanoscale drug delivery vehicle is cationic.

Embodiment 45: The nanoscale drug delivery vehicle of embodiment 44, wherein said phospholipid comprises DPPC and DOTAP.

Embodiment 46: The nanoscale drug delivery vehicle according to any one of embodiments 1-30, wherein said nanoscale drug delivery vehicle is anionic.

Embodiment 47: The nanoscale drug delivery vehicle of embodiment 46, wherein said phospholipid comprises DPPC and DHP.

Embodiment 48: The nanoscale drug delivery vehicle according to any one of embodiments 1-47, wherein said vehicle (DNV) is not spherical in shape.

Embodiment 49: The nanoscale drug delivery vehicle according to any one of embodiments 1-48, wherein said vehicle (DNV) is an irregular shape.

Embodiment 50: The nanoscale drug delivery vehicle according to any one of embodiments 1-49, wherein said vehicle (DNV) is stable and able to be reconstituted to a functional DNV after storage as a lyophilized powder for at least 1 week, or at least 2 weeks, or at least 3 weeks, or at least 4 weeks, or at least 2 months, or at least 3 months, or at least 4 months, or at least 5 months, or at least 6 months, or at least 9 months, or at least 12 months, or at least 18 months, or at least 24 months.

Embodiment 51: The nanoscale drug delivery vehicle according to any one of embodiments 1-50, wherein said nanoscale drug delivery vehicle is functionalized with a polymer to increase serum halflife.

Embodiment 52: The nanoscale drug delivery vehicle of embodiment 51, wherein said polymer comprises polyethylene glycol and/or a cellulose or modified cellulose.

Embodiment 53: The nanoscale drug delivery vehicle according to any one of embodiments 1-52, wherein the DNVs range in size from about 50 nm up, or from about 60 nm, or from about 70 nm, or from about 80 nm, or from about 90 nm, or from about 100 nm, up to about 10 µm, or up to about 5 µm, or up to about 1 µm, or up to about 900 nm, or up to about 800 nm, or up to about 700 nm, or up to about 600 nm, or up to about 500 nm, or up to about 400 nm, or up to about 300 nm average diameter.

Embodiment 54: The nanoscale drug delivery vehicle according to any one of embodiments 1-52, wherein the DNVs range in size from about 50 nm up to about 275 nm average diameter.

Embodiment 55: The nanoscale drug delivery vehicle according to any one of embodiments 1-52, wherein the DNVs are about 50 nm average diameter, or about 100 nm average diameter, or about 150 nm average diameter.

Embodiment 56: The nanoscale drug delivery vehicle according to any one of embodiments 1-55, wherein said nanoscale drug delivery vehicle is attached to an antibody or a ligand that binds to a cell surface marker.

Embodiment 57: The nanoscale drug delivery vehicle of embodiment 56, wherein said cell surface marker is a marker of tumor cells.

Embodiment 58: The nanoscale drug delivery vehicle of embodiment 57, wherein said cell surface maker comprises a marker in Table 1.

Embodiment 59: The nanoscale drug delivery vehicle according to any one of embodiments 1-55, wherein said nanoscale drug delivery vehicle is attached to a brain targeting molecule and/or a molecule that has increased brain penetration.

Embodiment 60: The nanoscale drug delivery vehicle of embodiment 59, wherein said brain targeting molecule and/or a molecule that has increased brain penetration is selected from the group consisting of transferrin, insulin, small molecules that have increased brain penetration such as benzodiazepines, neutral amino acid transporter ligands, and glucose transporter ligands.

Embodiment 61: The nanoscale drug delivery vehicle of embodiment 60, wherein transferrin is attached to nanoscale drug delivery vehicle.

Embodiment 62: The nanoscale drug delivery vehicle of embodiment 60, wherein folic acid is attached to nanoscale drug delivery vehicle.

Embodiment 63: A pharmaceutical formulation comprising a nanoscale drug delivery vehicle according to any one of embodiments 1-62 and a pharmaceutically acceptable carrier.

Embodiment 64: The formulation of embodiment 63, wherein said formulation is compounded for delivery by route selected from the group consisting of oral delivery, isophoretic delivery, subdermal delivery, transdermal delivery, parenteral delivery, aerosol administration, administration via inhalation, intravenous administration, and rectal administration.

Embodiment 65: The formulation of embodiment 64, wherein said formulation is compounded for oral administration.

Embodiment 66: The formulation of embodiment 64, wherein said formulation is compounded for transdermal administration.

Embodiment 67: The formulation of embodiment 66, wherein said formulation is provided as a transdermal patch.

Embodiment 68: The formulation of embodiment 64, wherein said formulation is compounded for systemic administration.

Embodiment 69: The formulation according to any one of embodiments 63-68, wherein said formulation is a unit dosage formulation.

Embodiment 70: A method of treating or prophylaxis of a neurodegenerative brain disorder, said method comprising:
administering to a subject in need thereof an effective amount of a loaded nanoscale drug delivery vehicle according to any one of embodiments 1-28.

Embodiment 71: The method of embodiment 70, wherein said neurodegenerative brain disorder is selected from the group consisting of Alzheimer's disease (AD), amytrophic lateral sclerosis (ALS), cerebral palsy, dementia/Frontotemporal Dementia (FTD), Huntington's disease, mild cognitive impairment (MCI), Parkinson's disease (PD), primary lateral sclerosis (PLS), ischemia/stroke, taupathies, traumatic brain injury (TBI), and chronic traumatic encephalopathy (CTE).

Embodiment 72: The method according to any one of embodiments 70-71, wherein said DSV(s) contain an inhibitor of an amyloidogenic pathway or an agent that switches APP processing from an amyloidogenic to a non-amyloidogenic pathway.

Embodiment 73: The method according to any one of embodiments 70-72, wherein said method prevents or delays the onset of a pre-Alzheimer's condition and/or cognitive dysfunction, and/or ameliorates one or more symptoms of a pre-Alzheimer's condition and/or cognitive dysfunction, and/or prevents or delays the progression of a pre-Alzheimer's condition or cognitive dysfunction to Alzheimer's disease, and/or ameliorates one or more symptoms of Alzheimer's disease, and/or reverses Alzheimer's disease, and/or reduces the rate of progression of Alzheimer's disease.

Embodiment 74: A method of delivery a therapeutic agent to a subject, wherein said agent comprises: a flavonoid (bioflavanoid), an isoflavonoid, a neoflavonoid, or a prodrug thereof; and/or resveratrol or a resveratrol analog; and/or a quinone oxido reductase (NQO2) inhibitor; and/or a bisphosphonate; and/or an antibody; and/or an aptamer or inhibitory RNA (e.g., miRNA); said method comprising administering to said subject a nanoscale drug delivery vehicle according to any one of embodiments 1-62, wherein said nanoscale delivery vehicle contains said therapeutic agent.

Embodiment 75: The method of embodiment 74, wherein said subject is a human.

Embodiment 76: The method of embodiment 74, wherein said subject is a non-human mammal.

Embodiment 77: The method according to any one of embodiments 74-76, wherein said nanoscale drug delivery vehicles are delivered via a route selected from the group consisting of oral delivery, isophoretic delivery, subdermal delivery, transdermal delivery, parenteral delivery, aerosol administration, administration via inhalation, intravenous administration, and rectal administration.

Embodiment 78: The method according to any one of embodiments 74-76, wherein said nanoscale drug delivery vehicles deliver a cargo across the blood-brain barrier.

Embodiment 79: The method of embodiment 78, wherein said nanoscale drug delivery vehicles are applied transdermally and deliver a cargo across the blood brain barrier.

Embodiment 80: The method according to any one of embodiments 74-76, wherein said nanoscale drug delivery vehicles deliver a cargo locally to craniofacial and/or oral bone.

Embodiment 81: The method of embodiment 80, wherein said nanoscale drug delivery vehicles deliver a cargo to alveolar bone.

Embodiment 82: The method according to any one of embodiments 74-76, wherein said nanoscale drug delivery vehicles deliver a cargo locally to a topical, intradermal, or subdermal site.

Embodiment 83: The method according to any one of embodiments 74-76, wherein said nanoscale drug delivery vehicles deliver a cargo to calvarial skin and/or to underlying bone.

Embodiment 84: The method according to any one of embodiments 74-76, wherein said nanoscale drug delivery vehicles are applied to the oral mucosa.

Embodiment 85: A deformable nanoscale drug delivery vehicle, said vehicle comprising:
one or more amphipathic vesicle-forming lipids;
cholesterol; and
a non-ionic detergent.

Embodiment 86: The nanoscale drug delivery vehicle of embodiment 85, wherein said amphipathic vesicle forming lipids comprise phospholipids.

Embodiment 87: The nanoscale drug delivery vehicle of embodiment 86, wherein said phospholipid is selected from the group consisting of 1,2-Dipalmitoyl-sn-glycero-3-phosphocholine (DPPC), N-(2,3-Dioleoyloxy-1-propyl), trimethylammonium (DOTAP), and 1,2-Dioleoyl-sn-glycero-3-phosphoethanolamine (DOPE).

Embodiment 88: The nanoscale drug delivery vehicle according to any one of embodiments 85-87, wherein said nanoscale drug delivery vehicle comprises a micelle.

Embodiment 89: The nanoscale drug delivery vehicle according to any one of embodiments 85-87, wherein said nanoscale drug delivery vehicle comprises a liposome.

Embodiment 90: The nanoscale drug delivery vehicle according to any one of embodiments 85-89, wherein said drug delivery vehicle comprises at least two phospholipids.

Embodiment 91: The nanoscale drug delivery vehicle according to any one of embodiments 86-90, wherein said phospholipid comprises DPPC and a second phospholipid.

Embodiment 92: The nanoscale drug delivery vehicle of embodiment 91, wherein the ratio of DPPC to said second phospholipid ranges from 2:1 to 1:2.

Embodiment 93: The nanoscale drug delivery vehicle of embodiment 91, wherein the ratio of DPPC to said second phospholipid is about 1:1.

Embodiment 94: The nanoscale drug delivery vehicle according to any one of embodiments 86-93, wherein the ratio of total phospholipid to cholesterol ranges from about 12:2 to about 5:4 or about 5:3, or from about 10:2 to about 6:2.

Embodiment 95: The nanoscale drug delivery vehicle of embodiment 94, wherein the ratio of phospholipid to second phospholipid to cholesterol is about 4:4:2.

Embodiment 96: The nanoscale drug delivery vehicle of embodiment 94, wherein the ratio of phospholipid to second phospholipid is about 5:3.

Embodiment 97: The nanoscale drug delivery vehicle according to any one of embodiments 85-96, wherein the w/w ratio of lipids (including cholesterol) to non-ionic detergent ranges from about 85:5 to about 85:25, or from about 85:10 to about 85:20.

Embodiment 98: The nanoscale drug delivery vehicle of embodiment 97, wherein the w/w ratio of lipids (including cholesterol) to detergent is about 85:15.

Embodiment 99: The nanoscale drug delivery vehicle according to any one of embodiments 85-98, wherein said non-ionic detergent comprises a detergent selected from the group consisting of Span 80, Tween 20, BRIJ® 76 (stearyl poly(10)oxy ethylene ether), BRIJ® 78 (stearyl poly(20) oxyethylene ether), BRIJ® 96 (oleyl poly(10)oxy ethylene ether), and BRIJ® 721 (stearyl poly (21) oxyethylene ether).

Embodiment 100: The nanoscale drug delivery vehicle of embodiment 99, wherein said drug delivery vehicle comprises about 10% to about 20%, or about 15% Span 80 by weight.

Embodiment 101: The nanoscale drug delivery vehicle according to any one of embodiments 85-99, wherein said nanoscale drug delivery vehicle is neutral (uncharged).

Embodiment 102: The nanoscale drug delivery vehicle of embodiment 101, wherein said phospholipid comprises DPPC and DOPE.

Embodiment 103: The nanoscale drug delivery vehicle according to any one of embodiments 85-89, wherein said nanoscale drug delivery vehicle is cationic.

Embodiment 104: The nanoscale drug delivery vehicle of embodiment 103, wherein said phospholipid comprises DPPC and DOTAP.

Embodiment 105: The nanoscale drug delivery vehicle according to any one of embodiments 85-89, wherein said nanoscale drug delivery vehicle is anionic.

Embodiment 106: The nanoscale drug delivery vehicle of embodiment 105, wherein said phospholipid comprises DPPC and DHP.

Embodiment 107: The nanoscale drug delivery vehicle according to any one of embodiments 85-106, wherein said vehicle (DNV) is not spherical in shape.

Embodiment 108: The nanoscale drug delivery vehicle according to any one of embodiments 85-107, wherein said vehicle (DNV) is an irregular shape.

Embodiment 109: The nanoscale drug delivery vehicle according to any one of embodiments 85-108, wherein said vehicle (DNV) is stable and able to be reconstituted to a functional DNV after storage as a lyophilized powder for at least 1 week, or at least 2 weeks, or at least 3 weeks, or at least 4 weeks, or at least 2 months, or at least 3 months, or at least 4 months, or at least 5 months, or at least 6 months, or at least 9 months, or at least 12 months, or at least 18 months, or at least 24 months.

Embodiment 110: The nanoscale drug delivery vehicle according to any one of embodiments 85-109, wherein said nanoscale drug delivery vehicle is functionalized with a polymer to increase serum halflife.

Embodiment 111: The nanoscale drug delivery vehicle of embodiment 110, wherein said polymer comprises polyethylene glycol and/or a cellulose or modified cellulose.

Embodiment 112: The nanoscale drug delivery vehicle according to any one of embodiments 85-111, wherein the DNVs range in size from about 50 nm up, or from about 60 nm, or from about 70 nm, or from about 80 nm, or from about 90 nm, or from about 100 nm, up to about 10 μm, or up to about 5 µm, or up to about 1 µm, or up to about 900 nm, or up to about 800 nm, or up to about 700 nm, or up to about 600 nm, or up to about 500 nm, or up to about 400 nm, or up to about 300 nm average diameter.

Embodiment 113: The nanoscale drug delivery vehicle according to any one of embodiments 85-111, wherein the DNVs range in size from about 50 nm up to about 275 nm average diameter.

Embodiment 114: The nanoscale drug delivery vehicle according to any one of embodiments 85-111, wherein the DNVs are about 50 nm average diameter, or about 100 nm average diameter, or about 150 nm average diameter.

Embodiment 115: The nanoscale drug delivery vehicle according to any one of embodiments 85-114, wherein said nanoscale drug delivery vehicle is attached to an antibody or a ligand that binds to a cell surface marker.

Embodiment 116: The nanoscale drug delivery vehicle of embodiment 115, wherein said cell surface marker is a marker of tumor cells.

Embodiment 117: The nanoscale drug delivery vehicle of embodiment 116, wherein said cell surface maker comprises a marker in Table 1.

Embodiment 118: The nanoscale drug delivery vehicle according to any one of embodiments 85-114, wherein said nanoscale drug delivery vehicle is attached to a brain targeting molecule and/or a molecule that has increased brain penetration.

Embodiment 119: The nanoscale drug delivery vehicle of embodiment 118, wherein said brain targeting molecule and/or a molecule that has increased brain penetration is selected from the group consisting of transferrin, insulin, small molecules that have increased brain penetration such as benzodiazepines, neutral amino acid transporter ligands, and glucose transporter ligands.

Embodiment 120: The nanoscale drug delivery vehicle of embodiment 119, wherein transferrin is attached to nanoscale drug delivery vehicle.

Embodiment 121: The nanoscale drug delivery vehicle of embodiment 119, wherein folic acid is attached to nanoscale drug delivery vehicle.

Embodiment 122: The nanoscale drug delivery vehicle according to any one of embodiments 85-121, wherein said DNV contains an inhibitor of an amyloidogenic pathway or an agent that switches APP processing from an amyloidogenic to a non-amyloidogenic pathway.

Embodiment 123: The nanoscale drug delivery vehicle of embodiment 122, wherein said DNV contains an agent selected from the group consisting of APP or sAPPα, galangin, disulfiram and/or analogues thereof, honokiol and/or analogues thereof, tropisetron and/or analogues thereof, nimetazepam and/or analogues thereof, tropinol-esters and/or related esters and/or analogues thereof, TrkA kinase inhibitors (e.g., ADDN-1351) and/or analogues thereof, D2 receptor agonists, alpha1-adrenergic receptor antagonists, and APP-specific BACE inhibitors including, but not limited to galangin, a galangin prodrug, rutin, a rutin prodrug, and other flavonoids and flavonoid prodrugs, and a hydantoin (e.g., as described in WO 2014127042 (PCT/PCT/US14/016100) which is incorporated herein by reference for the hydantoins described therein.

Embodiment 124: The nanoscale drug delivery vehicle of embodiment 122, wherein said DNV contains the soluble beta-NRG1 (Neuregulin-1) this is the BACE cleaved fragment of NRG1 (e.g., rhNRG 177-244) that is shown be pro-cognitive and involved in the ErbB4 signaling in the brain.

Embodiment 125: The nanoscale drug delivery vehicle according to any one of embodiments 85-124, wherein said nanoscale drug delivery vehicle contains a flavonoid (bioflavanoid), an isoflavonoid, a neoflavonoid, or a prodrug thereof.

Embodiment 126: The nanoscale drug delivery vehicle of embodiment 125, wherein nanoscale drug delivery vehicle contains an agent selected from the group consisting of hesperidin, quercitrin, rutin, tangeritin, luteolin, apigenin, tangeritin, quercetin, kaempferol, myricetin, fisetin, galangin, isorhamnetin, pachypodol, rhamnazin, a pyranoflavonols, a furanoflavonols, hesperetin, Naringenin, Eriodictyol, Homoeriodictyol, Taxifolin, and Dihydrokaempferol, or a prodrug thereof.

Embodiment 127: The nanoscale drug delivery vehicle of embodiment 125, wherein nanoscale drug delivery vehicle contains galangin.

Embodiment 128: The nanoscale drug delivery vehicle of embodiment 125, wherein nanoscale drug delivery vehicle contains progalangin.

Embodiment 129: The nanoscale drug delivery vehicle of embodiment 125, wherein nanoscale drug delivery vehicle contains rutin.

Embodiment 130: The nanoscale drug delivery vehicle according to any one of embodiments 85-129, wherein said nanoscale drug delivery vehicle contains resveratrol or a resveratrol analog.

Embodiment 131: The nanoscale drug delivery vehicle of embodiment 130, wherein said nanoscale drug delivery vehicle contains resveratrol.

Embodiment 132: The nanoscale drug delivery vehicle of embodiment 130, wherein said nanoscale drug delivery vehicle contains a resveratrol analog.

Embodiment 133: The nanoscale drug delivery vehicle of embodiment 132, wherein said resveratrol analogue is selected from the group consisting of 2,3',5',6-tetrahydroxy-trans-stilbene, 3,3',4,4'-tetrahydroxy-trans-stilbene.

Embodiment 134: The nanoscale drug delivery vehicle of embodiment 42, wherein said resveratrol analogue is selected from the group consisting of the resveratrol analogs shown in FIG. 14.

Embodiment 135: The nanoscale drug delivery vehicle according to any one of embodiments 85-134, wherein said nanoscale drug delivery vehicle contains a quinone oxido reductase (NQO2) inhibitor.

Embodiment 136: The nanoscale drug delivery vehicle according to any one of embodiments 85-121, wherein said nanoscale drug delivery vehicle contains a bisphosphonate.

Embodiment 137: The nanoscale drug delivery vehicle of embodiment 136, wherein said nanoscale drug delivery vehicle contains a bisphosphonate selected from the group consisting of adendronate/cholecalciferol, etidronate, zoledronic acid (zolendronate), ibandronate, risedronate, alendronate, pamidronate, neridronate, olpadronate, and tiludronate.

Embodiment 138: The nanoscale drug delivery vehicle of embodiment 136, wherein said nanoscale drug delivery vehicle contains zoledronic acid (zolendronate).

Embodiment 139: The nanoscale drug delivery vehicle according to any one of embodiments 85-121, wherein said nanoscale drug delivery vehicle contains a cytotoxic and/or cytostatic agent.

Embodiment 140: The nanoscale drug delivery vehicle of embodiment 139, wherein said cytotoxic and/or cytostatic agent is selected from the group consisting of a IDH1 inhibitor, microtubule inhibitor, a DNA-damaging agent, and a polymerase inhibitor.

Embodiment 141: The nanoscale drug delivery vehicle of embodiment 140, wherein the cytotoxic or cytostatic agent comprises a tubulin inhibitor.

Embodiment 142: The nanoscale drug delivery vehicle of embodiment 141, wherein the cytotoxic or cytostatic agent comprises a drug selected from the group consisting of an auristatin, Dolastatin-10, synthetic derivatives of the natural product Dolastatin-10, and maytansine or a maytansine derivative.

Embodiment 143: The nanoscale drug delivery vehicle of embodiment 141, wherein the cytotoxic or cytostatic agent comprises a drug selected from the group consisting Monomethylauristatin F (MMAF), Auristatin E (AE), Monomethylauristatin E (MMAE), vcMMAE, and vcMMAF.

Embodiment 144: The nanoscale drug delivery vehicle of embodiment 141, wherein the cytotoxic or cytostatic agent comprises a maytansine selected from the group consisting of Mertansine (DM1), DM3, and DM4.

Embodiment 145: The nanoscale drug delivery vehicle of embodiment 140, wherein the cytotoxic or cytostatic agent comprises a DNA-damaging agent.

Embodiment 146: The nanoscale drug delivery vehicle of embodiment 145, wherein the cytotoxic or cytostatic agent comprises a drug selected from the group consisting of a calicheamicin, a duocarmycin, and a pyrrolobenzodiazepines.

Embodiment 147: The nanoscale drug delivery vehicle of embodiment 146, wherein the cytotoxic or cytostatic agent comprises a calicheamicin or a calicheamicin analog.

Embodiment 148: The nanoscale drug delivery vehicle of embodiment 146, wherein the cytotoxic or cytostatic agent comprises a duocarmycin.

Embodiment 149: The nanoscale drug delivery vehicle of embodiment 148, wherein the cytotoxic or cytostatic agent comprises a duocarmycin, selected from the group consisting of duocarmycin A, duocarmycin B1, duocarmycin B2, duocarmycin C1, duocarmycin C2, duocarmycin D, duocarmycin SA, Cyclopropylbenzoindole duocarmycin (CC-1065), Centanamycin, Rachelmycin, Adozelesin, Bizelesin, and Carzelesin.

Embodiment 150: The nanoscale drug delivery vehicle of embodiment 146, wherein the cytotoxic or cytostatic agent comprises a pyrrolobenzodiazepine or a pyrrolobenzodiazepine dimer.

Embodiment 151: The nanoscale drug delivery vehicle of embodiment 150, wherein the cytotoxic or cytostatic agent comprise a drug selected from the group consisting of Anthramycin (and dimers thereof), Mazethramycin (and dimers thereof), Tomaymycin (and dimers thereof), Prothracarcin (and dimers thereof), Chicamycin (and dimers thereof), Neothramycin A (and dimers thereof), Neothramycin B (and dimers thereof), DC-81 (and dimers thereof), Sibiromycin (and dimers thereof), Porothramycin A (and dimers thereof), Porothramycin B (and dimers thereof), Sibanomycin (and dimers thereof), Abbeymycin (and dimers thereof), SG2000, and SG2285.

Embodiment 152: The nanoscale drug delivery vehicle of embodiment 139, wherein said cytotoxic and/or cytostatic agent comprises a drug is selected from the group consisting of auristatin, dolastatin, colchicine, combretastatin, and mTOR/PI3K inhibitors.

Embodiment 153: The nanoscale drug delivery vehicle of embodiment 139, wherein said cytotoxic and/or cytostatic agent comprises a drug selected from the group consisting of flourouracil (5-FU), capecitabine, 5-trifluoromethyl-2'-deoxyuridine, methotrexate sodium, raltitrexed, pemetrexed, cytosine Arabinoside, 6-mercaptopurine, azathioprine, 6-thioguanine (6-TG), pentostatin, fludarabine phosphate, cladribine, floxuridine (5-fluoro-2), ribonucleotide reductase inhibitor (RNR), cyclophosphamide, neosar, ifosfamide, thiotepa, 1,3-bis(2-chloroethyl)-1-nitosourea (BCNU), 1,-(2-chloroethyl)-3-cyclohexyl-lnitrosourea, methyl (CCNU), hexamethylmelamine, busulfan, procarbazine HCL, dacarbazine (DTIC), chlorambucil, melphalan, cisplatin, carboplatin, oxaliplatin, bendamustine, carmustine, chloromethine, dacarbazine (DTIC), fotemustine, lomustine, mannosulfan, nedaplatin, nimustine, prednimustine, ranimustine, satraplatin, semustine, streptozocin, temozolomide, treosulfan, triaziquone, triethylene melamine, thioTEPA, triplatin tetranitrate, trofosfamide, uramustine, doxorubicin, daunorubicin citrate, mitoxantrone, actinomycin D, etoposide, topotecan HCL, teniposide (VM-26), irinotecan HCL (CPT-11), camptothecin, belotecan, rubitecan, vincristine, vinblastine sulfate, vinorelbine tartrate, vindesine sulphate, paclitaxel, docetaxel, nanoparticle paclitaxel, abraxane, ixabepilone, larotaxel, ortataxel, tesetaxel, vinflunine, retinoic acid, a retinoic acid derivative, doxirubicin, vinblastine, vincristine, cyclophosphamide, ifosfamide, cisplatin, 5-fluorouracil, a camptothecin derivative, interferon, tamoxifen, and taxol.

Embodiment 154: The nanoscale drug delivery vehicle of embodiment 139, wherein said cytotoxic and/or cytostatic agent comprises a cytotoxin.

Embodiment 155: The nanoscale drug delivery vehicle of embodiment 154, wherein said antibody is attached to a cytotoxin selected from the group consisting of a Diphtheria toxin, a Pseudomonas exotoxin, a ricin, an abrin, saporin, and a thymidine kinase.

Embodiment 156: A pharmaceutical formulation comprising a nanoscale drug delivery vehicle according to any one of embodiments 85-155 and a pharmaceutically acceptable carrier.

Embodiment 157: The formulation of embodiment 156, wherein said formulation is compounded for delivery by route selected from the group consisting of oral delivery, isophoretic delivery, subdermal delivery, transdermal delivery, parenteral delivery, aerosol administration, administration via inhalation, intravenous administration, and rectal administration.

Embodiment 158: The formulation of embodiment 157, wherein said formulation is compounded for oral administration.

Embodiment 159: The formulation of embodiment 157, wherein said formulation is compounded for transdermal administration.

Embodiment 160: The formulation of embodiment 159, wherein said formulation is provided as a transdermal patch.

Embodiment 161: The formulation of embodiment 157, wherein said formulation is compounded for systemic administration.

Embodiment 162: The formulation according to any one of embodiments 156-161, wherein said formulation is a unit dosage formulation.

Embodiment 163: A method of treating or prophylaxis of a neurodegenerative brain disorder, said method comprising:
  administering to a subject in need thereof an effective amount of a loaded nanoscale drug delivery vehicle according to any one of embodiments 122-135.

Embodiment 164: The method of embodiment 163, wherein said neurodegenerative brain disorder is selected from the group consisting of Parkinson's disease, Huntington's disease, Alzheimer's disease, mild cognitive impairment, dementia, ischemia, stroke, amyotrophic lateral sclerosis (ALS), primary lateral sclerosis (PLS), and cerebral palsy.

Embodiment 165: The method according to any one of embodiments 163-164, wherein said DSV(s) contain an inhibitor of an amyloidogenic pathway or an agent that switches APP processing from an amyloidogenic to a non-amyloidogenic pathway.

Embodiment 166: The method according to any one of embodiments 163-165, wherein said method prevents or delays the onset of a pre-Alzheimer's condition and/or cognitive dysfunction, and/or ameliorates one or more symptoms of a pre-Alzheimer's condition and/or cognitive dysfunction, and/or prevents or delays the progression of a pre-Alzheimer's condition or cognitive dysfunction to Alzheimer's disease, and/or ameliorates one or more symptoms of Alzheimer's disease, and/or reverses Alzheimer's disease, and/or reduces the rate of progression of Alzheimer's disease.

Embodiment 167: A method of delivery a therapeutic and/or imaging agent to a subject, said method comprising administering to said subject a nanoscale drug delivery vehicle according to any one of embodiments 85-121, wherein said nanoscale delivery vehicle contains said therapeutic and/or imaging agent.

Embodiment 168: The method of embodiment 167, wherein said nanoscale delivery vehicle is a nanoscale delivery vehicle according to any one of embodiments 122-155.

Embodiment 169: The method according to any one of embodiments 167-168, wherein said subject is a human.

Embodiment 170: The method according to any one of embodiments 167-168, wherein said subject is a non-human mammal.

Embodiment 171: The method according to any one of embodiments 167-170, wherein said nanoscale drug delivery vehicles are delivered via a route selected from the group consisting of oral delivery, isophoretic delivery, subdermal delivery, transdermal delivery, parenteral delivery, aerosol administration, administration via inhalation, intravenous administration, and rectal administration.

Embodiment 172: The method according to any one of embodiments 167-170, wherein said nanoscale drug delivery vehicles deliver a cargo across the blood-brain barrier.

Embodiment 173: The method of embodiment 172, wherein said nanoscale drug delivery vehicles are applied transdermally and deliver a cargo across the blood brain barrier.

Embodiment 174: The method according to any one of embodiments 167-170, wherein said nanoscale drug delivery vehicles deliver a cargo locally to craniofacial and/or oral bone.

Embodiment 175: The method of embodiment 174, wherein said nanoscale drug delivery vehicles deliver a cargo to alveolar bone.

Embodiment 176: The method according to any one of embodiments 167-170, wherein said nanoscale drug delivery vehicles deliver a cargo locally to a topical, intradermal, or subdermal site.

Embodiment 177: The method according to any one of embodiments 167-170, wherein said nanoscale drug delivery vehicles deliver a cargo to calvarial skin and/or to underlying bone.

Embodiment 178: The method according to any one of embodiments 167-170, wherein said nanoscale drug delivery vehicles are applied to the oral mucosa.

Embodiment 179: A method of making a deformable nanoscale drug delivery vehicle according to any one of embodiments 85-117, said method comprising: combining DNV building blocks in organic and aqueous phases in microchannels at a controlled flow ratio and pressure; and collecting the resulting samples containing DNVs.

Embodiment 180: The method of embodiment 179, wherein the samples are dialyzed to produce a dialyzed sample.

Embodiment 181: The method according to any one of embodiments 179-180, wherein the dialized sample is lyophilized to a powder.

Definitions

The terms "subject", "individual", and "patient" interchangeably refer to a mammal, preferably a human or a non-human primate, but also domesticated mammals (e.g., canine or feline), laboratory mammals (e.g., mouse, rat, rabbit, hamster, guinea pig) and agricultural mammals (e.g., equine, bovine, porcine, ovine). In various embodiments, the subject can be a human (e.g., adult male, adult female, adolescent male, adolescent female, male child, female child) under the care of a physician or other health worker in a hospital, psychiatric care facility, as an outpatient, or other clinical context. In certain embodiments the subject may not be under the care or prescription of a physician or other health worker.

The term "formulation" or "drug formulation" or "dosage form" or "pharmaceutical formulation" as used herein refers to a composition containing at least one therapeutic agent or medication for delivery to a subject. In certain embodiments the dosage form comprises a given "formulation" or "drug formulation" and may be administered to a patient in the form of a lozenge, pill, tablet, capsule, suppository, membrane, strip, liquid, patch, film, gel, spray or other form.

As used herein, an "antibody" refers to a protein consisting of one or more polypeptides substantially encoded by immunoglobulin genes or fragments of immunoglobulin genes. The recognized immunoglobulin genes include the kappa, lambda, alpha, gamma, delta, epsilon and mu constant region genes, as well as myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD, and IgE, respectively.

A typical immunoglobulin (antibody) structural unit is known to comprise a tetramer. Each tetramer is composed of two identical pairs of polypeptide chains, each pair having one "light" (about 25 kD) and one "heavy" chain (about 50-70 kD). The N-terminus of each chain defines a variable region of about 100 to 110 or more amino acids primarily responsible for antigen recognition. The terms variable light chain ($V_L$) and variable heavy chain ($V_H$) refer to these light and heavy chains respectively.

Antibodies exist as intact immunoglobulins or as a number of well characterized fragments produced by digestion with various peptidases. Thus, for example, pepsin digests an antibody below the disulfide linkages in the hinge region to produce F(ab)'$_2$, a dimer of Fab which itself is a light chain joined to $V_H$-$C_H$1 by a disulfide bond. The F(ab)'$_2$ may be reduced under mild conditions to break the disulfide linkage in the hinge region thereby converting the (Fab')$_2$ dimer into a Fab' monomer. The Fab' monomer is essentially a Fab with part of the hinge region (see, *Fundamental Immunology*, W. E. Paul, ed., Raven Press, N.Y. (1993), for a more detailed description of other antibody fragments).

While various antibody fragments are defined in terms of the digestion of an intact antibody, one of skill will appreciate that such Fab' fragments may be synthesized de novo either chemically or by utilizing recombinant DNA methodology. Thus, the term antibody, as used herein also includes antibody fragments either produced by the modification of whole antibodies or synthesized de novo using recombinant DNA methodologies. Preferred antibodies include single chain antibodies (antibodies that exist as a single polypeptide chain), more preferably single chain Fv antibodies (sFv or scFv) in which a variable heavy and a variable light chain are joined together (directly or through a peptide linker) to form a continuous polypeptide. The single chain Fv antibody is a covalently linked $V_H$-$V_L$ heterodimer which may be expressed from a nucleic acid including $V_H$- and $V_L$-encoding sequences either joined directly or joined by a peptide-encoding linker. Huston, et al. (1988) Proc. Nat. Acad. Sci. USA, 85: 5879-5883. While the $V_H$ and $V_L$ are connected to each as a single polypeptide chain, the $V_H$ and $V_L$ domains associate non-covalently. The first functional antibody molecules to be expressed on the surface of filamentous phage were single-chain Fv's (scFv), however, alternative expression strategies have also been successful. For example Fab molecules can be displayed on phage if one of the chains (heavy or light) is fused to g3 capsid protein and the complementary chain exported to the periplasm as a soluble molecule. The two chains can be encoded on the same or on different replicons; the important point is that the two antibody chains in each Fab molecule assemble post-translationally and the dimer is incorporated into the phage particle via linkage of one of the chains to, e.g., g3p (see, e.g., U.S. Pat. No. 5,733,743). The scFv antibodies and a number of other structures converting the naturally aggregated, but chemically separated light and heavy polypeptide chains from an antibody V region into a molecule that folds into a three dimensional structure substantially similar to the structure of an antigen-binding site are known to those of skill in the art (see e.g., U.S. Pat. Nos. 5,091,513, 5,132,405, and 4,956,778). Particularly preferred antibodies should include all that have been displayed on phage (e.g., scFv, Fv, Fab and disulfide linked Fv (Reiter et al. (1995) Protein Eng. 8: 1323-1331).

BRIEF DESCRIPTION OF THE DRAWINGS

FIG. 5A shows an image of the application site on the mouse oral mucosa. FIG. 5B shows an LAS-3000 image of excised gingival tissue 48 h post application. Note site (ii) exhibits minimal fluorescence, suggesting high permeation of applied loaded DNVs. FIG. 5C shows an LAS-3000 image of alveolar bone underlying the application site, showing that DNVs permeated through oral mucosa and delivered bone-targeting fluorescent tag, without systemic leakage, as indicated by unlabeled femur bones.

FIG. 7A is an image showing application site; shaved skin above the skull, between the ears. FIG. 7B shows an LAS-3000 fluorescent image of excised calvarial skin from mice 48 hours after application.

FIG. 11A illustrates active ester coupling. FIG. 11B illustrates click chemistry. As shown in FIG. 11B, DDPE was conjugated to Small molecule using carbodiimide chemistry. DDPE was conjugated to Small molecule using click chemistry. After purification DDPE-brain targeting molecule derivative conjugate was lyophilized and stored at −20° C. until required for T-DNV synthesis. DDPE-molecule derivative can be used in microfluidics to prepare brain targeting DNV. This conjugate allows preparation of T-DNV in a pharmaceutically amenable grade for scalability and reproducibility. X=amide or a triazole.

Samples from the basolateral chamber are analyzed to determine the permeability coefficient.

Figure 17:
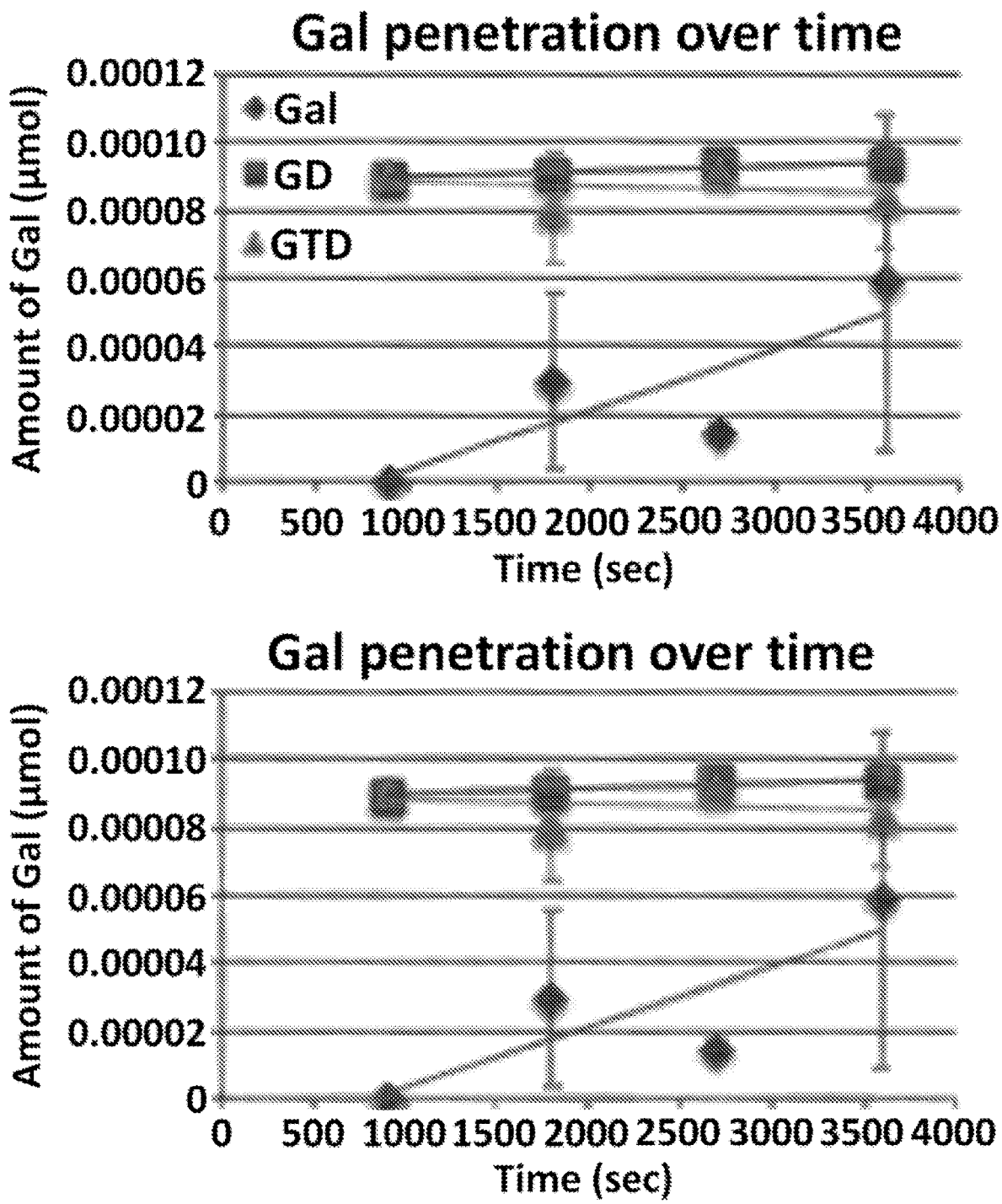

FIG. 17. Top: Galangin penetration over time (μmol/sec). Bottom: Resveratrol penetration over time (μmol/sec). Gal: Galangin; GD: Galangin DNV; GTD: Galangin DNV with transferrin; Res: Resveratrol; RD: Resveratrol DNV; RTD: Resveratrol DNV with transferrin.

Figure 18:
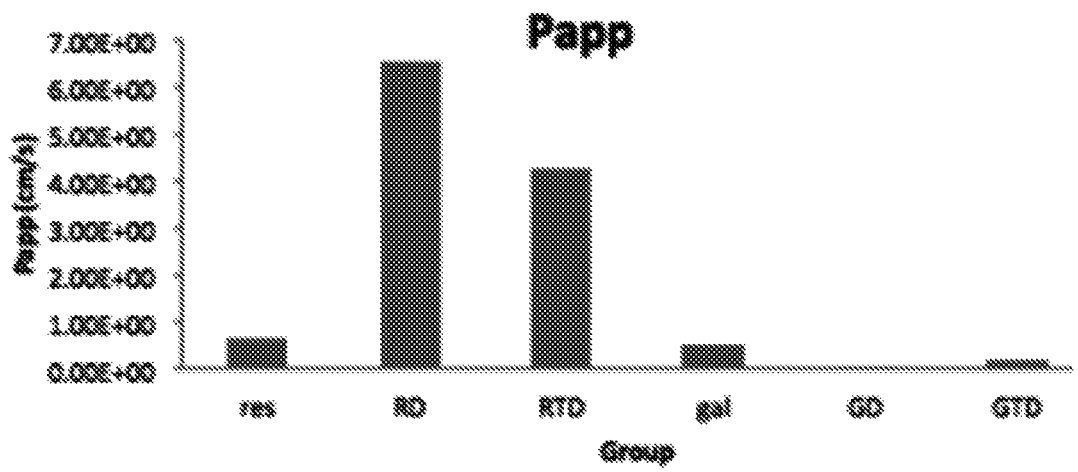

FIG. 18. Permeability coefficient ($P_{app}$) for each compound.

Figure 19A:
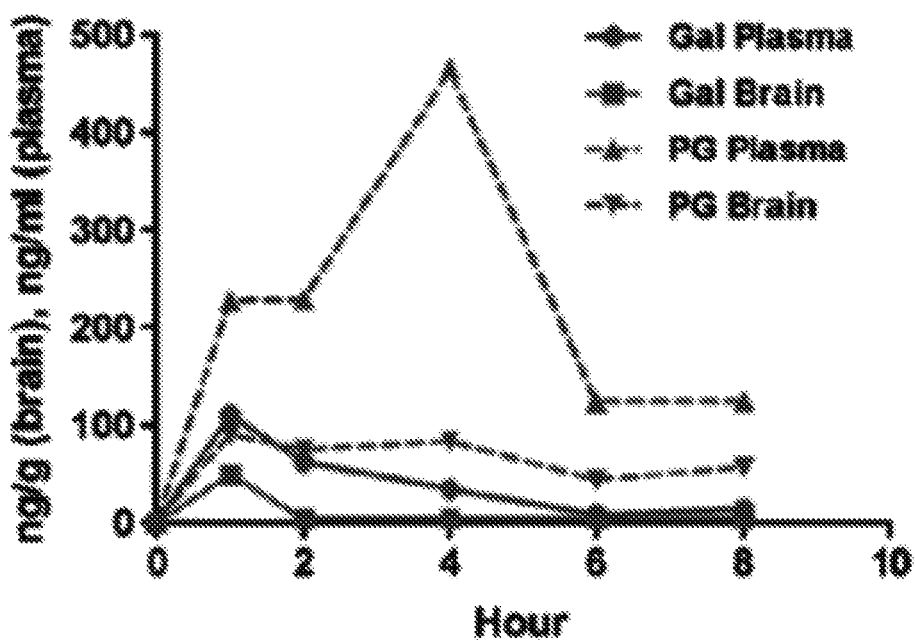
Figure 19B:
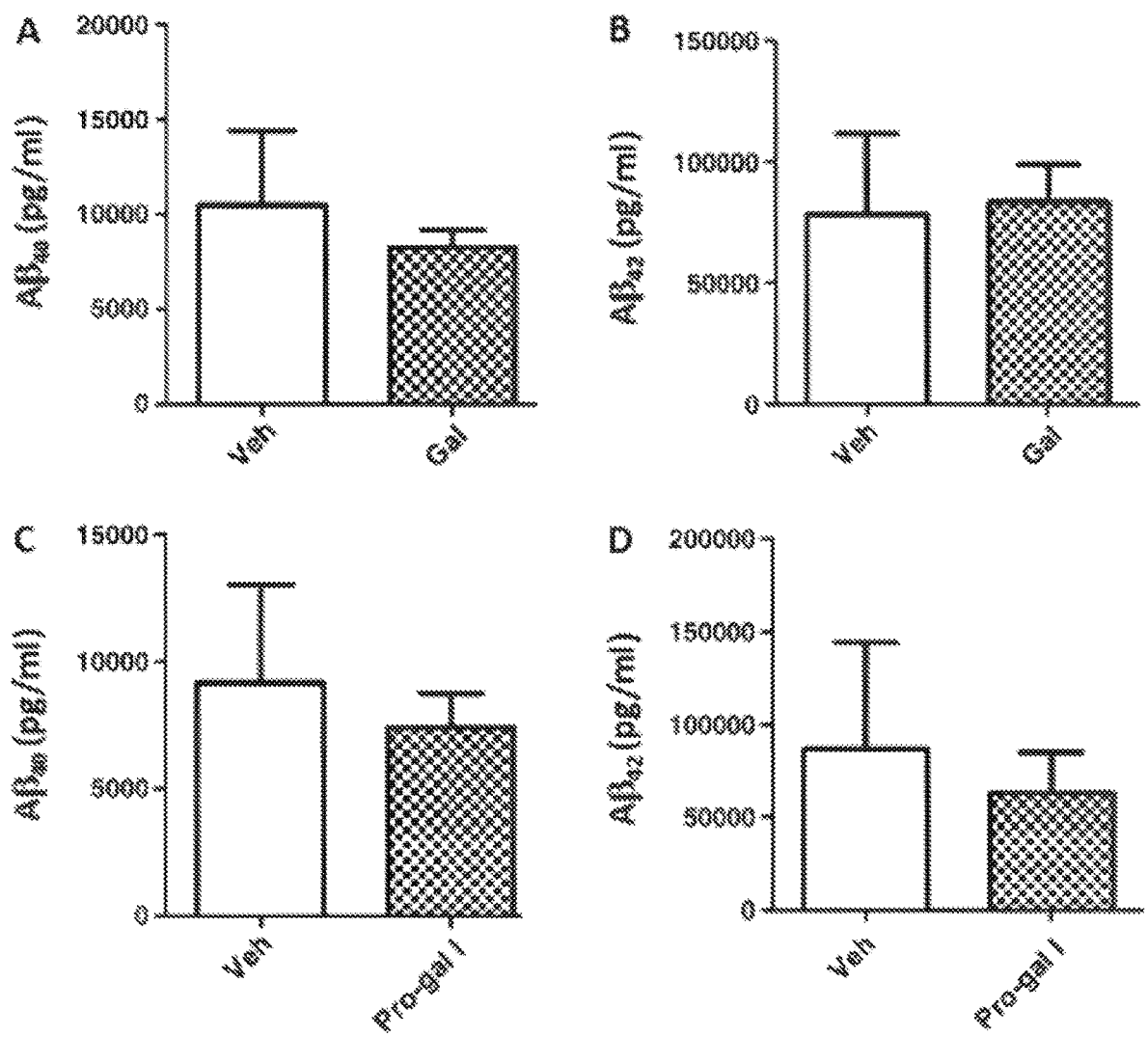

FIG. 19A shows the brain and plasma levels of galangin and progalangin as a function of time after administration. FIG. 19B shows the effects of galangin and progalangin on $A\beta_{40}$ and $A\beta_{42}$.

Figure 20:
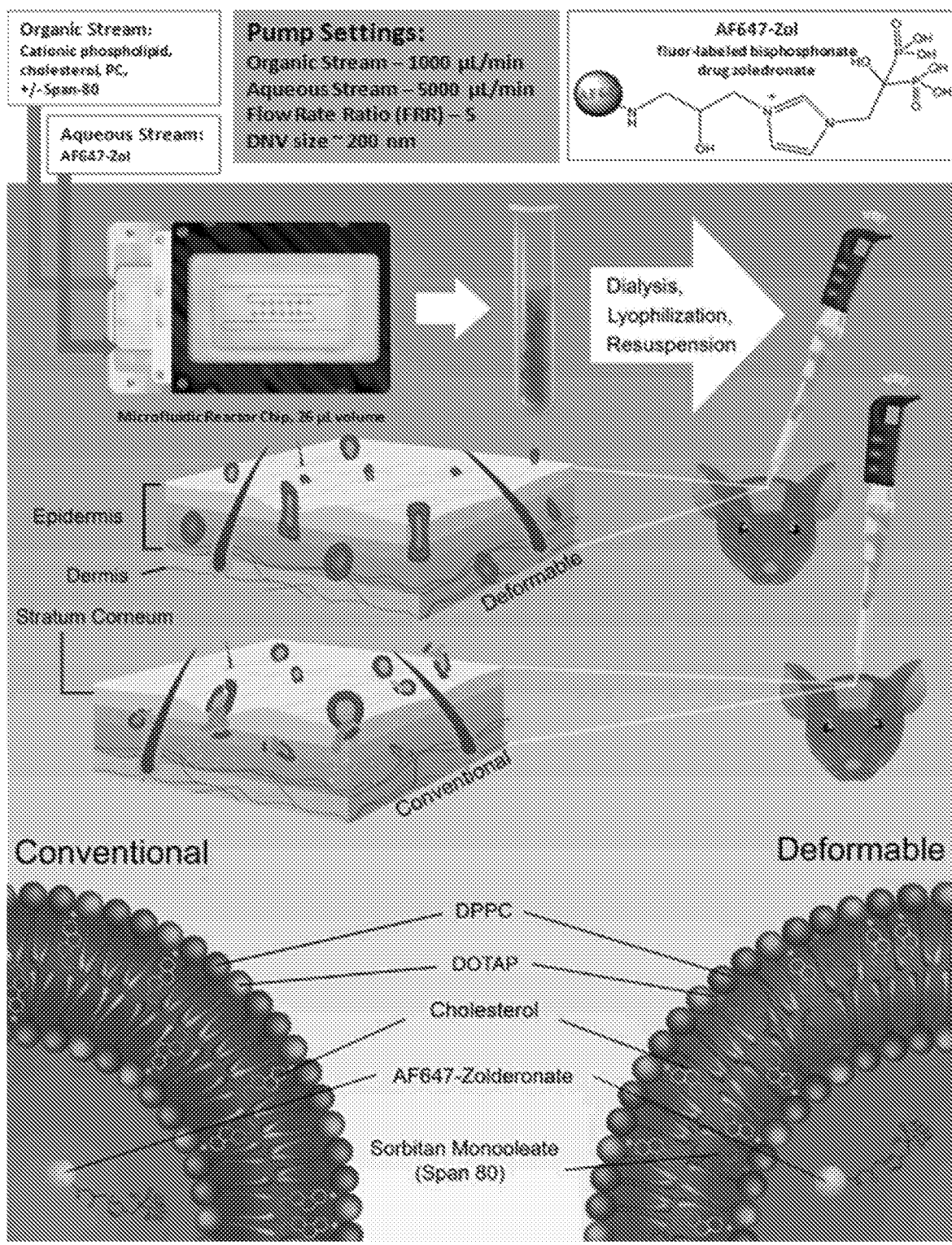

FIG. 20 illustrates reactor settings in one embodiment of the preparation of a DNV (top) and illustrates certain differences between DNV(s) and conventional liposomes (bottom).

Figure 21A:
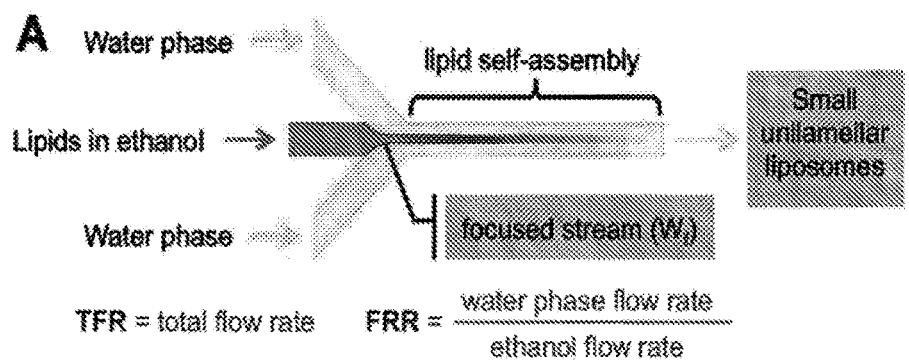
Figure 21B:
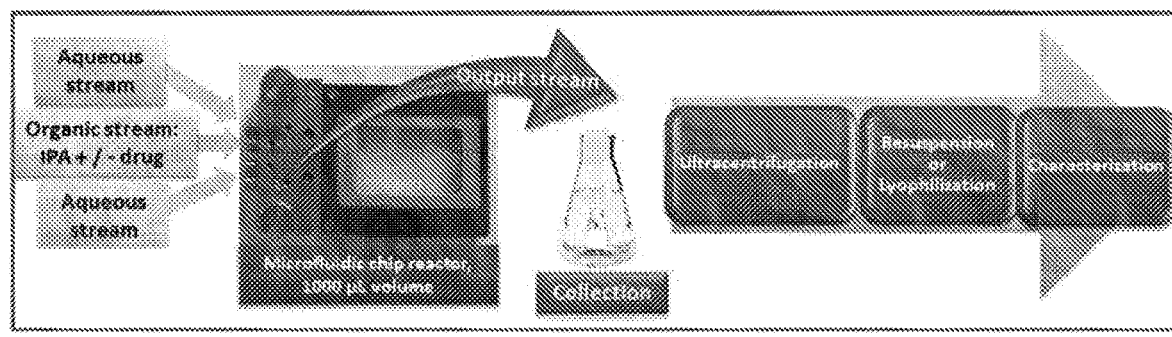

FIGS. 21A and 21B illustrate the synthesis of DNVs using a microfluidic reactor.

Figure 22:
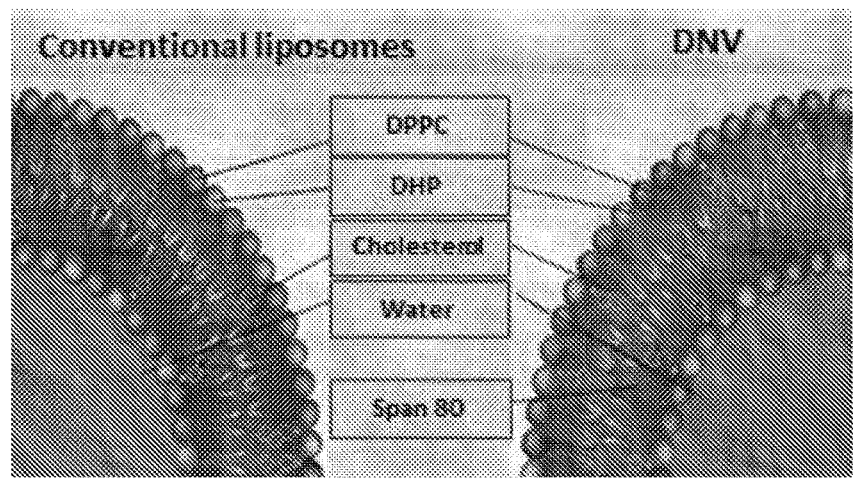

FIG. 22 shows a comparison of DNV(s) and conventional liposomes.

Figure 23:
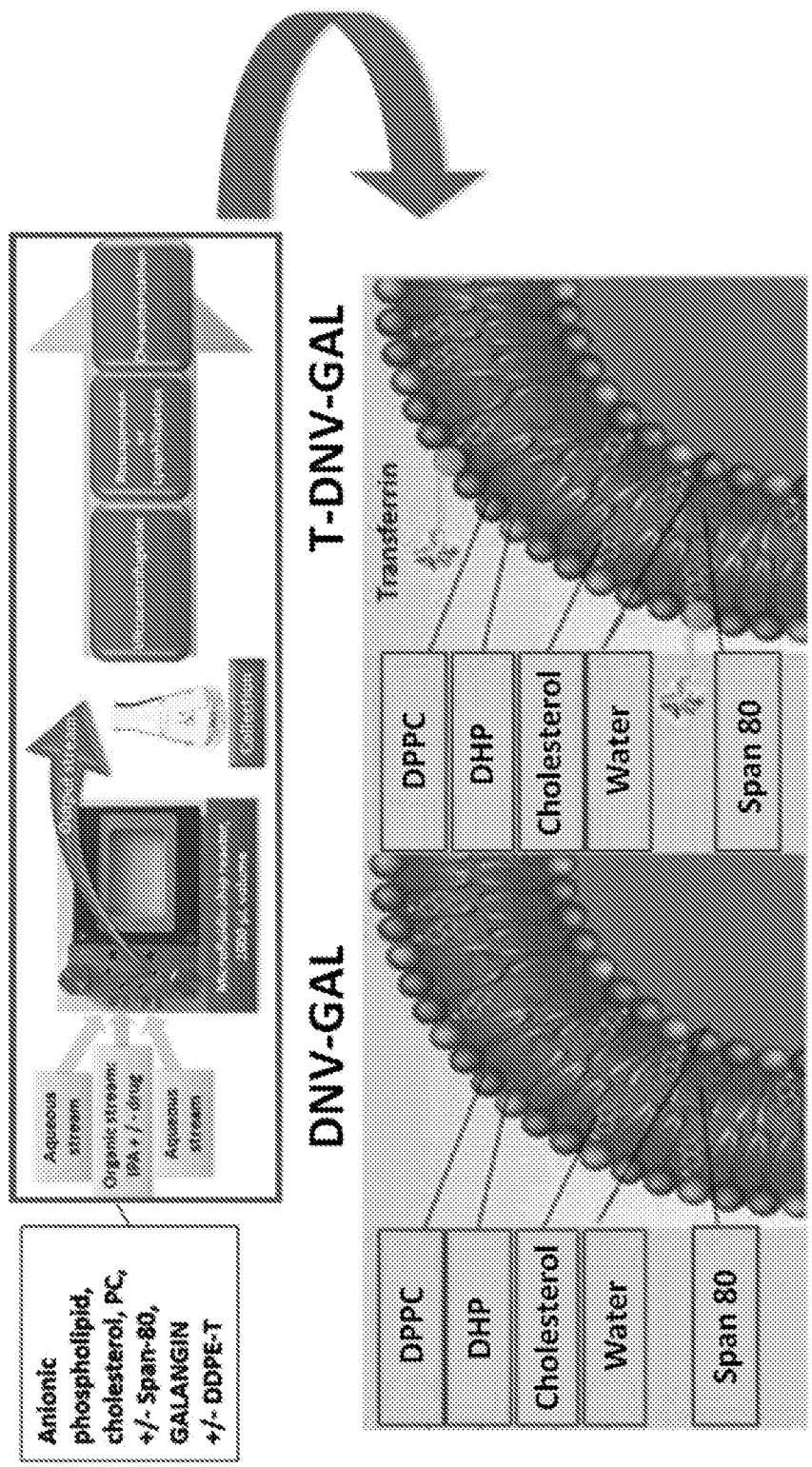

FIG. 23 illustrates the fabrication (top) and structure (bottom) of DNV(s) functionalized with transferrin.

Figure 24:
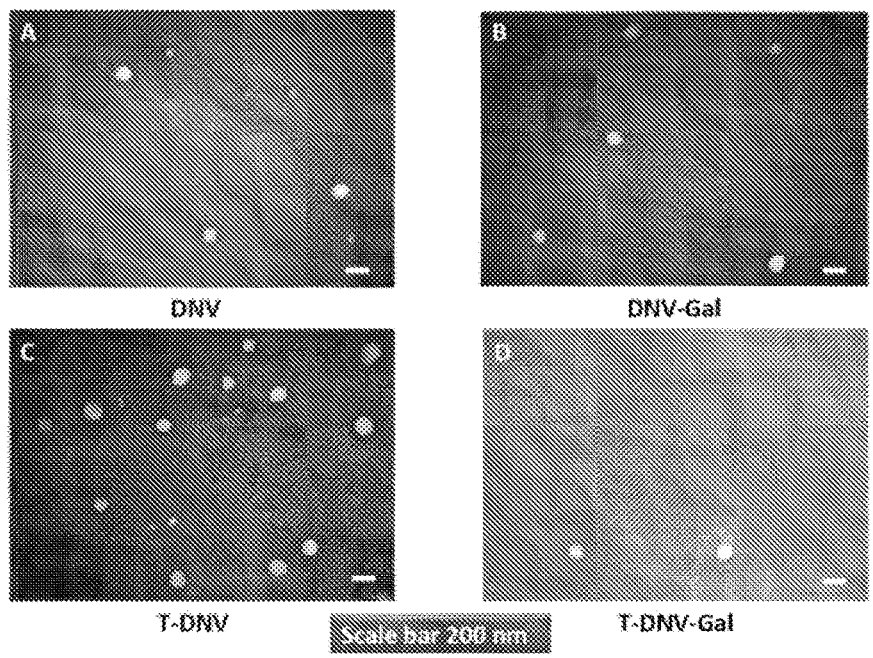

FIG. 24 shows images of DNV(s), DNV(s) containing galangin (DNV-Gal), empty DNVs functionalized with transferrin (T-DNV), and DNV(s) containing galangin and functionalized with transferrin (T-DNV-Gal).

Figure 25:
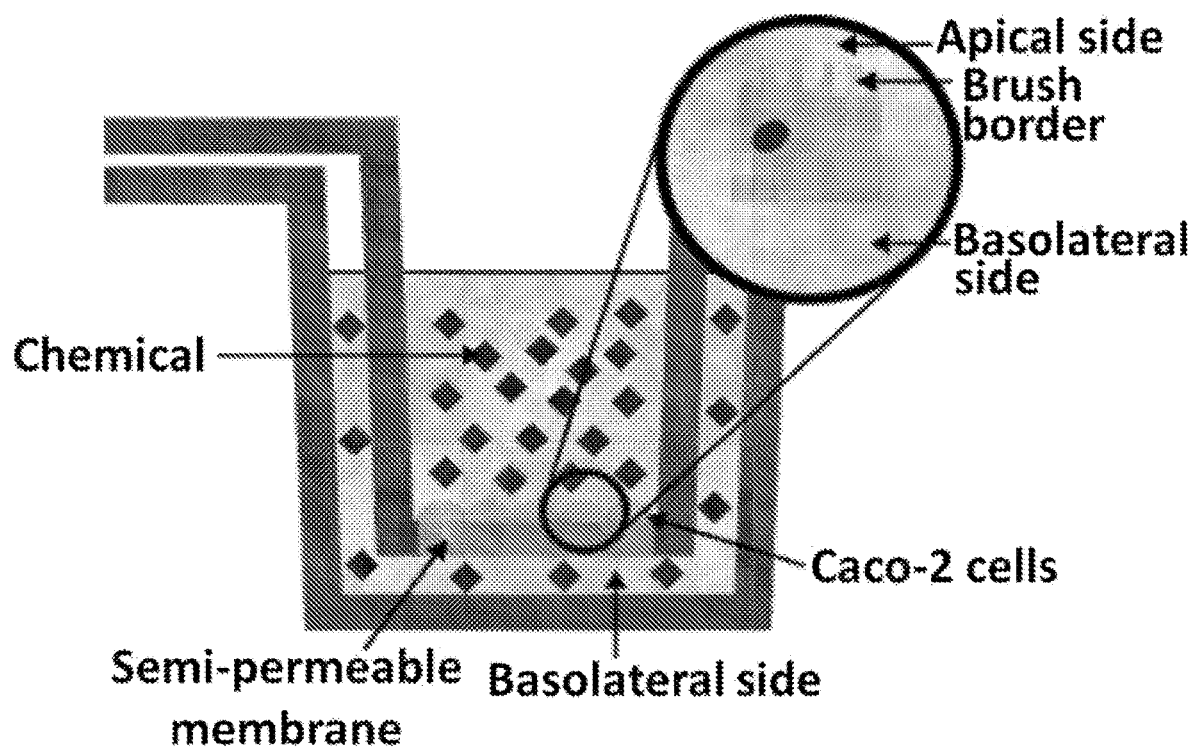

FIG. 25 illustrates the configuration of an apical chamber to evaluate DNV penetration of a tight cell layer.

Figure 26:
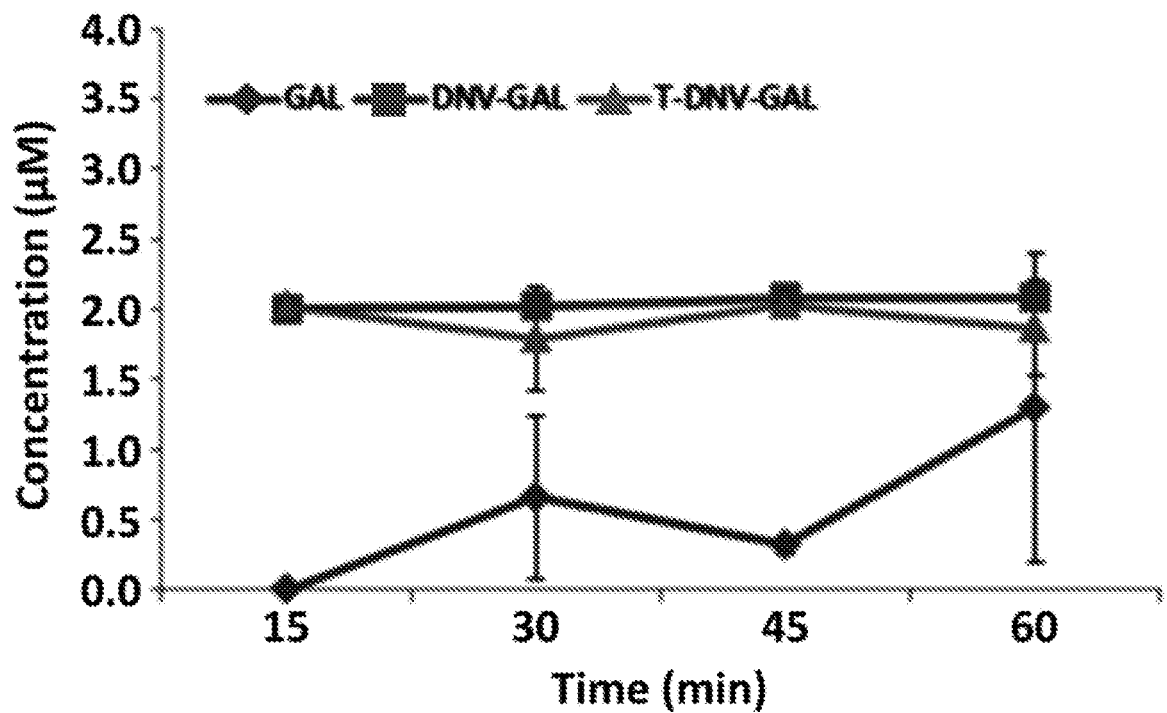

FIG. 26 shows permeability of Gal, DNV-Gal, and T-DNV-Gal in a CACO-2 cell permeability model.

Figure 27:
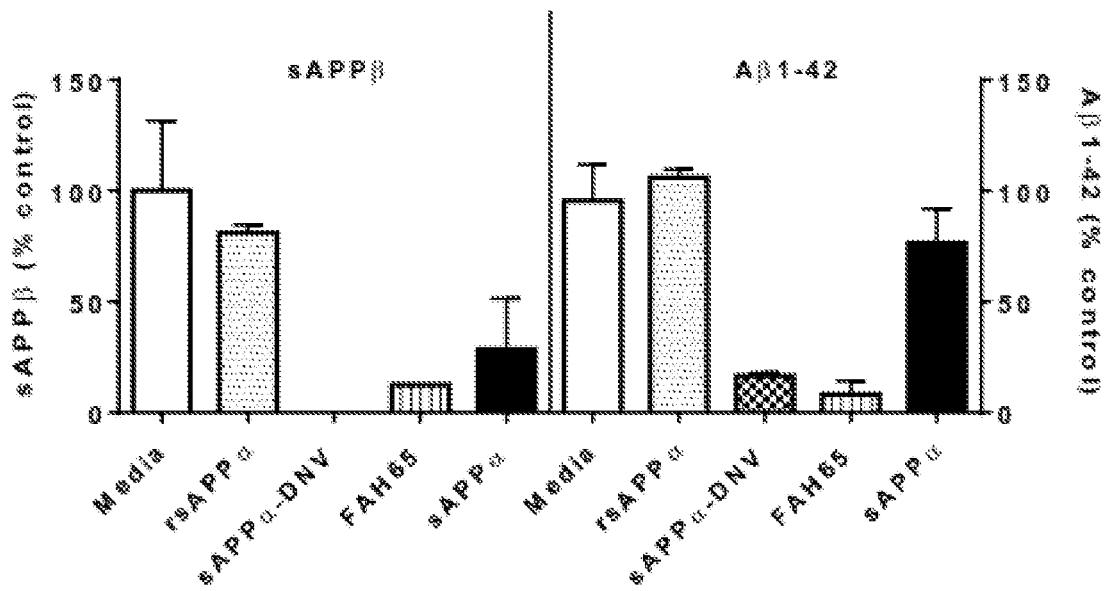

FIG. 27 shows the results of an in vitro functional assay for DSNVs incorporating sAPPα. A reduction in sAPPβ and Aβ1-42 indicates target engagement.

Figure 28:
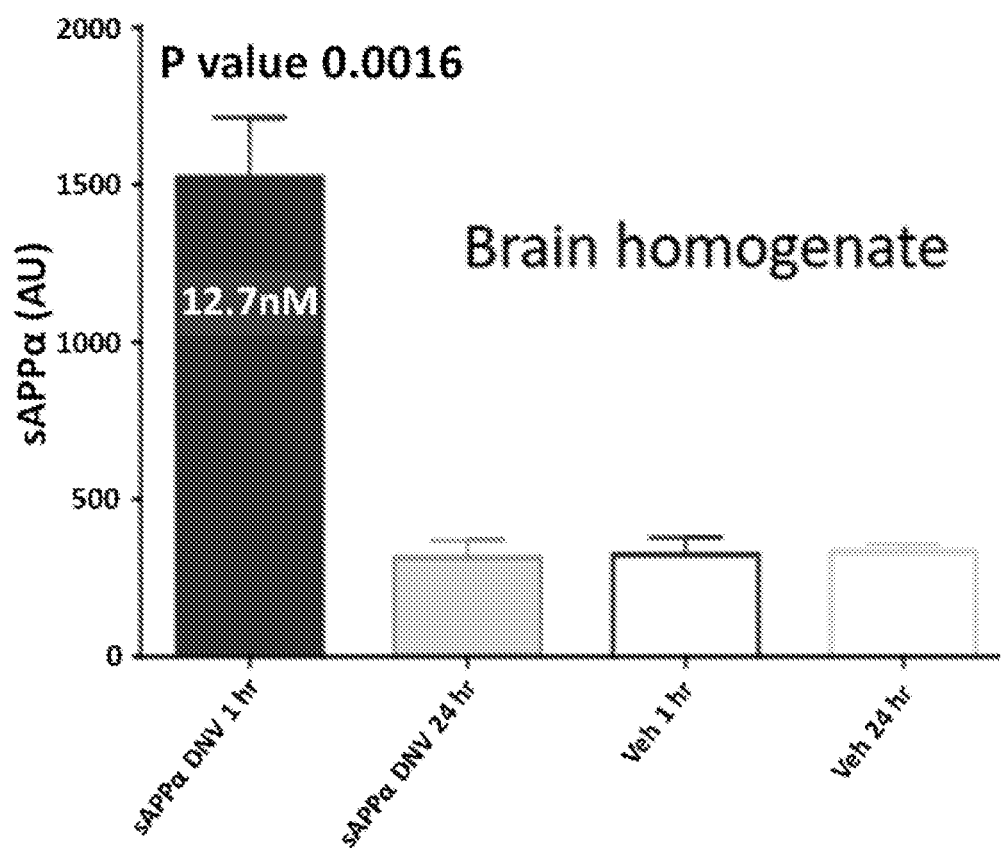

FIG. 28 shows pharmacokinetics (PK) for sAAPα-DNVs illustrating proof of concept delivery in mice using an i.v. route.

Figure 29:
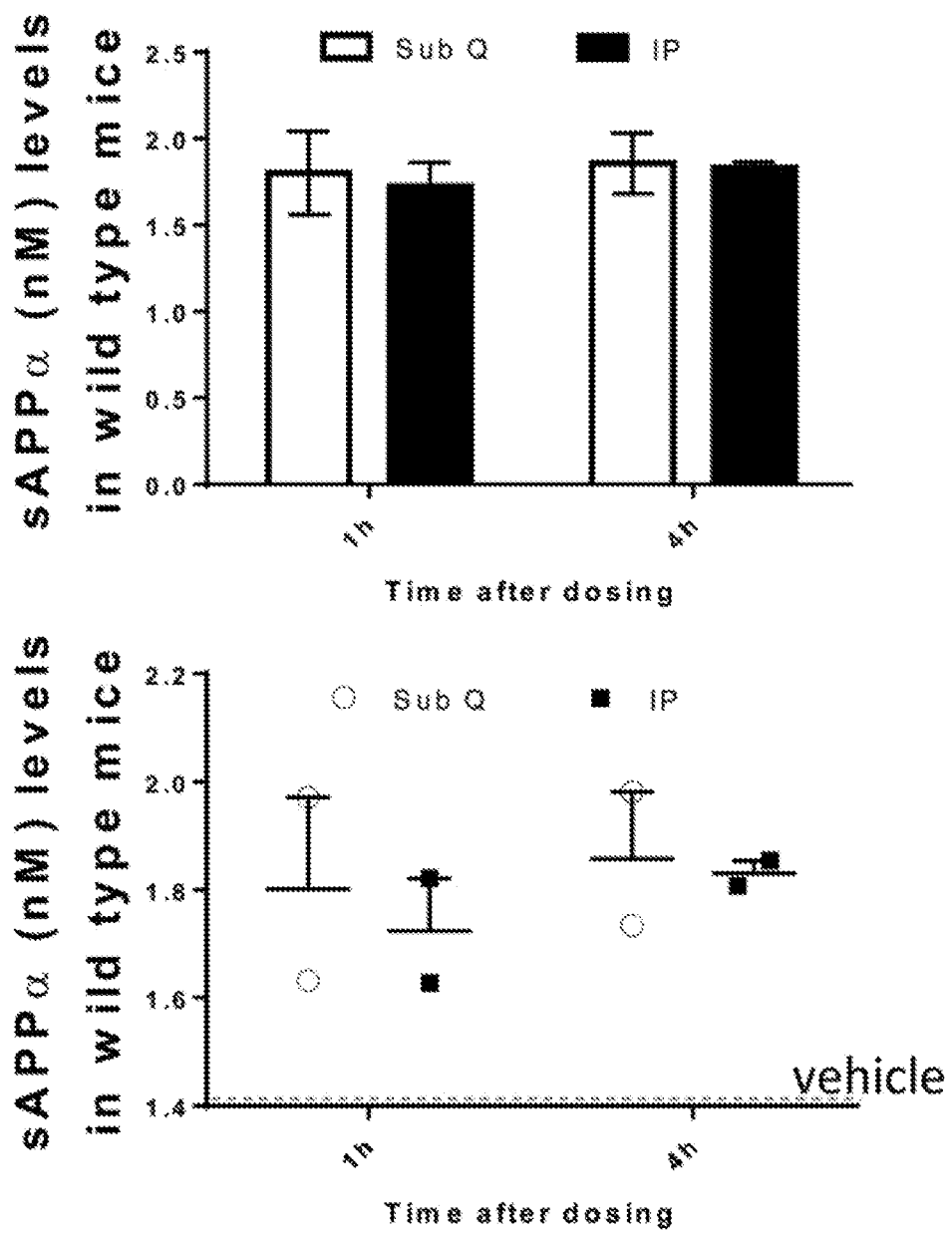

FIG. 29 illustrates CNS delivery using sAPPα-DNVs in vivo.

Figure 30:
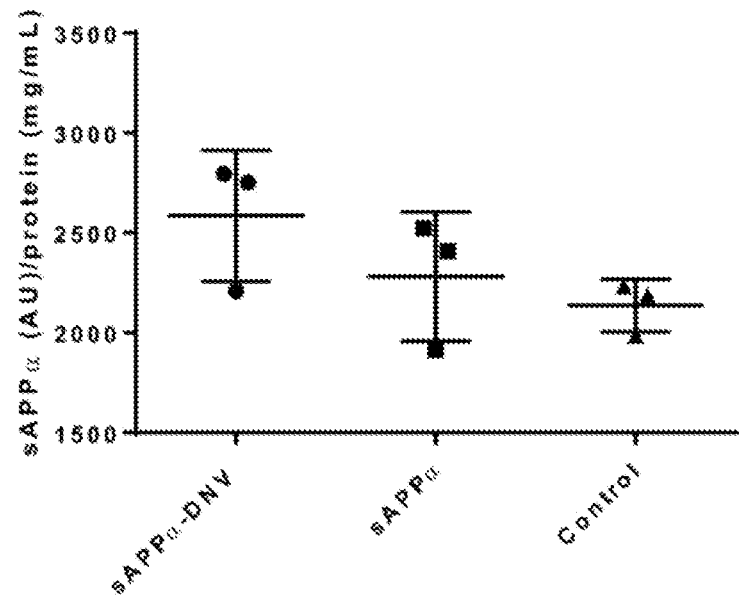
Figure 30:
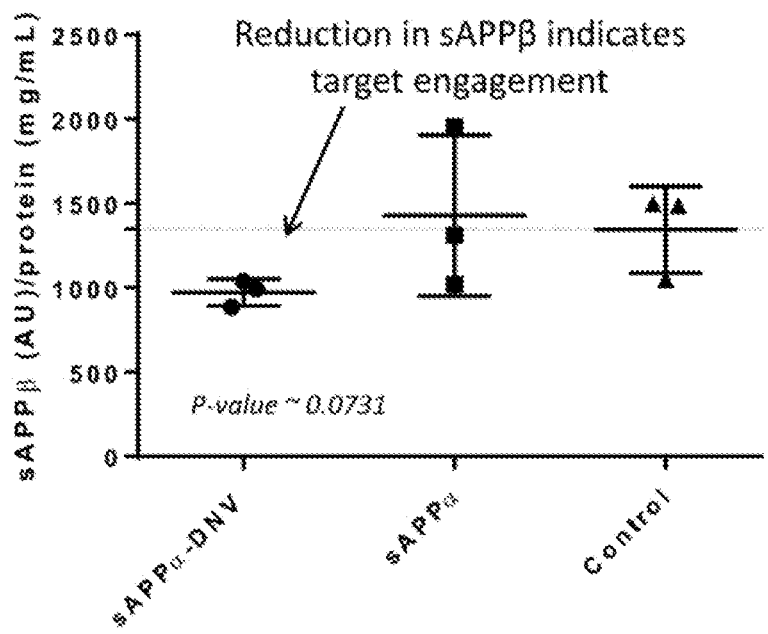

FIG. 30 shows a pharmacodynamic effect of brain delivered sAPPα in E4FAD mice. sAPPα decreases levels of BACE cleaved sAPPβ.

Figure 31:
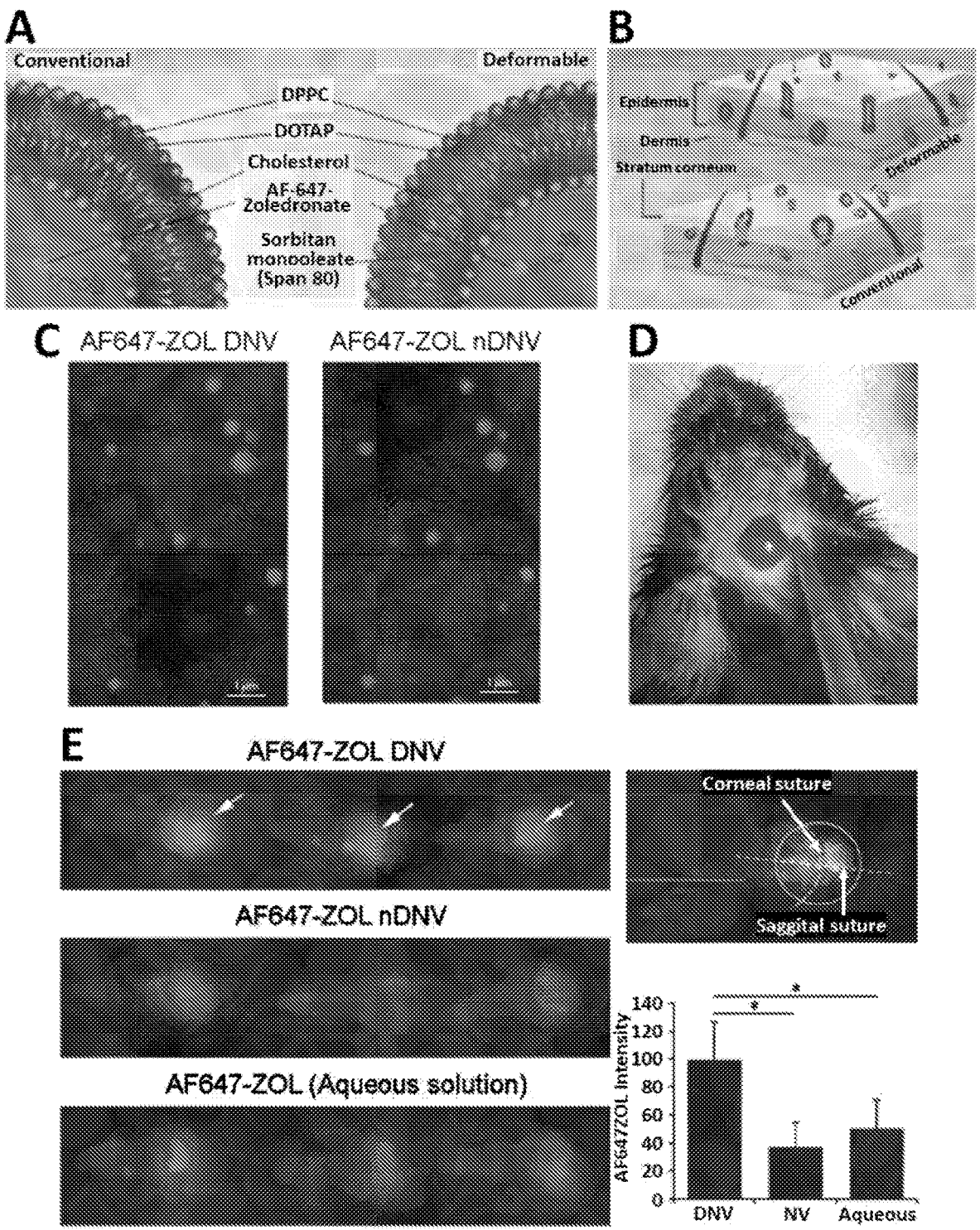

FIG. 31, panels A-E, illustrates transcutaneous drug deliver using deformable nano-scale vesicles (DNVLs). Panel A) DNVs design. Panel B) Cross-section of epidermis. Panel C) Fluorescently-labeled bisphosphonate drug zoledronate formulated in DNV. Panel D) AF647-ZOL DNV powder resuspended and applied on mouse calvarial skin. Panel E) Delivery to calvarial bone of AF647-AOL DNVs through cutaneous tissue.

Figure 32:
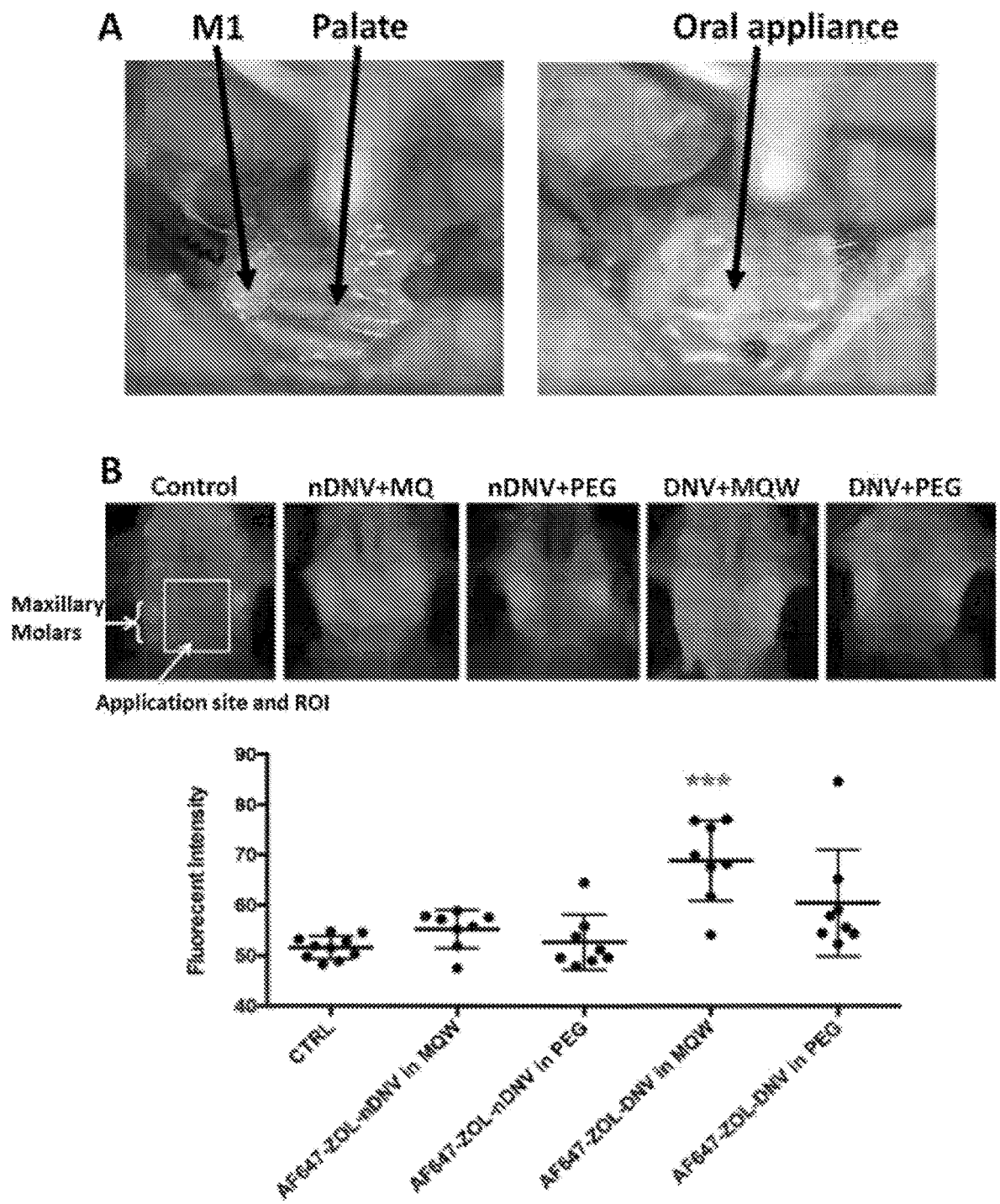

FIG. 32, panels A and B, illustrate intra-oral application through trans-oral mucosa drug delivery. Panel A) Resuspended AF647-ZOL DNV powder applied to palatal mucosa tissue. Panel B) AF647-ZOL adhered to palatal bone surface demonstrating transcutaneous delivery.

DETAILED DESCRIPTION

In various embodiments deformable nano-scale vehicles (DNV) are provided that are useful for the delivery of therapeutic agents. In certain embodiment the deformable nano-scale vehicles (DNVs) are elastic nanoparticles, composed of phospholipids such as 1,2-dipalmitoyl-sn-glycero-3-phosphocholine (DPPC), N-(2,3-dioleoyloxy-1-propyl) trimethylammonium (DOTAP), and/or 1,2-dioleoyl-sn-glycero-3-phosphoethanolamine (DOPE). In various embodiments, in addition to phospholipids, DNVs contain cholesterol which can act as a membrane regulator, and a non-ionic detergent which can act as an edge activator (illustrative, but non-limiting formulations use Span 80 (also known as sorbitan laurate, or sorbitan monolaurate) and/or Tween 20 (also known as polyethylene glycol sorbitan monolaurate, or polyoxyethylenesorbitan monolaurate) that confers deformability to the lipid bilayer of the nanoparticle.

In various embodiments the DNVs described herein are capable of crossing the blood-brain barrier (BBB) and can be used to deliver a cargo (e.g., one or more therapeutic agent(s) as described herein) to the brain/CNS. Such delivery across the blood-brain barrier can be accomplished by administration of the DNVs according to any of a number of modalities including, but not limited to, aerosol administration including nasal inhalation, oral inhalation, and the like, oral delivery, isophoretic delivery, subdermal delivery, transdermal delivery, parenteral delivery, intravenous administration, intra-arterial administration, depot delivery, and rectal administration.

In certain embodiments the DNVs are provided in transdermal patches for delivery of cargo across the blood-brain barrier (BBB) to the central nervous system (CNS). In addition to methods of synthesizing the DNVs themselves, transdermal patches loaded with CNS-targeted DNVs for delivery of cargo (drugs, proteins, antibodies, RNA or DNA) to the brain are provided.

In certain embodiments the DNVs can be provided as patch, capsule, liquid (and the like) for non-CNS localized delivery of DNVs. In some cases, very localized non-CNS delivery is required for effective treatment, with avoidance of systemic distribution of DNVs. DNVs with increased charge and therefore restricted distribution can be synthesized.

In certain embodiments targeted DNVs are contemplated. Both inside and outside of the CNS it may be desirable to limit deliver of the cargo (drug, protein, etc.) to a specific cell type, for example a tumor cell. Accordingly DNVs are provided that are decorated on the exterior with ligands that interact specifically with a target cell, for example folic acid to target FA receptor-expressing cells or transferrin (Tf) to interact with the transferrin receptor on the BBB. Other illustrative targets are shown below in Table 1.

DNVs.

In various embodiments the DNVs contemplated herein comprise one or more vesicle-forming lipids, generally including amphipathic lipids having both hydrophobic tail groups and polar head groups, cholesterol, and a detergent. A characteristic of a vesicle-forming lipid is its ability to either (a) form spontaneously into bilayer vesicles in water, as exemplified by the phospholipids, or (b) be stably incorporated into lipid bilayers, by having the hydrophobic portion in contact with the interior, hydrophobic region of the bilayer membrane, and the polar head group oriented toward the exterior, polar surface of the membrane. In certain embodiments a vesicle-forming lipid for use in the DNVs may include any conventional lipid possessing one of the characteristics described above.

In certain embodiments the vesicle-forming lipids of this type are those having two hydrocarbon tails or chains, typically acyl groups, and a polar head group. Included in this class are the phospholipids, such as phosphatidylcholine (PC), phosphatidylethanolamine (PE), phosphatidic acid (PA), phosphatidylglycerol (PG), and phosphatidylinositol (PI), where the two hydrocarbon chains are typically between about 14-22 carbon atoms in length, and have varying degrees of unsaturation. In certain embodiments suitable phospholipids include PE and PC. One illustrative PC is hydrogenated soy phosphatidylcholine (HSPC). Single chain lipids, such as sphingomyelin (SM), and the like can also be used. In certain embodiments the phospholipids comprise one or more phospholipids such as 1,2-Dipalmitoyl-sn-glycero-3-phosphocholine (DPPC), N-(2,3-Dioleoyloxy-1-propyl) trimethylammonium (DOTAP), and/or 1,2-Dioleoyl-sn-glycero-3-phosphoethanolamine (DOPE).

The above-described lipids and phospholipids whose acyl chains have a variety of degrees of saturation can be obtained commercially, or prepared according to published methods. Other lipids that can be included in certain embodiments are sphingolipids and glycolipids. The term "sphingolipid" as used herein encompasses lipids having two hydrocarbon chains, one of which is the hydrocarbon chain of sphingosine. The term "glycolipids" refers to sphingolipids comprising also one or more sugar residues.

In various embodiments the DNVs additionally include lipids that can stabilize the a DNV composed predominantly of phospholipids. An illustrative lipid of this group is cholesterol at levels between 20 to 45 mole percent.

In various embodiments the DNVs, can further include a surface coating of a hydrophilic polymer chain. In certain embodiments the hydrophilic polymer can be included in the DNV by including in the DNV composition one or more lipids (e.g., phospholipids) derivatized with a hydrophilic polymer chain which can be used include, but are not limited to any of those described above, however, in certain embodiments, vesicle-forming lipids with diacyl chains, such as phospholipids, are preferred. One illustrative phospholipid is phosphatidylethanolamine (PE), which contains a reactive amino group convenient for coupling to the activated polymers which can be coupled with targeting molecules such as transferrin, folic acid, and the like One illustrative PE is distearoyl PE (DSPE). Another example is non-phospholipid double chain amphiphilic lipids, such as diacyl- or dialkylglycerols, derivatized with a hydrophilic polymer chain.

In certain embodiments a hydrophilic polymer for use on a DNV to increase serum halflife and/or for coupling an antibody or ligand is polyethyleneglycol (PEG), in certain embodiments as a PEG chain having a molecular weight between 1,000-10,000 Daltons, or between 1,000-5,000 Daltons, or preferably between 2,000-5,000 Daltons. Methoxy or ethoxy-capped analogues of PEG are also useful hydrophilic polymers, commercially available in a variety of polymer sizes, e.g., 120-20,000 Daltons.

Other hydrophilic polymers that can be suitable include, but are not limited to polylactic acid, polyglycolic acid, polyvinylpyrrolidone, polymethyloxazoline, polyethyloxazoline, polyhydroxypropyl methacrylamide, polymethacrylamide, polydimethylacrylamide, and derivatized celluloses, such as hydroxymethylcellulose or hydroxyethylcellulose.

Preparation of lipid-polymer conjugates containing these polymers attached to a phospholipid have been described, for example in U.S. Pat. No. 5,395,619. In certain embodiments, typically, between about 0.1-20 mole percent of the polymer-derivatized lipid is included in the liposome-forming components during liposome formation. Polymer-derivatized lipids are also commercially available (e.g. SUNBRITE®, NOF Corporation, Japan.).

In various embodiments the hydrophilic polymer chains provide a surface coating of hydrophilic chains sufficient to extend the blood circulation time of the DNVs in the absence of such a coating.

In one illustrative an non-limiting embodiment, the lipids (including cholesterol) and the edge activator are present in an 85:15 w/w ratio.

The exact molar ratio and types of lipid components used are determined based on the intended application of the DNVs. For example, for trans-oral mucosal and trans-dermal topical application, in one illustrative, but non-limiting embodiment, a 5:3:2 molar ratio (DPPC:Cholesterol:DOTAP) is used, with the mixture containing 15% Span 80 by weight.

These components, dissolved in an organic solvent such as isopropyl alcohol (IPA) are combined with aqueous solution (PBS or DI water) via separate inputs into a microfluidic reactor system for efficient and continuous synthesis at a temperature ranging from 25° C. to 40° C. and 1 bar pressure. The microfluidic reactor channels provide high shear stress and controlled mixing, with minimized turbulence, resulting in well-defined DNV populations, and eliminating the need for post-processing such as sonication or extrusion to obtain appropriate or uniform size. Upon transitioning from organic to aqueous phase, the components described self-configure into DNVs, according to their thermodynamic stability in aqueous solvent. They are non-toxic, prepared with high reproducibly with little batch to batch variability, scalable, very homogenous in population and distribution, of tunable size, and provide highly localized payload delivery. Our research shows that this method can produce homogenous DNV populations with sizes from 50 nm to the micron range.

In certain embodiments the DNVs range in size from about 50 nm up, or from about 60 nm, or from about 70 nm, or from about 80 nm, or from about 90 nm, or from about 100 nm, up to about 10 µm, or up to about 5 µm, or up to about 1 µm, or up to about 900 nm, or up to about 800 nm, or up to about 700 nm, or up to about 600 nm, or up to about 500 nm, or up to about 400 nm, or up to about 300 nm average diameter. In certain embodiments the DNVs range in size from about 50 nm up to about 275 nm average diameter. In certain embodiments the DNVs are about 50 nm average diameter, or about 100 nm average diameter, or about 150 nm average diameter, or about 200 nm average diameter or about 250 nm average diameter.

Resultant DNV size can be tuned primarily by the adjustment of the flow rate ratio (FRR) between the aqueous phase and the organic, lipid containing, phase. Our investigations have shown that increasing the flow rate ratio directly decreases resultant DNV size as well as reducing size variability. For trans-oral mucosal and topical application, a FRR of 100 is used, to obtain DNVs with a size centered at 250 nm from the aforementioned components. Note that the same FRR may produce different sized DNVs, depending on the particular types of components used.

The DNVs can be synthesized to encapsulate various classes of drugs, including, but not limited to, small molecules, as well as proteins, RNA, and DNA. They can efficiently encapsulate both hydrophilic and hydrophobic drugs or other cargo. We can successfully synthesize DNVs encapsulating, inter alia, hydrophilic drugs such as fluorescein derivative, DNVs containing fluorescein isothiocyanate (FITC), and/or a fluorescently-tagged bone targeting drug or drugs with no tags. In the case of hydrophobic drugs, we actively use DNVs to encapsulate molecules with low water solubility such as but not limited to galangin. In case of proteins we actively use DNVs to encapsulate proteins such as but not limited to sAPPalpha and BDNF or in case of nucleic acids we actively use DNVs to encapsulate nucleic acids such as but not limited to miRNAs that affect disease targets in the brain. These DNVs are synthesized to be delivered through the blood brain barrier (trans-BBB delivery). The solubility of a given drug dictates the phase (organic or aqueous) that it is introduced in to the microfluidic reactor, with highest encapsulation when both drug and DNV components are in the same (organic) phase.

Another important tunable feature on the DNVs is charge. The charge on the DNVs will, in part, determine the degree of dispersion from the application site. DNVs of various charge concentrations (zeta potentials) can be created through the use of different combinations of charged phospholipid components. We have synthesized neutral (DPPC, cholesterol, DOPE), cationic (DPPC, cholesterol, DOTAP) and anionic (DPPC,cholesterol,DHP) DNVs. The amount of charge can be tuned by adjusting the concentration of a particular charged component in the DNV preparation mixture. By tuning charge, DNV delivery can be restricted to local delivery or permitted to allow systemic delivery.

In addition to size, cargo, deformability, and charge the half-life of DNVs can be increased by additional of polyethylene glycol (PEG) or other polymers. Depending upon the therapeutic goal, addition of PEG is an option.

Targeted DNVs.

In addition to cargo, size, and deformability, DNVs may be synthesized that are "decorated" on the exterior with targeting agents such as, but not limited to, transferrin or folic acid to allow targeting of cells that express transferrin ((Tf)or folic acid receptors, respectively. These receptors are often expressed on the BBB or tumor cells and therefore DNV with these targeting agents could bind and cross the BBB and these cells can be targeted. Other cell types may specifically be targeted by use of other ligands on the DNV surface.

Generally, the targeting agents can associate with any target of interest, such as a target associated with an organ, tissues, cell, extracellular matrix or intracellular region. In certain embodiments, a target can be associated with a particular disease state, such as a cancerous condition. In some embodiments, the targeting agent can be specific to only one target, such as a receptor. Suitable targets can include, but are not limited to, a nucleic acid, such as a DNA, RNA, or modified derivatives thereof. Suitable targets can also include, but are not limited to, a protein, such as an extracellular protein, a receptor, a cell surface receptor, a tumor-marker, a transmembrane protein, an enzyme or an antibody. Suitable targets can include a carbohydrate, such as a monosaccharide, disaccharide or polysaccharide that can be, for example, present on the surface of a cell.

In certain embodiments, a targeting agent can include a target ligand (e.g., an RGD-containing peptide), a small molecule mimic of a target ligand (e.g., a peptide mimetic ligand) or an antibody or antibody fragment specific for a particular target. In some embodiments, a targeting agent can further include folic acid derivatives, B-12 derivatives, integrin RGD peptides, NGR derivatives, somatostatin derivatives or peptides that bind to the somatostatin receptor, e.g., octreotide and octreotate, and the like. In certain embodiments the targeting agents can also include an aptamer. Aptamers can be designed to associate with or bind to a target of interest. Aptamers can be comprised of, for example, DNA, RNA and/or peptides, and certain aspects of aptamers are well known in the art (see, e.g., Klussman, S., Ed., The Aptamer Handbook, Wiley-VCH (2006); Nissenbaum (2008) *Trends in Biotech.* 26(8): 442-449; and the like).

In certain embodiments the DNV is attached to a ligand or antibody that binds to a cell surface marker. In certain embodiments the marker is a tumor marker and the antibody/ligand can serve to direct/localize the DNV at a cancer cell (e.g., a tumor site).

An illustrative, but not limiting list of suitable tumor markers is provided in Table 1. Antibodies to these and other cancer markers are known to those of skill in the art and can be obtained commercially or readily produced, e.g. using phage-display technology.

TABLE 1

Illustrative cancer markers and associated references, all of which are incorporated herein by reference for the purpose of identifying the referenced tumor markers.

| Marker | Reference |
| --- | --- |
| 5 alpha reductase | Délos et al. (1998) *Int J Cancer*, 75: 6 840-846 |
| α-fetoprotein | Esteban et al. (1996) *Tumour Biol.*, 17(5): 299-305 |
| AM-1 | Harada et al. (1996) *Tohoku J Exp Med.*, 180(3): 273-288 |
| APC | Dihlmannet al. (1997) *Oncol Res.*, 9(3) 119-127 |
| APRIL | Sordat et al. ('998) *J Exp Med.*, 188(6): 1185-1190 |
| BAGE | Böel et al. (1995) *Immunity*, 2: 167-175. |
| β-catenin | Hugh et al. (1999) *Int J Cancer*, 82(4): 504-11 |
| Bc12 | Koty et al. (1999) *Lung Cancer*, 23(2): 115-127 |
| bcr-abl (b3a2) | Verfaillie et al. ('996) *Blood*, 87(11): 4770-4779 |
| CA-125 | Bast et al. ('998) *Int J Biol Markers*, 13(4): 179-187 |
| CASP-8/FLICE | Mandruzzato et al. (1997) *J Exp Med.*, 186(5): 785-793. |
| Cathepsins | Thomssen et al. (1995) *Clin Cancer Res.*, 1(7): 741-746 |
| CD19 | Scheuermann et al. (1995) *Leuk Lymphoma*, 18(5-6): 385-397 |
| CD20 | Knox et al. (1996) *Clin Cancer Res.*, 2(3): 457-470 |
| CD21, CD23 | Shubinsky et al. (1997) *Leuk Lymphoma*, 25(5-6): 521-530 |
| CD22, CD38 | French et al. (1995) *Br J Cancer*, 71(5): 986-994 |
| CD33 | Nakase et al. (1996) *Am J Clin Pathol.*, 105(6): 761-768 |
| CD35 | Yamakawa et al. *Cancer*, 73(11): 2808-2817 |
| CD44 | Naot et al. (1997) *Adv Cancer Res.*, 71: 241-319 |
| CD45 | Buzzi et al. (1992) *Cancer Res.*, 52(14): 4027-4035 |
| CD46 | Yamakawa et al. (1994) *Cancer*, 73(11): 2808-2817 |
| CD5 | Stein et al. (1991) *Clin Exp Immunol.*, 85(3): 418-423 |
| CD52 | Ginaldi et al. (1998) *Leuk Res.*, 22(2): 185-191 |
| CD55 | Spendlove et al. (1999) *Cancer Res.*, 59: 2282-2286. |
| CD59 (791Tgp72) | Jarvis et al. (1997) *Int J Cancer*, 71(6): 1049-1055 |
| CDC27 | Wang et al. (1999) *Science*, 284(5418): 1351-1354 |
| CDK4 | Wölfel et al. (1995) *Science*, 269(5228): 1281-1284 |
| CEA | Kass et al. (1999) *Cancer Res.*, 59(3): 676-683 |
| c-myc | Watson et al. (1991) *Cancer Res.*, 51(15): 3996-4000 |

TABLE 1-continued

Illustrative cancer markers and associated references, all of which are incorporated herein by reference for the purpose of identifying the referenced tumor markers.

| Marker | Reference |
| --- | --- |
| Cox-2 | Tsujii et al. (1998) *Cell*, 93: 705-716 |
| DCC | Gotley et al. (1996) *Oncogene*, 13(4): 787-795 |
| DcR3 | Pitti et al. (1998) *Nature*, 396: 699-703 |
| E6/E7 | Steller et al. (1996) *Cancer Res.*, 56(21): 5087-5091 |
| EGFR | Yang et al. (1999) *Cancer Res.*, 59(6): 1236-1243. |
| EMBP | Shiina et al. (1996) *Prostate*, 29(3): 169-176. |
| Ena78 | Arenberg et al. (1998) *J. Clin. Invest.*, 102: 465-472. |
| FGF8b and FGF8a | Dorkin et al. (1999) *Oncogene*, 18(17): 2755-2761 |
| FLK-1/KDR | Annie and Fong (1999) *Cancer Res.*, 59: 99-106 |
| Folic Acid Receptor | Dixon et al. (1992) *J Biol Chem.*, 267(33): 24140-72414 |
| G250 | Divgi et al. (1998) *Clin Cancer Res.*, 4(11): 2729-2739 |
| GAGE-Family | De Backer et al. (1999) *Cancer Res.*, 59(13): 3157-3165 |
| gastrin 17 | Watson et al. (1995) *Int J Cancer*, 61(2): 233-240 |
| Gastrin-releasing hormone (bombesin) | Wang et al. (1996) *Int J Cancer*, 68(4): 528-534 |
| GD2/GD3/GM2 | Wiesner and Sweeley (1995) *Int J Cancer*, 60(3): 294-299 |
| GnRH | Bahk et al. (1998) *Urol Res.*, 26(4): 259-264 |
| GnTV | Hengstler et al. (1998) *Recent Results Cancer Res.*, 154: 47-85 |
| gp100/Pmel17 | Wagner et al. (1997) *Cancer Immunol Immunother.*, 44(4): 239-247 |
| gp-100-in4 | Kirkin et al. (1998) *APMIS*, 106(7): 665-679 |
| gp15 | Maeurer et al. (1996) *Melanoma Res.*, 6(1): 11-24 |
| gp75/TRP-1 | Lewis et al. (1995) *Semin Cancer Biol.*, 6(6): 321-327 |
| hCG | Hoermann et al. (1992) *Cancer Res.*, 52(6): 1520-1524 |
| Heparanase | Vlodavsky et al. (1999) *Nat Med.*, 5(7): 793-802 |
| Her2/neu | Lewis et al. (1995) *Semin Cancer Biol.*, 6(6): 321-327 |
| Her3 | |
| HMTV | Kahl et al. (1991) *Br J Cancer*, 63(4): 534-540 |
| Hsp70 | Jaattela et al. (1998) *EMBO J.*, 17(21): 6124-6134 |
| hTERT (telomerase) | Vonderheide et al. (1999) *Immunity*, 10: 673-679. 1999. |
| IGFR1 | Ellis et al. (1998) *Breast Cancer Res. Treat.*, 52: 175-184 |
| IL-13R | Murata et al. (1997) *Biochem Biophys Res Commun.*, 238(1): 90-94 |
| iNOS | Klotz et al. (1998) *Cancer*, 82(10): 1897-1903 |
| Ki 67 | Gerdes et al. (1983) *Int J Cancer*, 31: 13-20 |
| KIAA0205 | Guéguen et al. (1998) *J Immunol.*, 160(12): 6188-6194 |
| K-ras, H-ras, N-ras | Abrams et al. (1996) *Semin Oncol.*, 23(1): 118-134 |
| KSA (CO17-1A) | Zhang et al. (1998) *Clin Cancer Res.*, 4(2): 295-302 |
| LDLR-FUT | Caruso et al. (1998) *Oncol Rep.*, 5(4): 927-930 |
| MAGE Family (MAGE1, MAGE3, etc.) | Marchand et al. (1999) *Int J Cancer*, 80(2): 219-230 |
| Mammaglobin | Watson et al. (1999) *Cancer Res.*, 59: 13 3028-3031 |
| MAP17 | Kocher et al. (1996) *Am J Pathol.*, 149(2): 493-500 |
| Melan-A/MART-1 | Lewis and Houghton (1995) *Semin Cancer Biol.*, 6(6): 321-327 |
| mesothelin | Chang et al. (1996) *Proc. Natl. Acad. Sci., USA*, 93(1): 136-140 |
| MIC A/B | Groh et al. (1998) *Science*, 279: 1737-1740 |
| MT-MMP's, such as MMP2, MMP3, MMP7, MMP9 | Sato and Seiki (1996) *J Biochem (Tokyo)*, 119(2): 209-215 |
| Mox1 | Candia et al. (1992) *Development*, 116(4): 1123-1136 |
| Mucin, such as MUC-1, MUC-2, MUC-3, and MUC-4 | Lewis and Houghton (1995) *Semin Cancer Biol.*, 6(6): 321-327 |
| MUM-1 | Kirkin et al. (1998) *APMIS*, 106(7): 665-679 |
| NY-ESO-1 | Jager et al. (1998) *J. Exp. Med.*, 187: 265-270 |
| Osteonectin | Graham et al. (1997) *Eur J Cancer*, 33(10): 1654-1660 |
| p15 | Yoshida et al. (1995) *Cancer Res.*, 55(13): 2756-2760 |
| P170/MDR1 | Trock et al. (1997) *J Natl Cancer Inst.*, 89(13): 917-931 |
| p53 | Roth et al. (1996) *Proc. Natl. Acad. Sci., USA*, 93(10): 4781-4786. |
| p97/melanotransferrin | Furukawa et al. (1989) *J Exp Med.*, 169(2): 585-590 |
| PAI-1 | Grøndahl-Hansen et al. (1993) *Cancer Res.*, 53(11): 2513-2521 |
| PDGF | Vassbotn et al. (1993) *Mol Cell Biol.*, 13(7): 4066-4076 |
| Plasminogen (uPA) | Naitoh et al. (1995) *Jpn J Cancer Res.*, 86(1): 48-56 |
| PRAME | Kirkin et al. (1998) *APMIS*, 106(7): 665-679 |
| Probasin | Matuo et al. (1985) *Biochem Biophys Res Commun.*, 130(1): 293-300 |
| Progenipoietin | — |
| PSA | Sanda et al. (1999) *Urology*, 53(2): 260-266. |
| PSM | Kawakami et al. (1997) *Cancer Res.*, 57(12): 2321-2324 |
| RAGE-1 | Gaugler et al. (1996) *Immunogenetics*, 44(5): 323-330 |
| Rb | Dosaka-Akita et al. (1997) *Cancer*, 79(7): 1329-1337 |

TABLE 1-continued

Illustrative cancer markers and associated references, all of which are incorporated herein by reference for the purpose of identifying the referenced tumor markers.

| Marker | Reference |
| --- | --- |
| RCAS1 | Sonoda et al. (1996) Cancer, 77(8): 1501-1509. |
| SART-1 | Kikuchi et al. (1999(Int J Cancer, 81(3): 459-466 |
| SSX gene family | Gure et al. (1997) Int J Cancer, 72(6): 965-971 |
| STAT3 | Bromberg et al. (1999) Cell, 98(3): 295-303 |
| STn (mucin assoc.) | Sandmaier et al. (1999) J Immunother., 22(1): 54-66 |
| TAG-72 | Kuroki et al. (1990)Cancer Res., 50(16): 4872-4879 |
| TGF-α | Imanishi et al. (1989) Br J Cancer, 59(5): 761-765 |
| TGF-β | Picon et al. (1998) Cancer Epidemiol Biomarkers Prev, 7(6): 497-504 |
| Thymosin β 15 | Bao et al. (1996) Nature Medicine. 2(12), 1322-1328 |
| IFN-α | Moradi et al. (1993) Cancer, 72(8): 2433-2440 |
| TPA | Maulard et al. (1994) Cancer, 73(2): 394-398 |
| TPI | Nishida et al. (1984) Cancer Res 44(8): 3324-9 |
| TRP-2 | Parkhurst et al. (1998) Cancer Res., 58(21) 4895-4901 |
| Tyrosinase | Kirkin et al. (1998) APMIS, 106(7): 665-679 |
| VEGF | Hyodo et al. (1998) Eur J Cancer, 34(13): 2041-2045 |
| ZAG | Sanchez et al. (1999) Science, 283(5409): 1914-1919 |
| p16INK4 | Quelle et al. (1995) Oncogene Aug. 17, 1995; 11(4): 635-645 |
| Glutathione S-transferase | Hengstler (1998) et al. Recent Results Cancer Res., 154: 47-85 |

Methods of coupling lipid-containing constructs and targeting agents are well known to those of skill in the art. Examples include, but are not limited to the use of biotin and avidin or streptavidin (see, e.g., U.S. Pat. No. 4,885,172 A), by traditional chemical reactions using, for example, bifunctional coupling agents such as glutaraldehyde, diimide esters, aromatic and aliphatic diisocyanates, bis-p-nitrophenyl esters of dicarboxylic acids, aromatic disulfonyl chlorides and bifunctional arylhalides such as 1,5-difluoro-2,4-dinitrobenzene; p,p'-difluoro m,m'-dinitrodiphenyl sulfone, sulfhydryl-reactive maleimides, and the like. Appropriate reactions which may be applied to such couplings are described in Williams et al. Methods in Immunology and Immunochemistry Vol. 1, Academic Press, New York 1967.

The DNVs described herein offer numerous advantages which include, but are not limited to the following:
1) The DNVs have the ability to increase localized drug delivery (i) through oral mucosa,(ii) into dermal layers, and (iii) transdermally;
2) The DNVs have the potential to allow or increases delivery of small molecules, proteins, RNAs, and/or antibodies through the blood brain barrier to the brain for CNS disorders;
3) The DNVs have the potential to deliver cargo specifically to targeted cells types, thus avoiding off-target or side effects.

The blood brain barrier (BBB) limits the therapeutic molecules that can be used for treatment of neurological disorders such as AD and PD. Having the capability to transport a variety of molecules including, but not limited to, small molecules, peptides, proteins, antibodies, aptamers, miRNA, and small molecule polymer conjugates, to the brain in DNVs increases the variety of therapeutics that could be evaluated and developed for treatment of these devastating disorders. Furthermore DNVs can facilitate delivery by numerous routes of administration, including the transdermal route, that could increase ease of dosing and compliance in an older or ill patient population. Additionally, targeted DNVs allow delivery of therapeutics only to certain cell types, thus limiting side effects.

It is believed that none of the existing liposomal technologies have been shown to effectively deliver therapeutics transdermally that then also cross the blood-brain barrier (BBB). Therapeutics for CNS disorders are limited by their ability to cross the BBB. This results in the exclusion of many potential novel therapeutics that could be evaluated and developed for CNS disorders. In addition, patient compliance is an obstacle for successful treatment. The DNVs described herein have the potential to enable a variety of molecules to be evaluated in the treatment of CNS disorders like AD and PD, thus increasing success in finding effective new therapeutics for such CNS disorders.

DNVs enable delivery of a larger class of molecules. Existing technologies are mostly limited to small molecules. DNVs have little to no toxicity, and in localized delivery, do not damage deeper viable tissue. The DNVs do not require ultrasound, electricity or chemical enhancers to be applied on the skin.

While there are number of liposome-based approaches for encapsulation and delivery of drugs primarily by the systemic route, the DNVs described herein for the first time provides the potential of using liposomal technology to generate DNVs to deliver drugs by the transdermal route for ultimate brain delivery. Furthermore the discovery that the DNVs described herein can be generated in a microreactor using the flow-chemistry apparatus allows for CNS-targeted drug-loaded elastic liposomes to be prepared with a high degree of quality control, very small and uniform diameter and potentially on a large scale.

Loaded DNVs.

The DNVs described herein are effective to delivery one or more therapeutic agents to any of a number of targets. Such agents can include, but are not limited to therapeutic agents for the treatment or prophylaxis of a neurodegenerative brain disorder, bisphosphonates, anti-neoplastic agents (e.g., cytotoxic and/or cytostatic drugs), or essentially any other agent that it is desired to encapsulate.

Agents for the Treatment or Prophylaxis of a Neurodegenerative Disorder.

In certain embodiments the DNVs effectively transport therapeutics across the blood brain barrier and are effective to deliver one or more therapeutic moieties to the central nervous system (e.g., to the brain). In certain embodiments such can include agents for the treatment or prophylaxis of a neurodegenerative brain disorder. Such neurodegenerative brain disorders include, but are not limited to Parkinson's disease, Huntington's disease, Alzheimer's disease, mild cognitive impairment, dementia, ischemia, stroke, amyotrophic lateral sclerosis (ALS), primary lateral sclerosis (PLS), cerebral palsy, and the like.

Accordingly, in certain embodiments the DNVs loaded with such agents can be used in the treatment and/or prophylaxis of a neurodegenerative condition. For example, in certain embodiments, the DNVs loaded with such agents can be used to prevent or delay the onset of a pre-Alzheimer's condition and/or cognitive dysfunction, and/or to ameliorate one or more symptoms of a pre-Alzheimer's condition and/or cognitive dysfunction, or to prevent or delay the progression of a pre-Alzheimer's condition or cognitive dysfunction to Alzheimer's disease, or to ameliorate one or more symptoms of Alzheimer's disease, and/or to reverse Alzheimer's disease, and/or to reduce the rate of progression of Alzheimer's disease.

In certain embodiments the DNV(s) contain an inhibitor of an amyloidogenic pathway or an agent that switches APP processing from an amyloidogenic to a non-amyloidogenic pathway.

In certain embodiments the agents for the treatment or prophylaxis of a neurodegenerative brain disorder include, but are not limited to, an inhibitor of an amyloidogenic pathway or an agent that switches APP processing from an amyloidogenic to a non-amyloidogenic pathway. In certain embodiments the agents for the treatment or prophylaxis of a neurodegenerative brain disorder include, but are not limited to tropisetron or analogs thereof, disulfiram or analogs thereof, honokiol or analogs thereof, and/or nimetazepam or analogs thereof as described in PCT/US2011/048472 (WO 2012/024616), and/or TrkA kinase inhibitors (e.g., ADDN-1351) and/or analogues thereof as described in PCT/US2012/0051426 (WO 2013/026021), and/or D2 receptor agonists, and/or alpha1-adrenergic receptor antagonists, and/or tropinol esters as described in PCT/US2012/049223 (WO 2013/019901), and/or hydantoins as described in PCT/US2014/016100 (WO 2014/127042), and/or alaproclate keto analogues as described in PCT/US2015/045928 (WO 2016/028910) (e.g., 2-amino-6-(4-chlorophenyl)-5,5-dimethyl-3-hexanone and 5-amino-1-(4-chlorophenyl)-2,2-dimethyl-3-hexanone), isopropyl alaproclate analogues (e.g., 2-(4-clorophenyl)-1,1-dimethyl 2-amino-3-methylbutanoate, 2-diethylaminoethyl 2,2-diphenylpentanoate (proadifen), 2-(4-chlorophenyl)-1,1-dimethylethyl 2-amino-3-methylbutanoate (GEA 857), and the like), APP-specific BACE inhibitors (ASBIs) as described in PCT/US2013/032481 (WO 2013/142370), and/or bioflavonoids or prodrugs thereof as described below, and/or resveratrol or resveratrol analogs as described below.

In certain embodiments the agents for the treatment or prophylaxis of a neurodegenerative brain disorder include, an ASBI such as galangin, rutin, a galangin prodrug, or a rutin prodrug.

Bioflavanoids and Bioflavanoid Pro-Drugs.

It has been demonstrated that certain flavonoids (e.g., rutin, galangin, etc.) can act as APP-specific BACE inhibitors and are believed to be effective in the treatment and/or prophylaxis of various neurodegenerative disorders (see, e.g., PCT/US2013/032481 (WO 2013/142370). Additionally, numerous other flavonoids are known to have neuroprotective effects.

Accordingly, in certain embodiments the DNV(s) are loaded with one or more flavonoid(s) (bioflavanoid(s)), isoflavonoid(s) (e.g., derived from derived from 3-phenyl-chromen-4-one (3-phenyl-1,4-benzopyrone) structure), and/or neoflavonoid(s) (e.g., derived from a 3-phenylchromen-4-one (3-phenyl-1,4-benzopyrone) structure). Illustrative, but non-limiting, flavonoids include, but are not limited to hesperidin (a glycoside of the flavanone hesperetin), quercitrin, rutin (two glycosides of the flavonol quercetin), and the flavone tangeritin. In c ertain embodiments the flavonoid is a flavonoid pro-drug. In certain embodiments the flavonoid comprises galangin. In certain embodiments the flavonoid comprises rutin. In certain embodiments the flavonoid comprise quercetin.

In certain embodiments the DNVs are loaded with a flavone. Illustrative flavones include, but are not limited to luteolin, apigenin, tangeritin, and the like. In certain embodiments the DNVS are loaded with one or more flavanols such as auercetin, kaempferol, myricetin, fisetin, galangin, isorhamnetin, pachypodol, rhamnazin, pyranoflavonols, furanoflavonols, and the like. In certain embodiments the DNVs are loaded with a flavanone such as hesperetin, naringenin, eriodictyol, homoeriodictyol, and the like. In certain embodiments the DNVs are loaded with a flavanonol such as taxifolin (or dihydroquercetin), dihydrokaempferol, and the like.

Resveratrol and Analogs Thereof.

Figure 14:
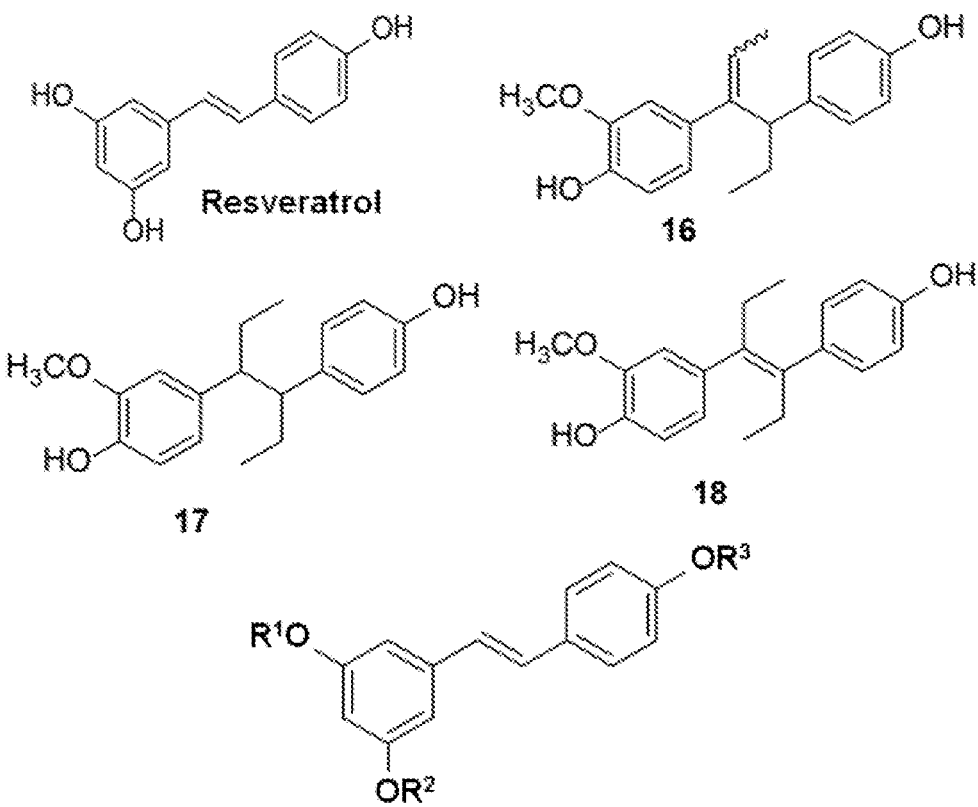
FIG. 14 illustrates resveratrol ((trans-3,4',5-trihydroxystilbene) and various resveratrol (stilbene) analogs.
Figure 14:
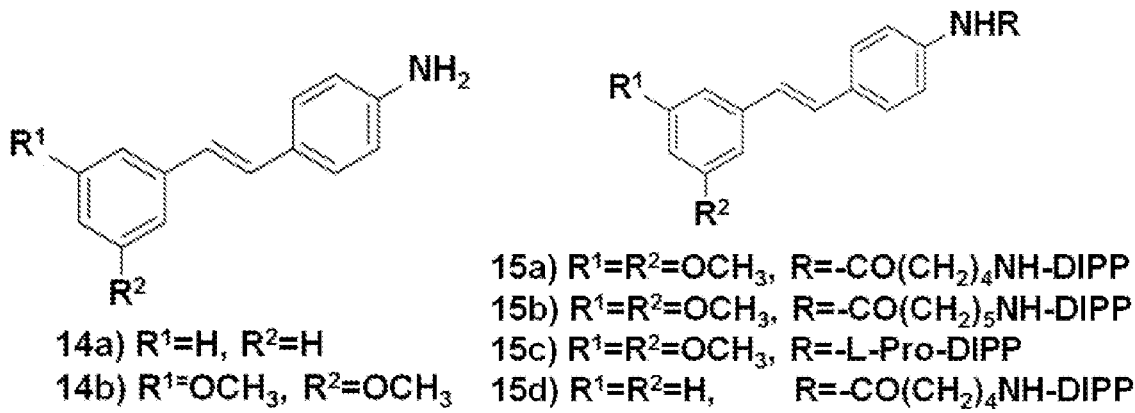

In certain embodiments the DNV(s) are loaded with resveratrol and/or one or more resveratrol analogs. Resveratrol analogs are well known to those of skill in the art. Illustrative, but non-limiting, examples of resveratrol analogs are shown in FIG. 14. Methods of synthesizing such compounds are well known to those of skill. For example, synthesis schemes for compounds 4-7 in FIG. 14 are described by Ruan et al. (2006) *Chem. & Biodiv.*, 3: 975-981, synthesis schemes for compounds 15a-15d in FIG. 14 are described by Liu et al. (2008) *Bioorg. Med. Chem.*, 16: 10013-10021, synthesis schemes for compounds 16-18 in FIG. 14 are described by Liu (2012) *Steroids*, 77: 419-423, a synthesis schemes for compound 23 in FIG. 14 is described by Chen et al. (2005) *Chem. Pharmaceut. Bull.*, 53: 1587-1590, synthesis schemes for compounds 24 and 25 in FIG. 14 are provided by Lu (2013) *J. Med. Chem.*, 56: 5843-5859, and synthesis schemes for the other illustrated analogs can be found, inter alia, in Ogas et al. (2013) *Ann. N.Y. Acad. Sci.* 1290: 21-29. Analogs are also described by Liu et al. (2015) *J. Med. Chem.*, 5: 97-105, Inhibitors of Quinone Oxidoreductases 2 (NQO2)

In certain embodiments the DNV(s) are loaded with NQO2 inhibitors besides resveratrol such as but not limited to imatinib, melatonin 9-amino acridine (Nolan et al. (2012) *Mol. Cancer Ther.* 11(1): 194-203). Methods of synthesizing such compounds are well known to those of skill. In certain embodiments the NQO2 inhibitor comprises a moiety selected from the group consisting of NSC14229 (quinacrine), NSC9858, NSC11232, NSC12547, NSC13000, NSC13484, NSC17602, NSC28487, NSC64924, NSC71795, NSC76750, NSC101984, NSC140268, NSC156529, NSC164017, NSC219733, NSC270904, NSC273829, NSC305831, NSC305836, NSC322087, NSC356821, NSC374718, NSC407356, NSC617933, NSC617939, NSC620318, NSC628440, NSC633239, NSC648424, NSC658835, NSC682454, resveratrol, resveratrol analogs, and Imatinib Bisphosphonates.

A number of bisphosphonates (BP) have been administered via IV infusion, because they have some serious adverse side effects when orally administered including, for example, ulceration of intestinal epithelium. This has been a significant burden for patients who need to go to clinic every month of IV infusion.

One of the illustrative embodiments described herein as a DNV containing a fluorescent-conjugated bisphosphonate. It was demonstrated that deformable nano-scale vehicle (DNVs) assisted the safe and effective transdermal as well as trans-oral mucosal application. This observation immediately suggests that orally administered DNV-BP can safely transfer BP to blood circulation by passing through intestinal epithelial lining, without the current side effects.

Accordingly, in certain embodiments DNV(s) are loaded one or more bisphonates are provided. Illustrative bisphosphonates include, but are not limited to of adendronate/cholecalciferol (e.g., FOMAX® PLUS D), etidronate (e.g., DIDRONEL®), zoledronic acid (zolendronate) (e.g., ZOMETA®, RECLAST®, ACLASTA®), ibandronate (e.g., BONIVA®), risedronate (e.g., ATELVIA®, ACTONEL®), alendronate (e.g., FOSAMAX®, BINOSTO®), pamidronate (e.g., AREDIA®), neridronate (e.g., NERIXIA®), olpadronate, tiludronate (e.g., SKELID®), and the like.

Cytotoxic and/or Cytostatic Agents.

The DNVs described herein are also effective to deliver one or more therapeutic agents to target cell such as cancer cells. Accordingly, in certain embodiments the DNVs described herein contain a cytotoxic and/or cytostatic agent. Illustrative cytotoxic and/or cytostatic agents include, but are not limited to IDH1 inhibitors, microtubule inhibitors, DNA-damaging agents, polymerase inhibitors, and the like. In certain embodiments the cytotoxic or cytostatic agent comprises a tubulin inhibitor (e.g., auristatin, Dolastatin-10, synthetic derivatives of the natural product Dolastatin-10, maytansine or a maytansine derivatives, and the like). In certain embodiments the cytotoxic or cytostatic agent comprises a drug selected from the group consisting Monomethylauristatin F (MMAF), Auristatin E (AE), Monomethylauristatin E (MMAE), vcMMAE, and vcMMAF. In certain embodiments the cytotoxic or cytostatic agent comprises a maytansine selected from the group consisting of Mertansine (DM1), DM3, and DM4.

In certain embodiments, the cytotoxic or cytostatic agent comprises a DNA-damaging agent (e.g., a calicheamicin, a calicheamicin analog, a duocarmycin, a duocarmycin analog, a pyrrolobenzodiazepine, a pyrrolobenzodiazepine analog, and the like). In certain embodiments the cytotoxic or cytostatic agent comprises a duocarmycin, selected from the group consisting of duocarmycin A, duocarmycin B1, duocarmycin B2, duocarmycin C1, duocarmycin C2, duocarmycin D, duocarmycin SA, Cyclopropylbenzoindole duocarmycin (CC-1065), Centanamycin, Rachelmycin, Adozelesin, Bizelesin, and Carzelesin.

In certain embodiments the cytotoxic or cytostatic agent comprises a pyrrolobenzodiazepine or a pyrrolobenzodiazepine dimer (e.g., Anthramycin (and dimers thereof), Mazethramycin (and dimers thereof), Tomaymycin (and dimers thereof), Prothracarcin (and dimers thereof), Chicamycin (and dimers thereof), Neothramycin A (and dimers thereof), Neothramycin B (and dimers thereof), DC-81 (and dimers thereof), Sibiromycin (and dimers thereof), Porothramycin A (and dimers thereof), Porothramycin B (and dimers thereof), Sibanomycin (and dimers thereof), Abbeymycin (and dimers thereof), SG2000, SG2285, and the like).

In certain embodiments the cytotoxic or cytostatic agent comprises a drug is selected from the group consisting of auristatin, dolastatin, colchicine, combretastatin, and mTOR/PI3K inhibitors.

In certain embodiments the cytotoxic or cytostatic agent comprises a drug selected from the group consisting of flourouracil (5-FU), capecitabine, 5-trifluoromethyl-2'-deoxyuridine, methotrexate sodium, raltitrexed, pemetrexed, cytosine Arabinoside, 6-mercaptopurine, azathioprine, 6-thioguanine (6-TG), pentostatin, fludarabine phosphate, cladribine, floxuridine (5-fluoro-2), ribonucleotide reductase inhibitor (RNR), cyclophosphamide, neosar, ifosfamide, thiotepa, 1,3-bis(2-chloroethyl)-1-nitrosourea (BCNU), 1,-(2-chloroethyl)-3-cyclohexyl-lnitrosourea, methyl (CCNU), hexamethylmelamine, busulfan, procarbazine HCL, dacarbazine (DTIC), chlorambucil, melphalan, cisplatin, carboplatin, oxaliplatin, bendamustine, carmustine, chloromethine, dacarbazine (DTIC), fotemustine, lomustine, mannosulfan, nedaplatin, nimustine, prednimustine, ranimustine, satraplatin, semustine, streptozocin, temozolomide, treosulfan, triaziquone, triethylene melamine, thioTEPA, triplatin tetranitrate, trofosfamide, uramustine, doxorubicin, daunorubicin citrate, mitoxantrone, actinomycin D, etoposide, topotecan HCL, teniposide (VM-26), irinotecan HCL (CPT-11), camptothecin, belotecan, rubitecan, vincristine, vinblastine sulfate, vinorelbine tartrate, vindesine sulphate, paclitaxel, docetaxel, nanoparticle paclitaxel, abraxane, ixabepilone, larotaxel, ortataxel, tesetaxel, vinflunine, retinoic acid, a retinoic acid derivative, doxirubicin, vinblastine, vincristine, cyclophosphamide, ifosfamide, cisplatin, 5-fluorouracil, a camptothecin derivative, interferon, tamoxifen, and taxol.

In certain embodiments the cytotoxic or cytostatic agent comprises a cytotoxin (e.g., a Diphtheria toxin, a Pseudomonas exotoxin, a ricin, an abrin, saporin, a thymidine kinase, and the like).

The foregoing agents that can be encapsulated in the DNVs described herein are illustrative and not limiting. Using the teachings provided therein the DNVs can readily be used to encapsulate numerous other agents.

Combinatorial Drug Delivery Platform

In certain embodiment, two or more drugs can be encapsulated in the DNVs. One of the drug could for example be but not limited to a kinase inhibitor such as masatinib or its analog that could protect against neuroinflammation and other drug could be but not limited to sAPPα enhancers.

Pharmaceutical Formulations.

In various embodiments pharmaceutical formulations contemplated herein generally contain DNVs as described herein (e.g., containing one or more therapeutic agents) and a pharmaceutically acceptable carrier. The term "carrier" typically refers to an inert substance used as a diluent or vehicle for the pharmaceutical formulation. The term can also encompass a typically inert substance that imparts cohesive qualities to the composition. Typically, the physiologically acceptable carriers are present in liquid form. Examples of liquid carriers include, but not limited to, physiological saline, phosphate buffer, normal buffered saline (135-150 mM NaCl), water, buffered water, 0.4% saline, 0.3% glycine, 0.3M sucrose (and other carbohydrates), glycoproteins to provide enhanced stability (e.g., albumin, lipoprotein, globulin, etc.) and the like. Since physiologically acceptable carriers are determined in part by the particular composition being administered as well as by the particular method used to administer the composition, there are a wide variety of suitable formulations of pharmaceutical compositions of the present invention (see, e.g., Remington's Pharmaceutical Sciences, Maak Publishing Company, Philadelphia, Pa., 17th ed. (1985)).

In various embodiments the pharmaceutical formulations can be sterilized by conventional, well-known sterilization techniques or may be produced under sterile conditions. Aqueous solutions can be packaged for use or filtered under aseptic conditions and lyophilized, the lyophilized preparation being combined with a sterile aqueous solution prior to administration. In certain embodiments the compositions can contain pharmaceutically acceptable auxiliary substances as required to approximate physiological conditions, such as pH adjusting and buffering agents, tonicity adjusting agents, wetting agents and the like, e.g., sodium acetate, sodium lactate, sodium chloride, potassium chloride, calcium chloride, sorbitan monolaurate and triethanolamine oleate. Sugars can also be included for stabilizing the compositions, such as a stabilizer for lyophilized compositions.

Pharmaceutical compositions suitable for parenteral administration, such as, for example, by intraarticular, intravenous, intramuscular, intratumoral, intradermal, intraperitoneal and subcutaneous routes, can include aqueous and non-aqueous, isotonic sterile injection solutions. In certain embodiments the injection solutions can contain antioxidants, buffers, bacteriostats and solutes that render the formulation isotonic with the blood of the intended recipient, and aqueous and non-aqueous sterile suspensions that can include suspending agents, solubilizers, thickening agents, stabilizers and preservatives. Injection solutions and suspensions can also be prepared from sterile powders, such as lyophilized liposomes. In certain embodiments the compositions can be administered, for example, by intravenous infusion, intraperitoneally, intravesically or intrathecally. In various embodiments parenteral administration and intravenous administration are also contemplated. The formulations of liposome compositions can be presented in unit-dose or multi-dose sealed containers, such as ampoules and vials.

In certain embodiments the pharmaceutical compositions are formulated for administration as an aerosol, e.g., for oral and/or nasal inhalation.

In certain embodiments the pharmaceutical compositions are formulated for topical deliver, intradermal delivery, subdermal delivery and/or transdermal delivery.

In certain embodiments the pharmaceutical compositions are formulate for application to oral mucosa, vaginal mucosa, and/or rectal mucosa.

In certain embodiments the pharmaceutical composition is in unit dosage form. In such form, the composition is subdivided into unit doses containing appropriate quantities of the active component, e.g., a DNV formulation. The unit dosage form can be a packaged composition, the package containing discrete quantities of the pharmaceutical composition. The composition can, if desired, also contain other compatible therapeutic agents.

In certain embodiments the DNVs described herein can be delivered through the skin using conventional transdermal drug delivery systems, i.e., transdermal "patches" wherein the active agent(s) (e.g., DNVs and/or formulations thereof) are typically contained within a laminated structure that serves as a drug delivery device to be affixed to the skin. In such a structure, the e.g., DNVs and/or formulations thereof is typically contained in a layer, or "reservoir," underlying an upper backing layer. It will be appreciated that the term "reservoir" in this context refers to a quantity of e.g., DNVs and/or formulations thereof that is ultimately available for delivery to the surface of the skin. Thus, for example, the "reservoir" may include the active ingredient(s) in an adhesive on a backing layer of the patch, or in any of a variety of different matrix formulations known to those of skill in the art. The patch may contain a single reservoir, or it may contain multiple reservoirs.

In one illustrative embodiment, the reservoir comprises a polymeric matrix of a pharmaceutically acceptable contact adhesive material that serves to affix the system to the skin during drug delivery. Examples of suitable skin contact adhesive materials include, but are not limited to, polyethylenes, polysiloxanes, polyisobutylenes, polyacrylates, polyurethanes, and the like. Alternatively, the e.g., DNVs and/or DNV formulation reservoir and skin contact adhesive are present as separate and distinct layers, with the adhesive underlying the reservoir which, in this case, may be either a polymeric matrix as described above, or it may be a liquid or hydrogel reservoir, or may take some other form. The backing layer in these laminates, which serves as the upper surface of the device, preferably functions as a primary structural element of the "patch" and provides the device with much of its flexibility. The material selected for the backing layer is preferably substantially impermeable to the active agent(s) (e.g., DNVs and/or formulations thereof) and any other materials that are present.

Alternatively, other pharmaceutical delivery systems can be employed. For example, liposomes, emulsions, and microemulsions/nanoemulsions are well known examples of delivery vehicles that may be used to protect and deliver pharmaceutically active compounds. Certain organic solvents such as dimethylsulfoxide also can be employed, although usually at the cost of greater toxicity.

EXAMPLES

The following examples are offered to illustrate, but not to limit the claimed invention.

Example 1

Preparation and Characterization of DNVs

We present here our investigations into one such technology: deformable nano-scale vehicles (DNVs). In various illustrative embodiments, the drug delivery vehicle is comprised of biologically-derived components, and multiple proprietary ingredients to confer deformability to the vehicles.

We have utilized a microfluidic reactor for the efficient and continuous synthesis of these DNVs. They are non-toxic, easy to prepare, scalable and highly reproducible, very homogenous in population and distribution, of controllable size, and provide highly localized payload delivery.

In various embodiments the DNVs described herein provide an efficient vehicle to deliver drugs locally to craniofacial and/or oral bone. As illustrated herein, in various embodiments, cationic DNVs were synthesized to carry a fluorescently tagged hydrophilic drug and were applied non-occluded to (i) the shaved scalp and (ii) the gingival surface in the oral cavity in mice (n=4) to test their permeability and drug flux. Our results show, as theorized, that the cationic DNVs are able to reach and deliver their payload to their target of alveolar bone in the case of oral application and to the skin layers upon dermal application, without any systemic payload leakage.

Materials

Figure 1A:
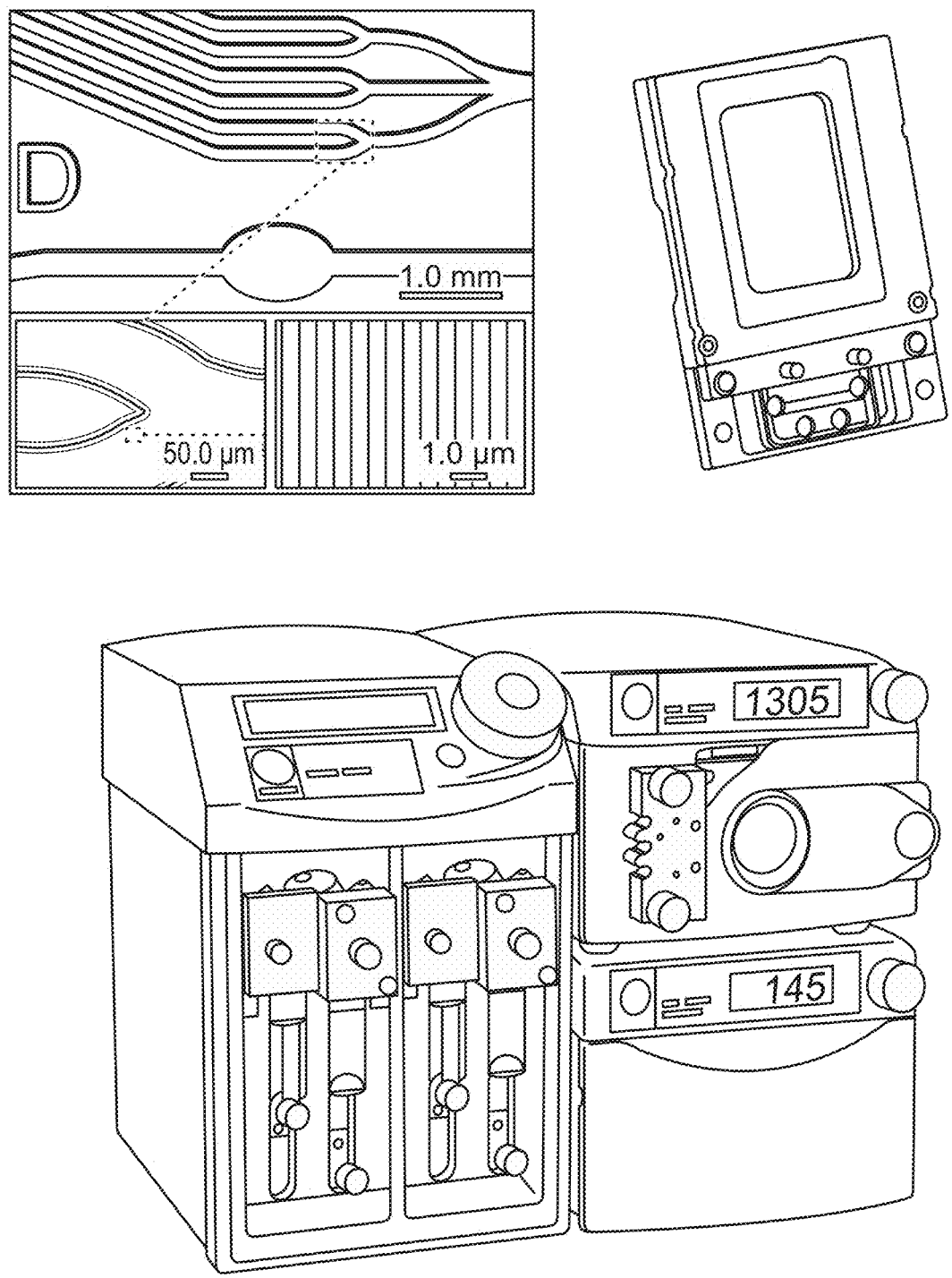
FIG. 1A illustrates one embodiment of devices used to fabricate DNVs. Microfluidic channels are shown top left. A microfluidic reactor is shown (top right) along with a microfluidic reactor system (bottom).

Microfluidic reactor system (FIG. 1A), 26 µL-1000 uL reactor chip, using a micromixer prior to entry in chip as shown in FIG. 1A. DI Water, PBS, isopropyl alcohol, chloroform, dialysis membranes, lyophilizer, DNV building blocks, including membrane components, membrane regulator and, deformability ingredients. Zetasizer (Malvern Z series), Dynamic Light Scatterer (Wyatt). Transmission Electron Microscope (JEOL). Mini-Extruder and membranes of 50 nm pore size (Avanti Polar Lipids). LAS-3000 (Fujifilm)

Figure 1B:
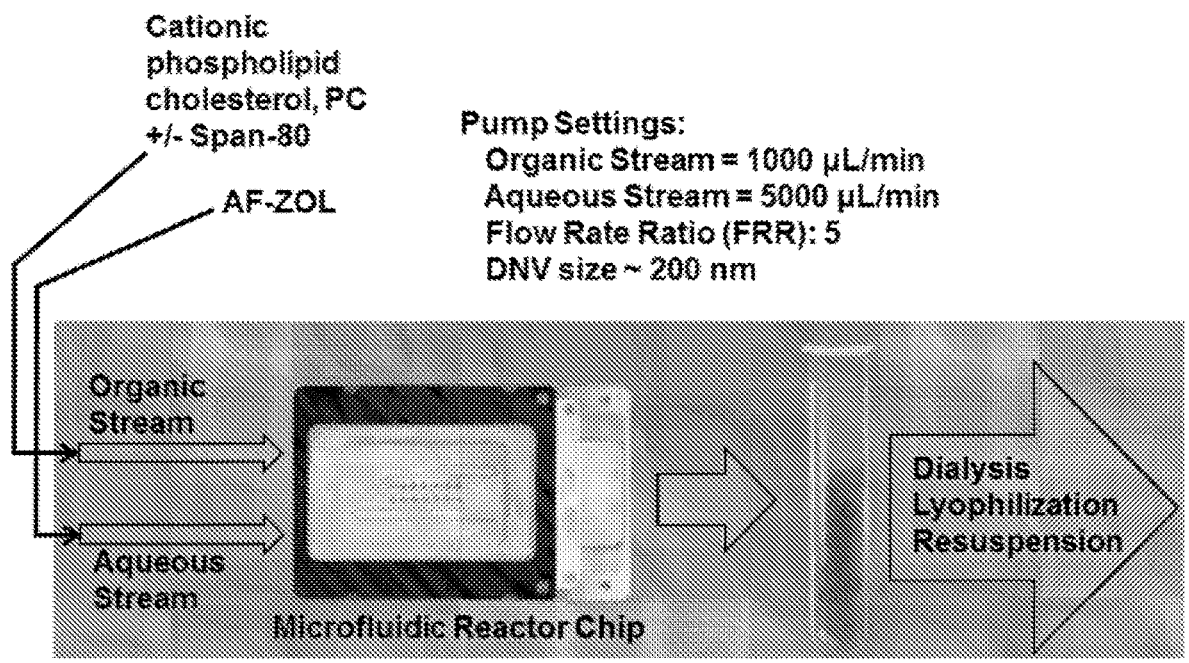
FIG. 1B illustrates the microfluidic synthesis scheme for preparation of the AF-ZOL DNV encapsulating the hydrophilic Zolodentrate
Figure 1B:
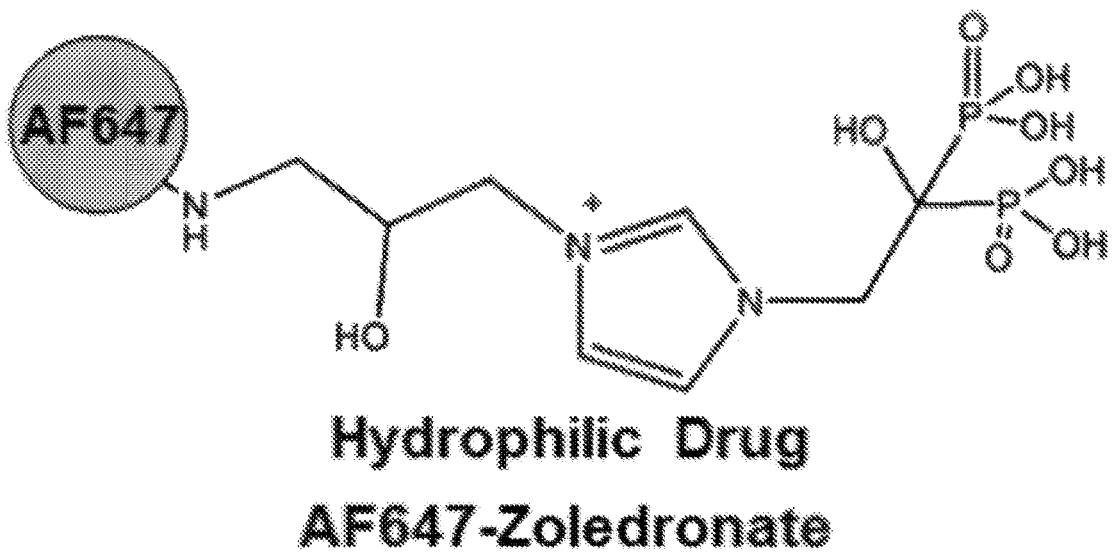

Preparation of Prototype DNVs:

The DNVs for transdermal delivery of AF647-Zoledronate (AF-ZOL), a fluorescent bisphosphonate, were prepared in a microfluidic reactor using the scheme shown in FIG. 1B combining building blocks in organic and aqueous phases at a precisely controlled flow rate ratio 5 was used as shown in FIG. 1B, at room temperature and pressure, providing high shear stress at a fast rate and controlled mixing in micro-channels, reducing turbulence and minimizing the size and dispersity of the resultant AF-ZOL DNVs.

Collected samples were then twice dialyzed overnight through a 20K membrane. Following dialysis, samples were lyophilized twice to a powder for long term storage, typically in liquid nitrogen (77 K). The DNVs can be resuspended in a final volume of 10 μL in an appropriate vehicle for topical and gingival application via direct pipette application on anesthetized mice or incorporated in a gel for application to the shaved Calvarial skin surface. Intended final clinical use in this domain is likely to be in the form of a pre-filled syringe, a swab or a gel patch.

Characterization:

Characterization of DNVs was performed using Atomic Force Microscopy (AFM), Transmission Electron Microscopy and the Malvern Zetasizer for electrical properties of empty and loaded DNVs.

Size—Size measurements, and dispersity analysis of DNVs were obtained through a zetasizer (Malvern Z series) and corroborated by Dynamic Light Scattering (Wyatt).

Zeta Potential—The zeta potential of the DNVs in suspension was obtained by zetasizer measurements (Malvern Z series).

Entrapment Efficiency—Separation of DNV encapsulated drug and free drug, by either ultracentrifugation (100,000Gs @ 2 hr) or dialysis. Both supernatant and resuspended DNV solution analyzed via fluorescent spectrophotometry to provide a comparison of entrapped and free drug. Entrapment efficiency=(Total drug−free drug)*100% For these studies, a fluorescein derivative, Fluorescein Isothiocyanate (FITC), was used.

Elasticity—Qualitative comparison of elasticity of differently formulated vehicles was performed with a mini-extruder, and membrane of 50 nm pore size. (Avanti Polar Lipids).

Figure 2:
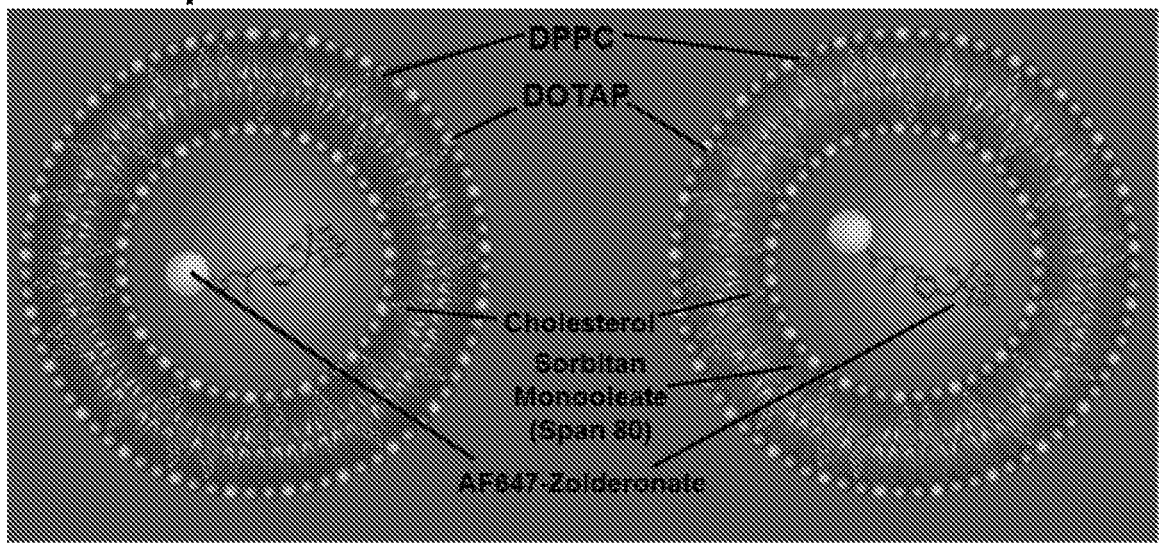
FIG. 2 illustrates visualization of deformable nano-scale vehicles. Deformable Nano-scale Vehicles (DNVs) loaded with drug, prepared on freshly cleaved mica and imaged in fluid, via Atomic Force Microscopy. The phase analysis shows that conventional liposome (nDNV) has a spherical shape while the DNV is deformed (not spherical) in shape.
Figure 2:
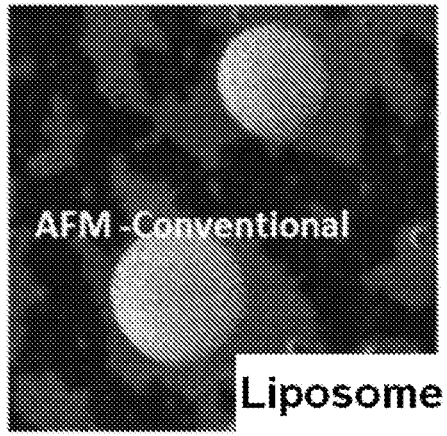
Figure 2:
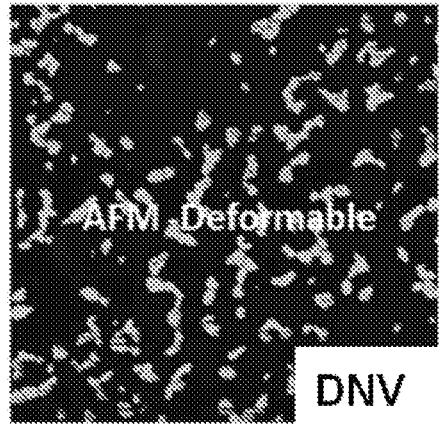
Figure 3A:
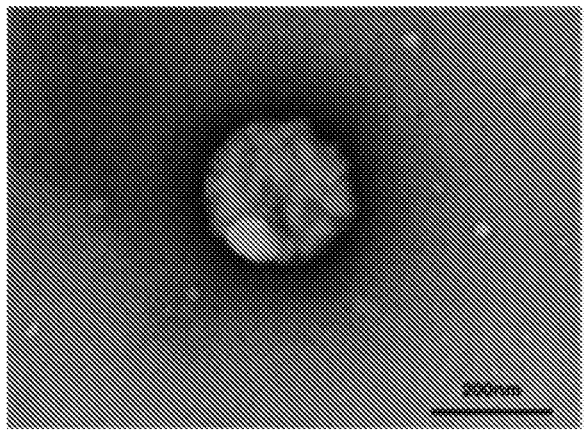
FIG. 3A shows a transmission electron microscope (TEM) image of a conventional liposome, and a DNV encapsulating the drug AF-ZOL produced by the microfluidic approach with a size of roughly 200 nm. At the bottom is a TEM image of the microfluidic produced DNV after weeks of storage as a lyophilized powder.
Figure 3A:
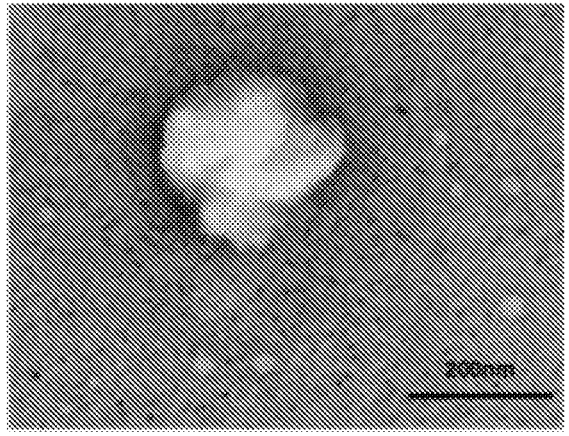
Figure 3A:
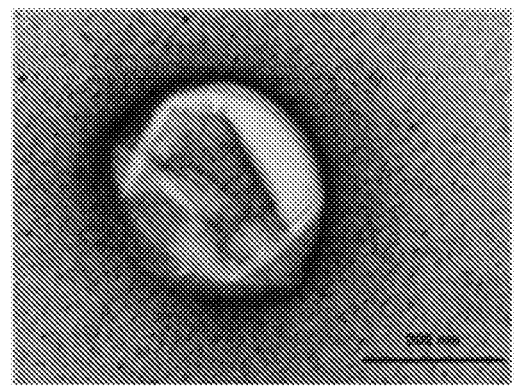
Figure 3B:
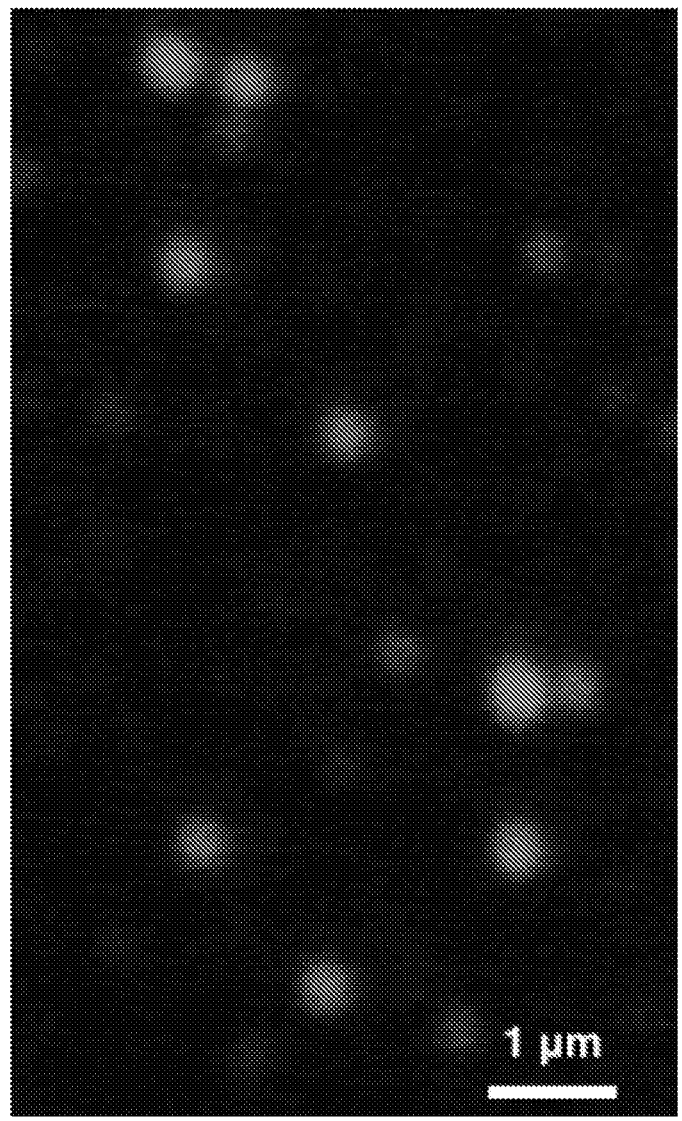
FIG. 3B shows a confocal image of the AF-ZOL DNV indicating good DNV stability.

Electrical properties of empty and loaded DNVs are shown in Table 2. AFM imaging of DNVs is shown in FIG. 2 and a TEM image of a DNV is shown in FIG. 3A and vesicle viability after storage and resuspension using confocal microscopy shows no drug leakage from the vesicle in FIG. 3B. Both DNVs and conventional liposomes were prepared using the microfluidic reactor and characterized as above.

TABLE 2

Electrical properties of empty and loaded DNVs in solution (PBS).

| Sample Name | Zeta Potential (mV) | Mobility (μmcm/Vs) | Conductance (mS/cm) |
| --- | --- | --- | --- |
| Empty Cationic DMV #1 | +19.1 | 1.261 | 17.8 |
| Empty Cationic DMV #2 | +19.3 | 1.273 | 18.5 |

TABLE 2-continued

Electrical properties of empty and loaded DNVs in solution (PBS).

| Sample Name | Zeta Potential (mV) | Mobility (μmcm/Vs) | Conductance (mS/cm) |
| --- | --- | --- | --- |
| Empty Cationic DMV #3 | +20.0 | 1.319 | 19.0 |
| Loaded Cationic DMV #1 | −12.9 | −0.8529 | 17.8 |
| Loaded Cationic DMV #2 | −13.1 | −0.8644 | 18.6 |
| Loaded Cationic DMV #3 | −12.8 | −0.8471 | 19.0 |

Figure 4:
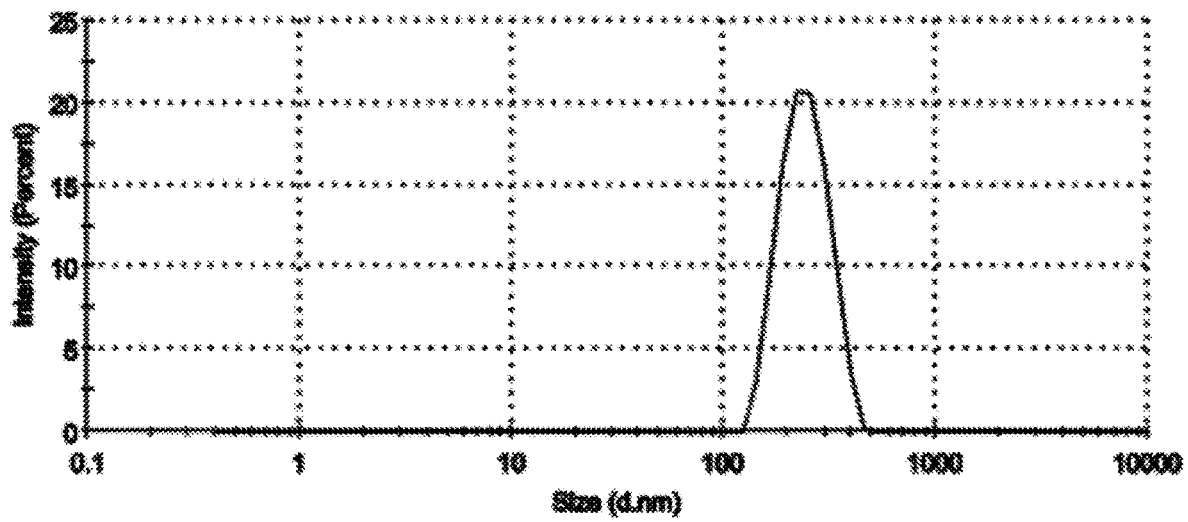
FIG. 4 illustrates population characteristics of drug loaded DNVs. Shown is a plot of size versus intensity after first lyophilization.
Figure 5A:
FIGS. 5A-5C show that AF-ZOL DNV penetrate oral mucosal barrier and deliver payload locally.
Figure 5B:
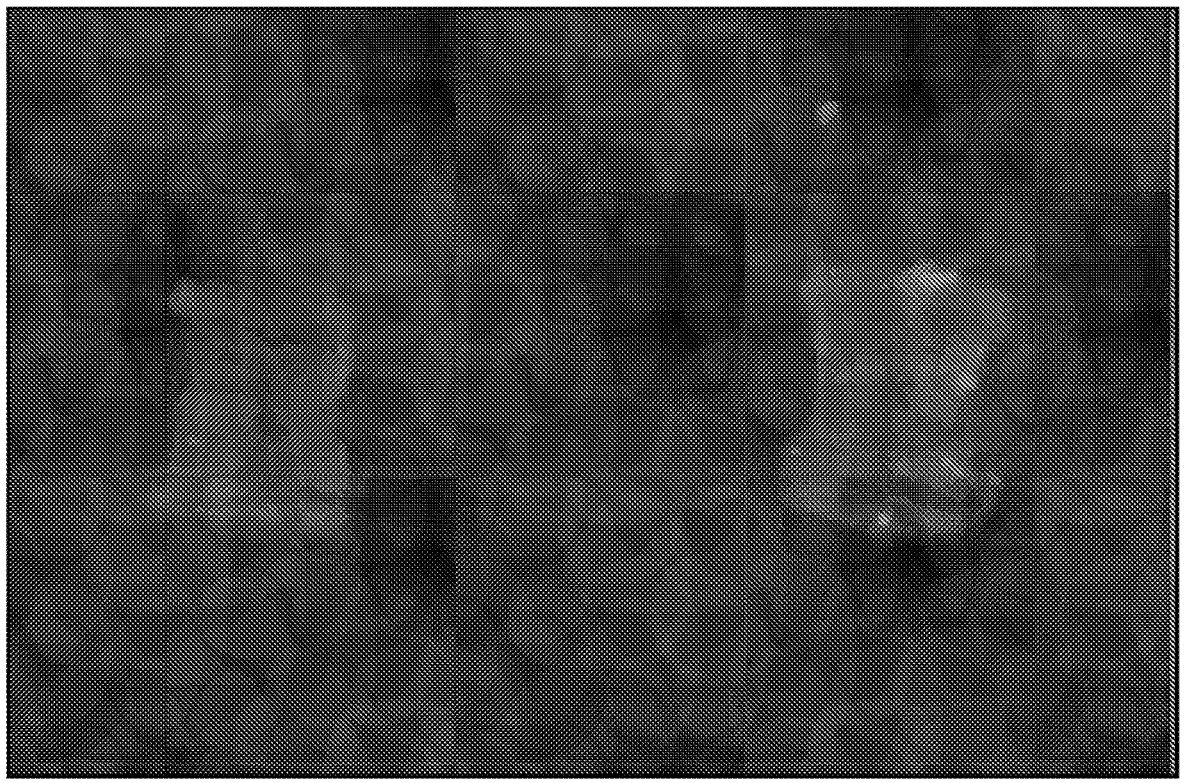
Figure 5C:
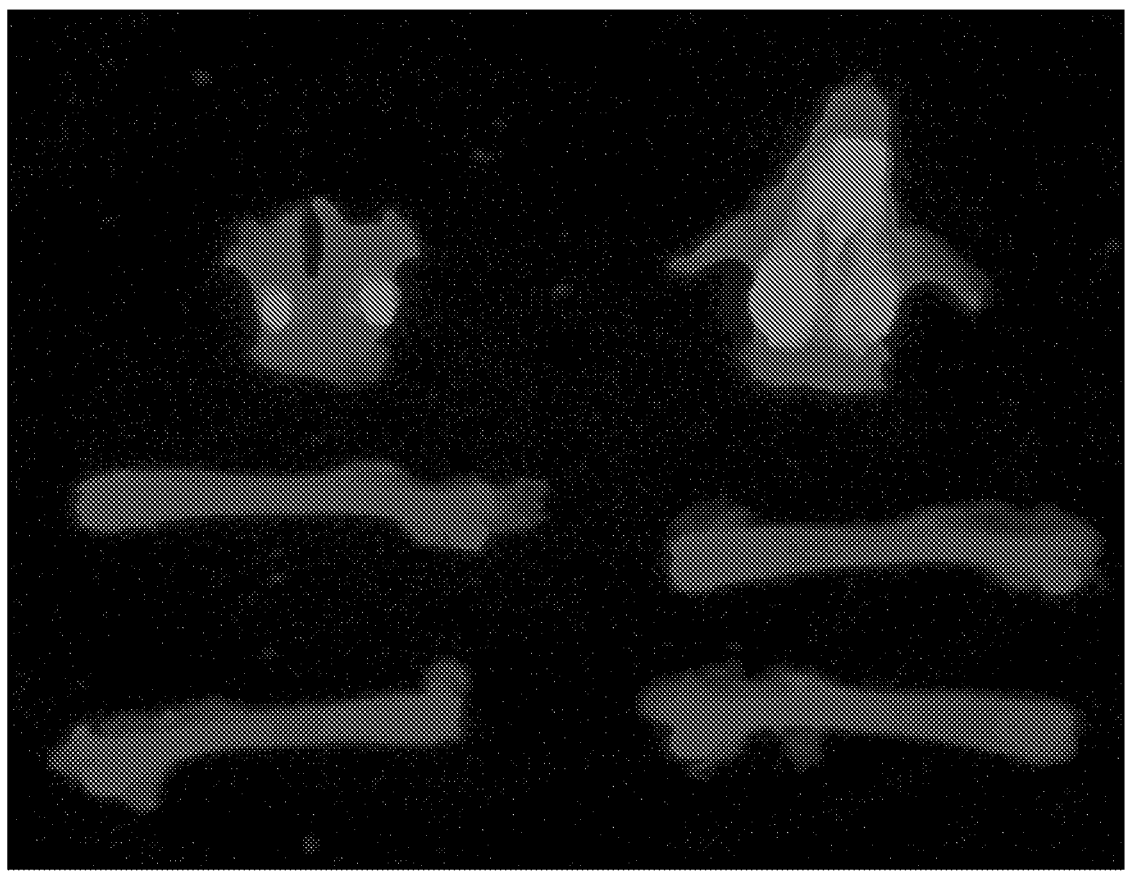
Figure 6:
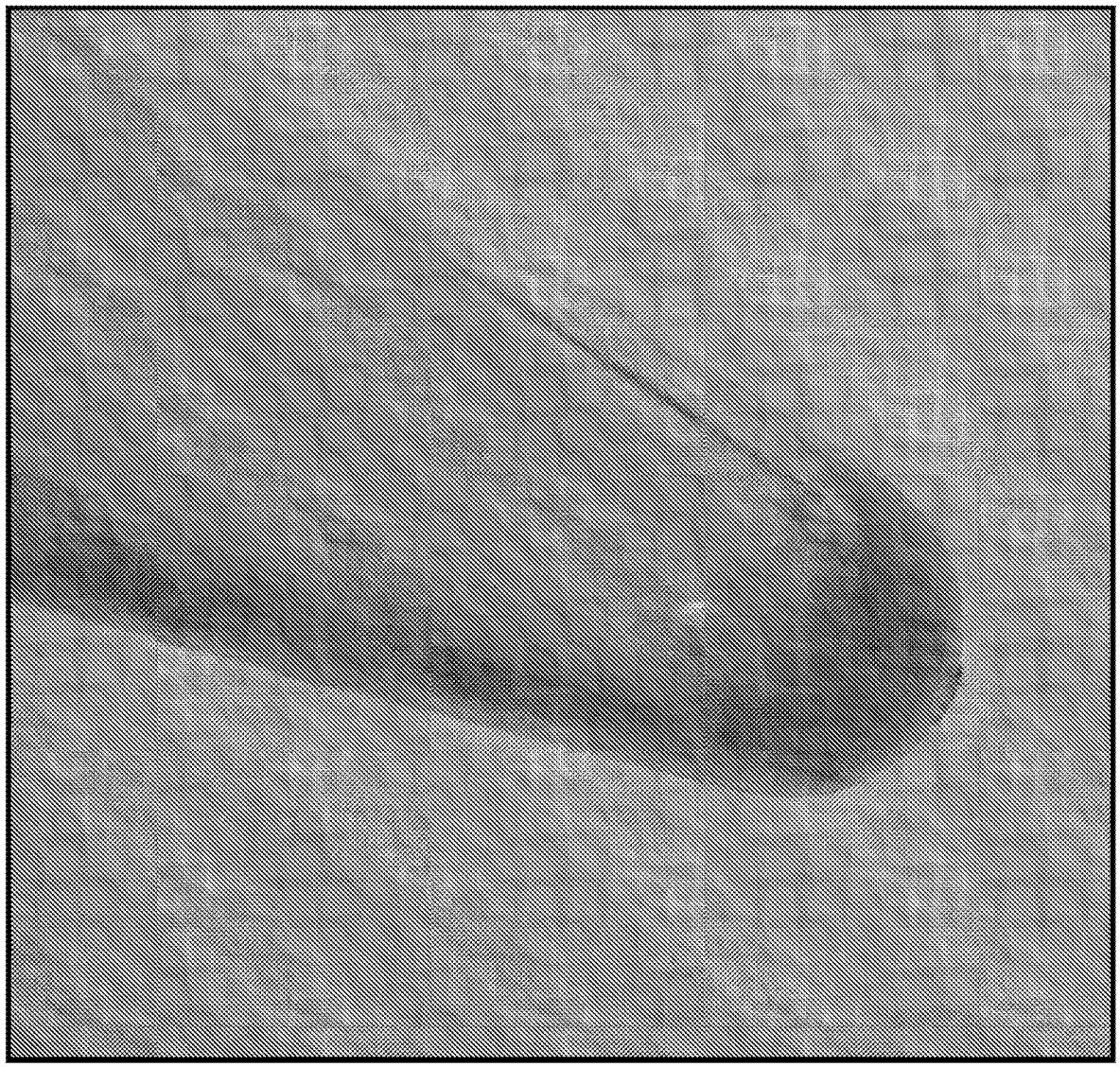
FIG. 6 shows an image of AF-ZOL loaded DNVs, macroscopic view.
Figure 7A:
FIGS. 7A-7B show that topically applied DNVs locally deliver payload within skin layers.
Figure 7B:
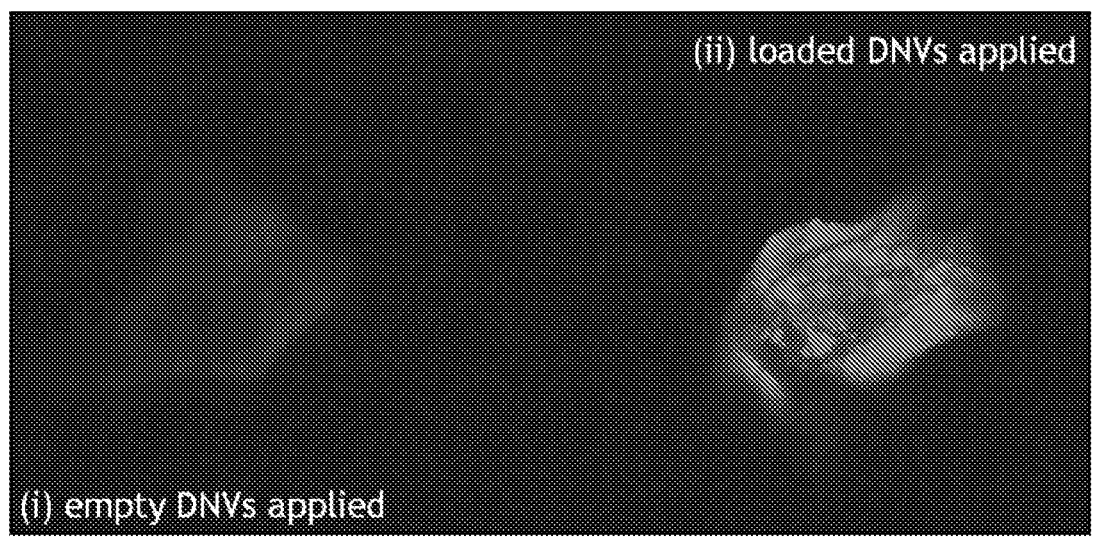
Figure 8:
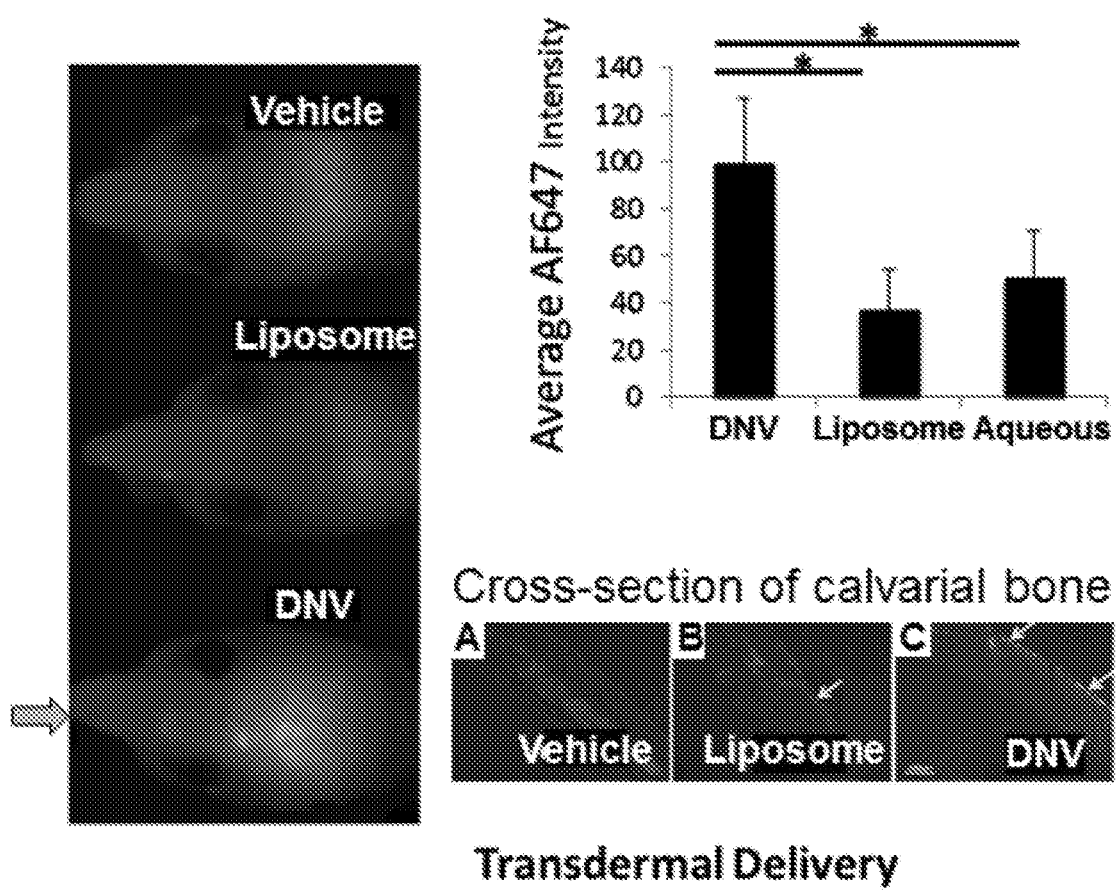
FIG. 8 illustrates significant transdermal delivery of AF-ZOL in a DNV (as compared to drug in conventional liposome or vehicle) based on fluorescence intensity of the calavarial bone, demonstrating proof-of-concept.

FIG. 4A shows the size distribution of DNVs and Table 3 shows a summary of the characterization for both DNVs and conventional liposomes

TABLE 3

Properties of microfluidic produced DNVs and liposomes encapsulating the drug AF-ZOL.

| Characteristics | Nanoparticle Type | |
| --- | --- | --- |
| | DNV | Conventional Liposome |
| Size (diameter) | 221 ± 48 nm | 106 ± 39 nm |
| Zeta Potential | +41.7 ± 3.7 mV | +38.1 ± 1.8 mV |
| Entrapment Efficiency | 39.6% | 37.4% |

DNV stable as lyophilized powder after weeks of storage.

Example 2

In Vivo Study: DNV Application & Innovation in Trans-Oral Mucosal and Trans-Dermal Topical Application In vivo testing in mice wherein DNVs were applied to the gingival surface of the oral mucosa and to the calvarial skin showed that the DNVs were able to efficiently penetrate the oral mucosal barrier and locally deliver drug to the underlying alveolar bone, without systemic payload leakage. In the case of transdermal topical application, the DNVs delivered the payload within the layers of the skin, without penetrating through and delivering drug to the skull bone or systemically.

In particular, an in vivo study was conducted in mice (n=4) to test the performance of DNVs at the two application sites, (i) gingival surface and (ii) calvarial skin (n=2 for each.) A Negative control of empty DNVs was used, tested against the DNVs encapsulating fluorescent bone-targeting drug. Mice were sacrificed, and tissues and bone were analyzed 48 hours after application.

This study suggests that DNV deformability allows these nanovehicles (nano-scale vesicles) to squeeze through pores significantly smaller than their diameter, while retaining their payload without rupturing. This enables them to permeate deeper through particularly obstructive barriers, such as oral mucosal membrane, and avoid potential complications by entering the target site only without systemic payload leakage (see, e.g., FIGS. 4B, 5A-5C, FIG. 6, FIGS. 7A and 7B and FIG. 8.

Discussion

A highly homogenous population of DNVs of size ~200 nm have been efficiently synthesized, to encapsulate a fluorescent bone targeting hydrophilic drug in a quick, controlled and continuous manner from a microfluidic reactor. Here, cationic DNVs were synthesized, but anionic and neutral DNVs may be similarly synthesized, with the same deformability ingredients, varying only in the incorporation of a particular charged component.

In-vivo testing in mice, specifically, application to the oral mucosa and to the calvarial skin, showed that the vehicles were able to efficiently penetrate the oral mucosal barrier and locally deliver drug to the underlying alveolar bone, without systemic payload leakage. In the case of topical application, the DNVs delivered the payload within the layers of the skin, without penetrating through and delivering drug to the skull bone or systemically.

This study suggests that their deformability allows these nano-vehicles to squeeze through pores significantly smaller than their diameter, while retaining their payload without rupturing. This enables them to permeate deeper through particularly obstructive barriers, such as oral mucosal membrane, and avoid potential complications by entering the target site without systemic payload leakage.

Impedance of DNVs in the skin, may be attributed to their size at the time of application. Though homogenous, the population was around the size of 600 nm after the second lyophilization. Studies show that nanoparticles above the size of 200 nm seem to have difficulty penetrating through to the stratum corneum (Singh et al. (2009) *AAPS J.* 11(1): 54-64; Holpuch et al. (2010) *Pharm. Res.* 27(7): 1224-1236; Šentjurc et al. (1999) *J. Control. Rel.* 59(1): 87-97). Further experimentation to determine the effect of DNV size on skin permeation is currently in progress.

Conclusion

Histological analysis permits determination of the sites of accumulation in the skin, gingiva and bone. Given their biodegradability, relatively negligible toxicity, ease of synthesis and potential for large-scale manufacturing, these DNV carriers present a novel local delivery system through the oral mucosal barrier, and locally to the skin, which may be useful for a number of dental, cosmeceutical, or regenerative purposes.

Example 3

Deformable Nano-Scale Vehicles for Trans-Blood Brain-Barrier Delivery

Materials

Deformable nano-scale vehicles (DNV) building blocks were purchased from Sigma Aldrich and Avanti Polar Lipids. Microfluidic system including 2 pumps, syringes, injection loop, microreactor and chip holder were purchased from Syrris. Phosphate-buffered saline (PBS), anhydrous isopropyl alcohol (IPA), chloroform and galangin (GAL) were acquired from Sigma. Dialysis membranes, 0.1 μm and 0.2 μm polyethersulfone(PES) filters, lyophilizer, rotary evaporator and centrifugation tubes were obtained from Thermo Fisher Scientific. Dynamic Light Scatterer was from Wyat, transmission electron microscope was from JEOL, atomic force microscope was from Bruker and mass spectrometer was from Advion.

Methods

Figure 9A:
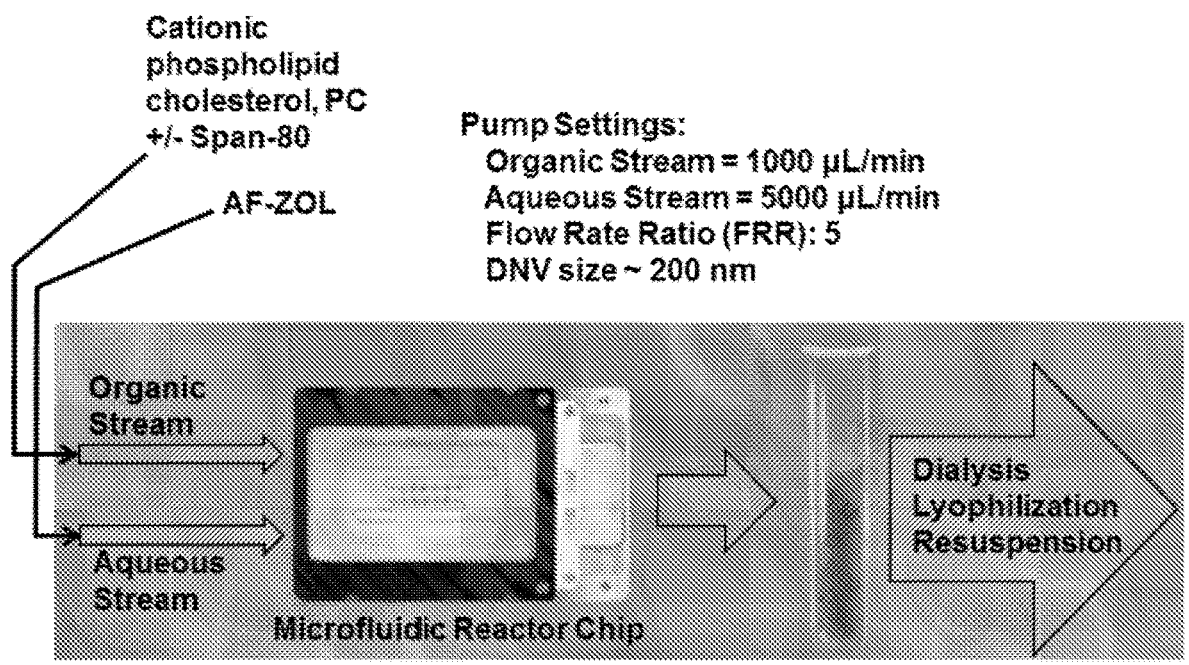
FIG. 9A illustrates a microfluidic synthesis scheme for preparation of DVNs that contain galangin.
Figure 9B:
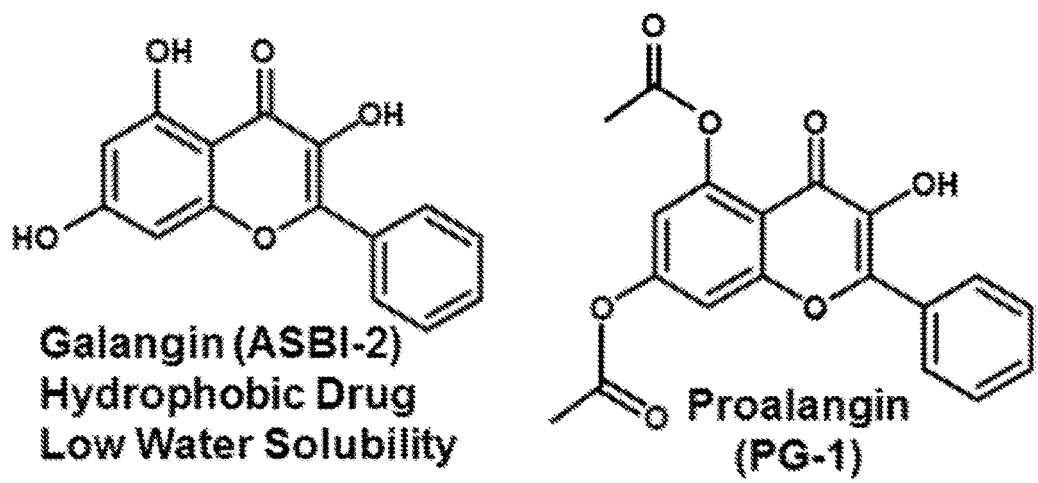
FIG. 9B illustrates the structure of the hydrophobic drug galangin a bioflavonoid with low brain permeability and proglangin (PG-1) a galangin prodrug.

In various embodiments DNV building blocks are composed of lipids anionic phospholipids, cholesterol, and a non-ionic detergent Span 80. The exact lipid components, detergent and molar ratio used are determined based on the intended application of the DNVs as shown in the scheme in FIG. 9. In illustrative, but non-limiting embodiments, 1,2-Dipalmitoyl-sn-glycero-3-phosphocholine (DPPC), cholesterol and dihexadecyl phosphate (DHP) are dissolved in chloroform and mixed in a molar ratio of 4:4:2; then chloroform was allowed to evaporate overnight or in the rotary evaporator. The lipid mixture was dissolved IPA to get a concentration of 20 mM. Then 1.5% (w/w of the lipid mix) of Tween 20 or Span 80 was added to the lipid mixture and mix. Ten millimolar galangin (GAL) is dissolved in IPA, was added to the lipid/detergent mixture in a 4:1 molar ratio followed by filtration through 0.2 μm PES filter. PBS and distillate (dd) water are filtered using the 0.1 μm PES filter. The flow rate ratio of 3-4 (PBS or dd water to IPA) was set up in the pumps and the system was washed with IPA and either PBS or distillate water. Typically the 26 μL microreactor but larger sizes of the reactor can be used to optimize size and morphology can be used for the synthesis of the DNV. Once the microfluidic system has been washed the lipid/GAL/detergent mixture is loaded in the injection loop, then pumped through the microreactor together with and aqueous solution (PBS or dd water) using a second pump at 25-40° C. and 1 bar pressure to produce the GAL encapsulated DNV (Lipo-GAL). After the DNVs are syntheses they are concentrated either by dialysis and lyophilization or ultracentrifugation to produce a pellet of the DNV. Size characterization was then done by DLS and size distribution shown in FIG. 10. The GAL that was not incorporate in the liposomes is removed from the solution using ultracentrifugation or dialysis.

Characterization

Figure 10A:
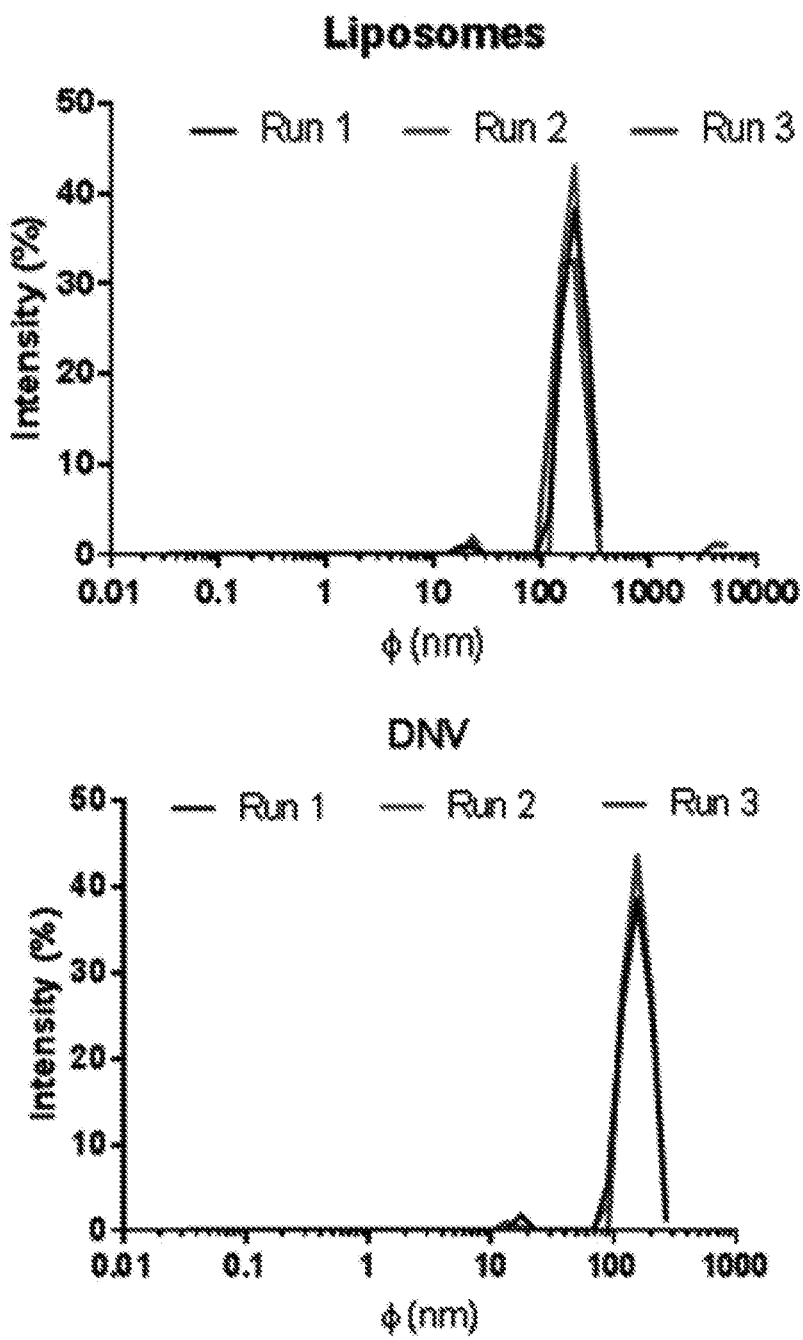
FIG. 10A illustrates the DLS analysis of the microfluidic produced Lipo-GAL DNV showing a size roughly of 150 nm.
Figure 10B:
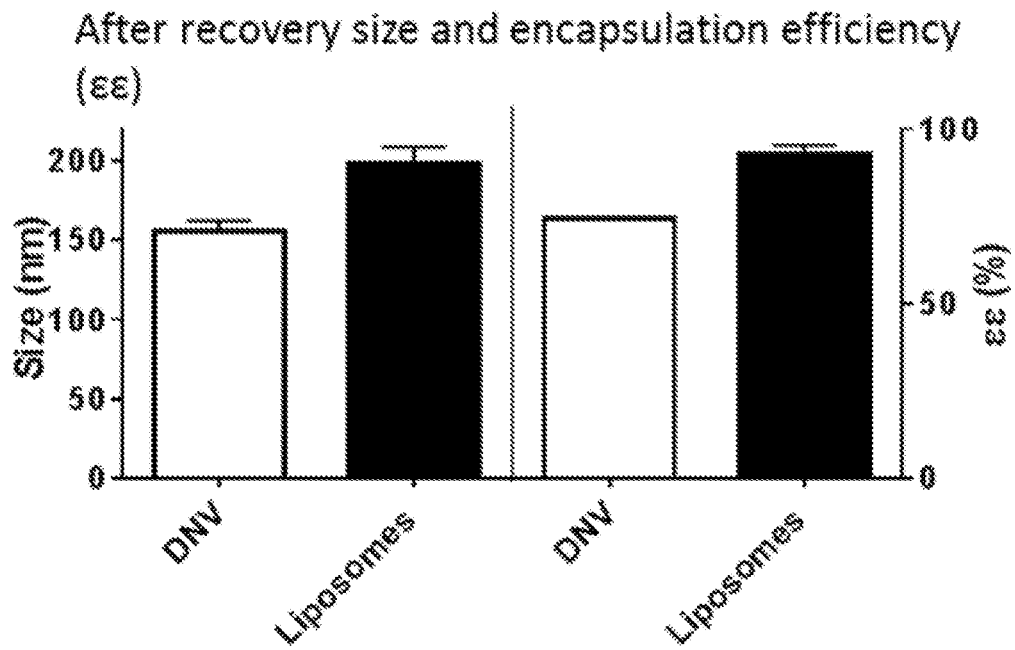
FIG. 10B shows after recover size and encapsulation efficiency of DNV(s) and conventional liposomes.
Figure 10C:
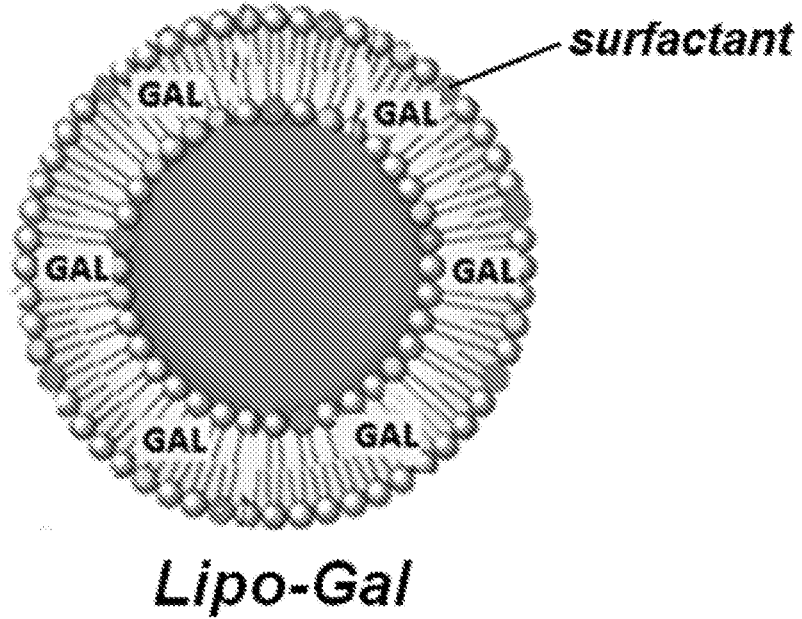
FIG. 10C shows a schematic illustration of a Gal-DNV.

The size of the Lipo-Gal DNV was determined by Dynamic Light Scattering in a Wyatt instrument (FIG. 10). This measurement is confirm by transmission electron microscope and atomic force microscope. The entrapment efficiency is calculated by calculating the free GAL using HPLC and mass spectroscopy.

Discussion.

Deformable nano-scale vehicles are elastic nanoparticles that, in certain embodiments, are composed of phospholipids, such as 1,2-Dipalmitoyl-sn-glycero-3-phosphocholine (DPPC), N-(2,3-Dioleoyloxy-1-propyl) trimethylammonium (DOTAP), 1,2-Dioleoyl-sn-glycero-3-phosphoethanolamine (DOPE). Apart from phospholipids, DNVs contain two key ingredients: cholesterol, a membrane regulator and a non-ionic detergent (e.g., Span 80, Tween 20, etc.) that acts as an edge activator, adding deformability to the lipid bilayer of the nanoparticle.

In one illustrative, but non-limiting embodiment, the lipids (including cholesterol) and the edge activator are present in an 85:15 w/w ratio.

The exact molar ratio and types of lipid components used are determined based on the intended application of the DNVs. For example, in one illustrative embodiment for trans-oral mucosal and topical application, a 5:3:2 molar ratio (DPPC:Cholesterol:DOTAP) can be used, with the mixture containing 15% Span 80 by weight.

These components, dissolved in an organic solvent such as isopropyl alcohol (IPA) are combined with aqueous solution (PBS or DI water) via separate inputs into a microfluidic reactor system for efficient and continuous synthesis at 25° C.-40° C. and 1 bar pressure. The microfluidic reactor channels provide high shear stress and controlled mixing, with minimized turbulence, resulting in well-defined DNV populations, and eliminating the need for post-processing, such as sonication or extrusion to obtain appropriate size. Upon transitioning from organic to aqueous phase, the components described self-configure into DNVs, according to their thermodynamic stability in aqueous solvent.

The DNVs are non-toxic, prepared highly reproducibly with little batch to batch variability, scalable, very homogenous in population and distribution, of tunable size, and provide highly localized payload delivery. Our research shows that this method can produce homogenous populations of size 50 nm to sizes in the micron range. Resultant DNV size is tuned primarily by the adjustment of the flow rate ratio (FRR) between the aqueous phase and the organic, lipid containing, phase. Our investigations have shown that increasing the flow rate ratio directly decreases resultant DNV size as well as reducing size dispersity. For trans-oral mucosal and topical application, a FRR of 100 was used, to obtain DNVs of size centered at 250 nm from the aforementioned components. Note that the same FRR may produce different sized DNVs, depending on the particular types of components used.

The DNVs can be synthesized to encapsulate various classes of drugs, including, for example, small molecules, proteins, RNA, and DNA. They can efficiently encapsulate both hydrophilic and hydrophobic drugs, though are more successful with the latter. In our research, we have synthesized them to successfully encapsulate the following hydrophilic drugs: Fluorescein derivative, Fluorescein Isothiocyanate (FITC), and a fluorescently tagged bone targeting drug. In the case of hydrophobic drugs, we actively use DNVs to encapsulate Galangin, to be delivered through the blood brain barrier. The solubility of a given drug dictates the phase (organic or aqueous) that it is introduced in to the microfluidic reactor, with highest encapsulation when both drug and DNV components are in the same (organic) phase.

Another interesting tunable feature is charge contained on a DNV: DNVs of various charge concentrations (zeta potentials) can be created, through the use of different combinations of charged phospholipid components. We have synthesized neutral (DPPC, cholesterol, DOPE), cationic (DPPC, cholesterol, DOTAP) and anionic (DPPC, cholesterol, DHP) DNVs. The strength of charge can be tuned by adjusting the concentration of a particular charged component in the DNV preparation mixture.

Prototype preparation for in-vivo use (trans-oral mucosal and topical application):

DNV samples collected from the microfluidic reactor are twice dialyzed overnight through a 20K membrane to remove 99.9% of free drug from solution. Following dialysis, samples are lyophilized to a powder and resuspended in a final volume of 10 µL, appropriate for topical and gingival application, via direct pipette application on anesthetized mice. Intended final clinical use in this domain is likely to be in the form of a pre-filled syringe.

DNV application & innovation in trans-oral mucosal and topical application: In-vivo testing in mice, specifically, application to the gingival surface of the oral mucosa and to the calvarial skin, showed that the vehicles were able to efficiently penetrate the oral mucosal barrier and locally deliver drug to the underlying alveolar bone, without systemic payload leakage. In the case of topical application, the DNVs delivered the payload within the layers of the skin, without penetrating through and delivering drug to the skull bone or systemically.

This study suggests that the deformability of DNVs allows these nano-vehicles to squeeze through pores significantly smaller than their diameter, while retaining their payload without rupturing. This enables them to permeate deeper through particularly obstructive barriers, such as oral mucosal membrane, and avoid potential complications by entering the target site without systemic payload leakage.

Materials (Including Characterization)

Microfluidic reactor system, 26 µL reactor chip but larger sizes could be used as needed to control size and morphology, DI Water, PBS, isopropyl alcohol, chloroform, dialysis membranes, lyophilizer, DNV building blocks, including membrane components, membrane regulator and, deformability ingredients. Zetasizer (Malvern Z series), Dynamic Light Scatterer (Wyatt). Transmission Electron Microscope (JEOL). Atomic Force Microscope (Bruker)

In our research, various synthesized DNV populations have been characterized in terms of size, zeta potential, entrapment efficiency, qualitative elasticity, and morphology.

Furthermore, these DNVs remain stable in aqueous suspension for extended periods of time, remaining viable even after two months, though there is some reduction in population homogeneity, likely due to fusion event.

Characterization of the blood brain-barrier permeability of the DNV was measured using a Caco-2 cell system and further confirmed by conducting pharmacokinetic studies in mice.

Example 4

Use of DNVs to Generate Stable CNS-Targeted Liposomes Capable of Penetrating the Blood-Brain Barrier (BBB)

The Tf-Lipo-Gal DNV can be prepared as described in Example 3 in the microfluidic reactor by including a DDPE (18:1 dodecanyl PE, or 1,2-dioleoyl-sn-glycero-3-phosphoethanolamine-N-(dodecanyl)) conjugated Transferrin (Tf) protein in the organic phase. The DNV isolation is as above using ultracentrifugation.

Synthesis of Tf-DDPE Conjugate

Figure 12:
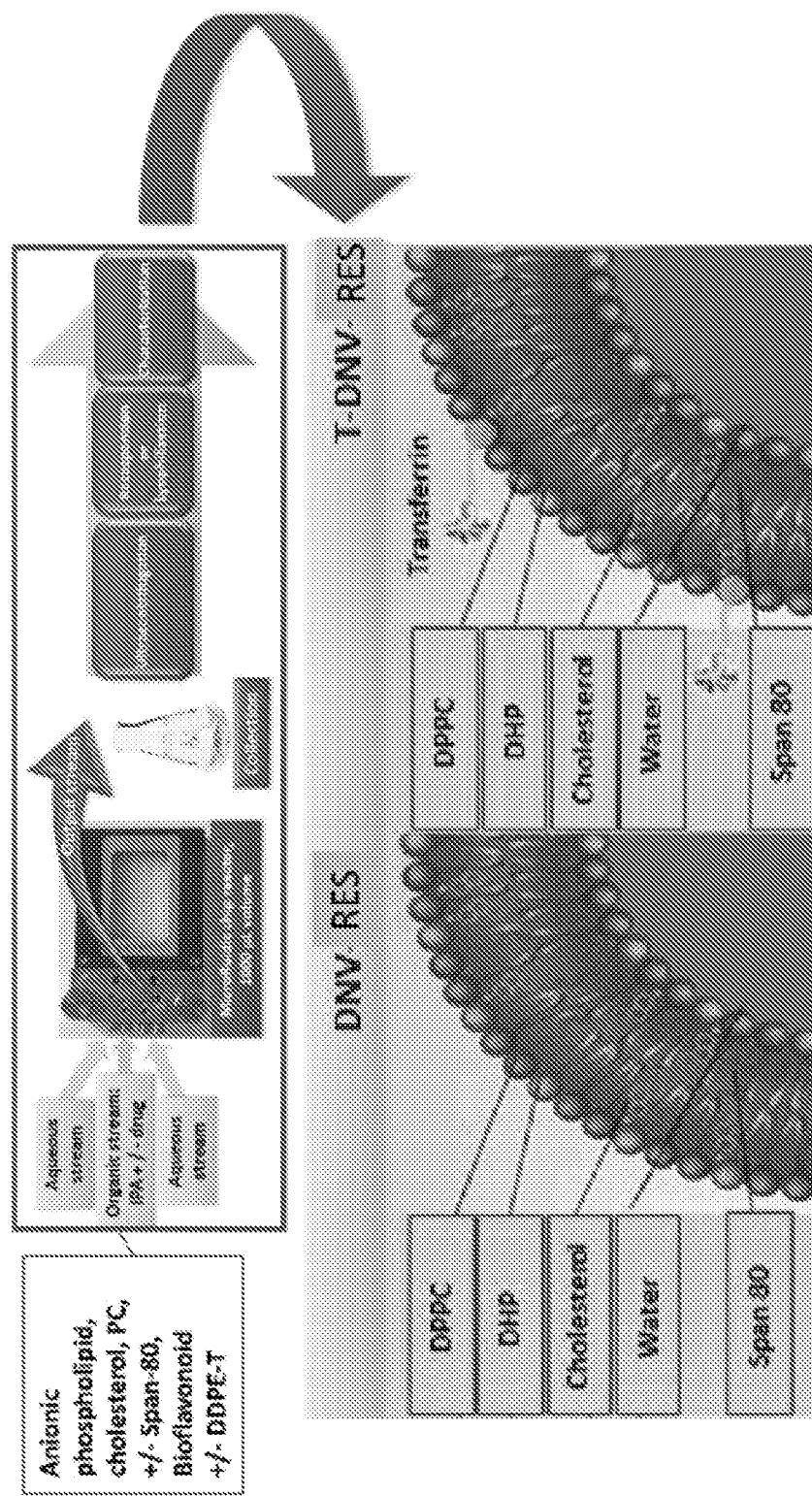
FIG. 12 illustrates the microfluidic reactor synthesis of T-DNV-Gal (top panel) and shows a schematic comparison of a DNV-Gal with a T-DNV-Gal.
Figure 13A:
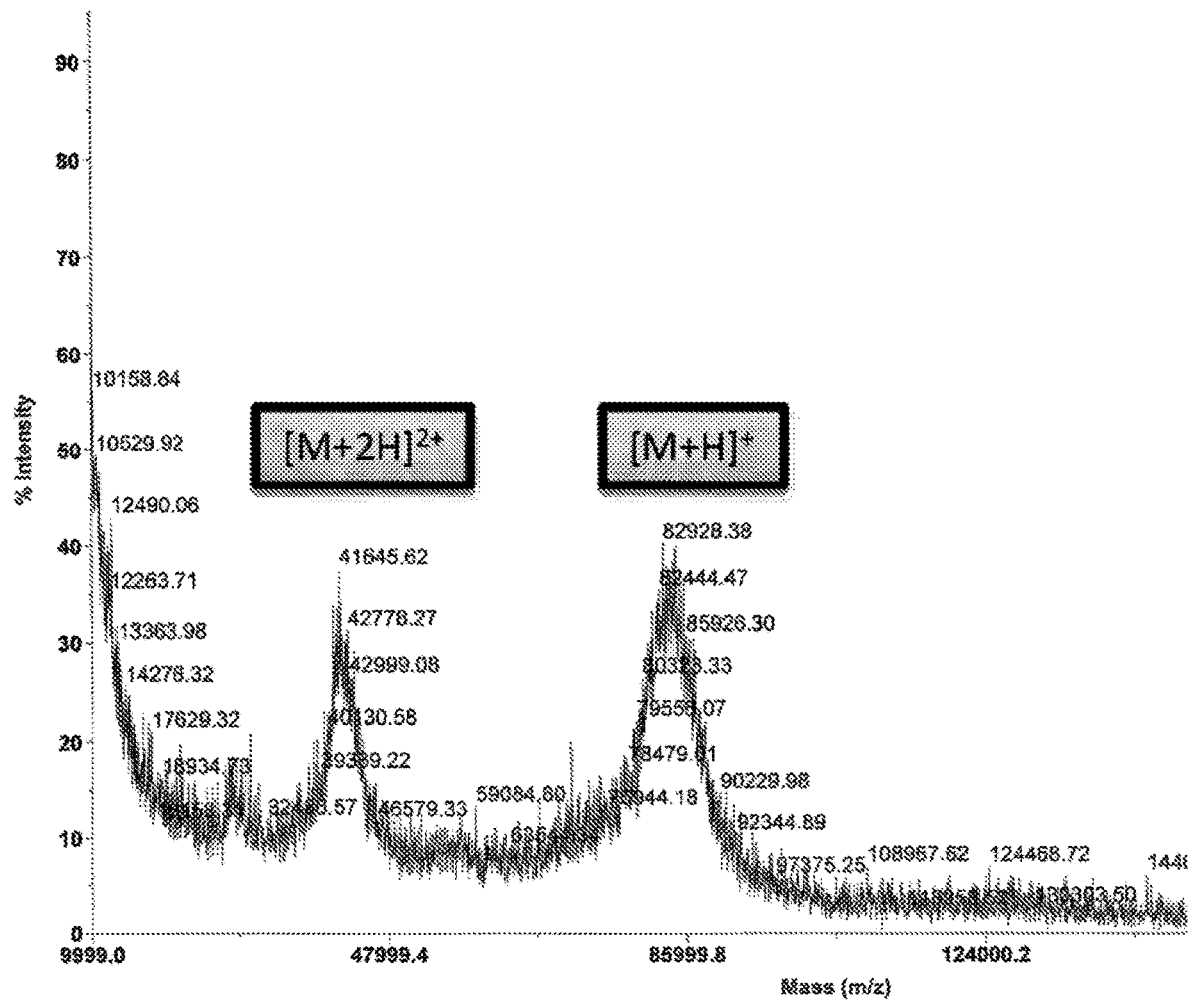
FIGS. 13A-13C, illustrate MALDI-TOF spectrogram of DDPE-Transferrin conjugate (about 3 DDPE per transferrin) (FIG. 13A), SDS PAGE of the Tf-DDPE and Transferrin showing similar migration of DDPE-T and transferrin (FIG. 13B), and a representative schematic of the Tf-Lipo-Gal (FIG. 13C).

Transferrin was conjugated to DDPE by utilizing carbodiimide chemistry in PBS (Muthu et al., 2015). In general, for conjugation of transferrin to DDPE, N-hydroxy-succinimide (NETS) and 1-ethyl-3-(3-dimethylaminopropyl) carbodiimide hydrochloride (EDC.HCl) were added to a solution of DDPE in PBS (pH 5.8) with a molar ratio of 1:5:5 (DDPE:EDC.HCl:NHS). Specifically, to a stirred solution of DDPE (50 mg, 0.05 mmol) in 1.5 mL PBS (pH 5.8) was added EDC.HCl (49 mg, 0.26 mmol) and NETS (30 mg, 0.26 mmol). The reaction mixture was stirred at 25° C. for 5 h, followed by stirring at 4° C. for 24 h. Crude mixture was further mixed with 1 mL of 2% (w/v) transferrin and stirred at 4° C. for 8 h. Reaction mixture was further divided in to two aliquots and were dialyzed by 3 mL dialyzing cassettes (MW cutoff: 20 kDa) against distilled water (ddH$_2$O) for 48 h—with frequently changing ddH2O after first 2 h, and repeated thrice after each 12 h in order to remove excess DDPE, NETS and EDC hydrochloride. The solution obtained was flash frozen and lyophilized to afford DDPE-Transferrin conjugate as colorless powder in good yield, which was stored at −20° C. under inert atmosphere until required for liposome synthesis (FIG. 12). MALDI-TOF characterization is shown in FIG. 13 along with SDS-PAGE and representative cartoon for Tf-Lipo-Gal. The MALDI mass spectroscopic analysis shows that the DDPE to transferrin ratio is (4:1).

Synthesis of Brain Permeable Small Molecule-DDPE Conjugate

Figure 11A:
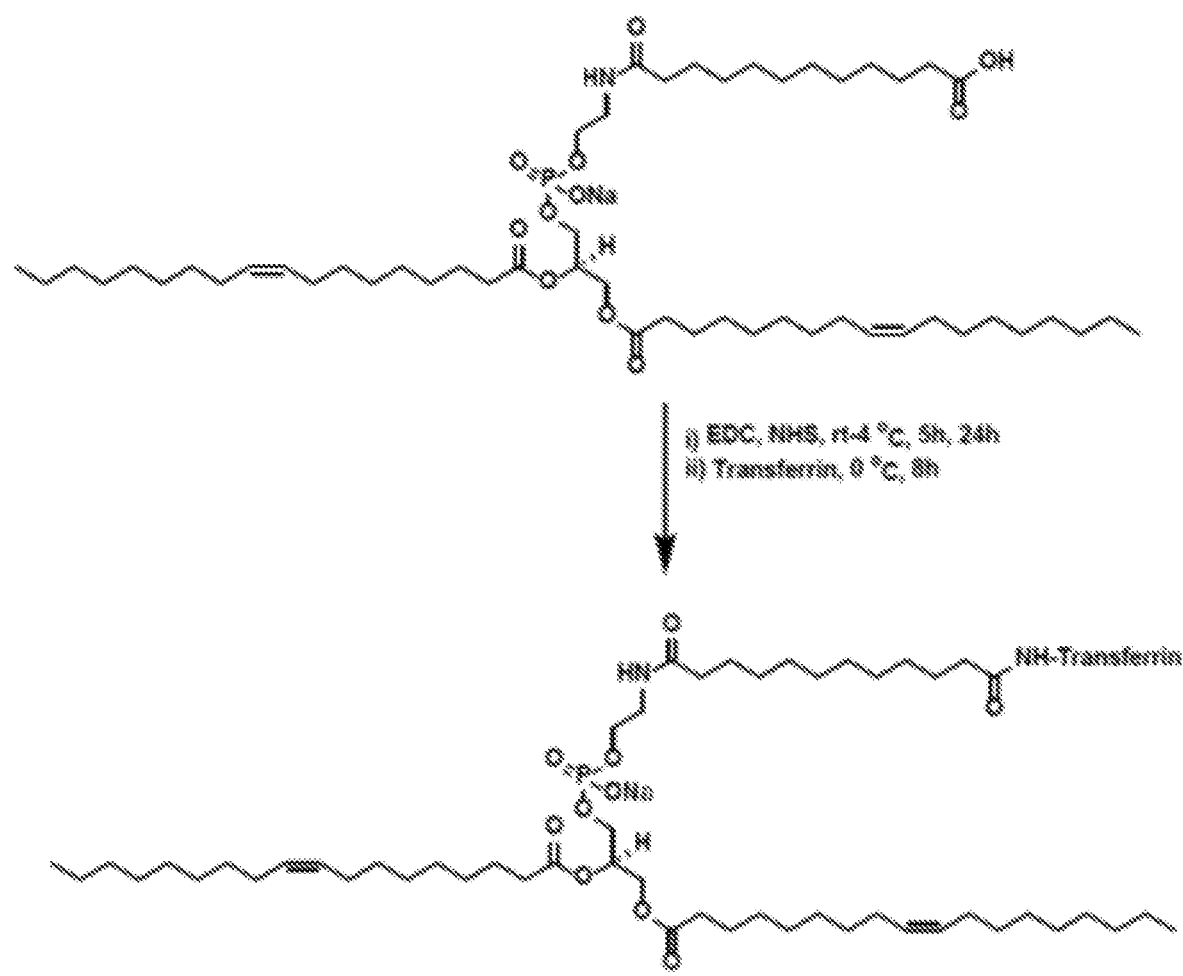
FIGS. 11A and 11B illustrates the synthesis of a transferrin conjugated phospholipid (Tf-DPPE).
Figure 11B:
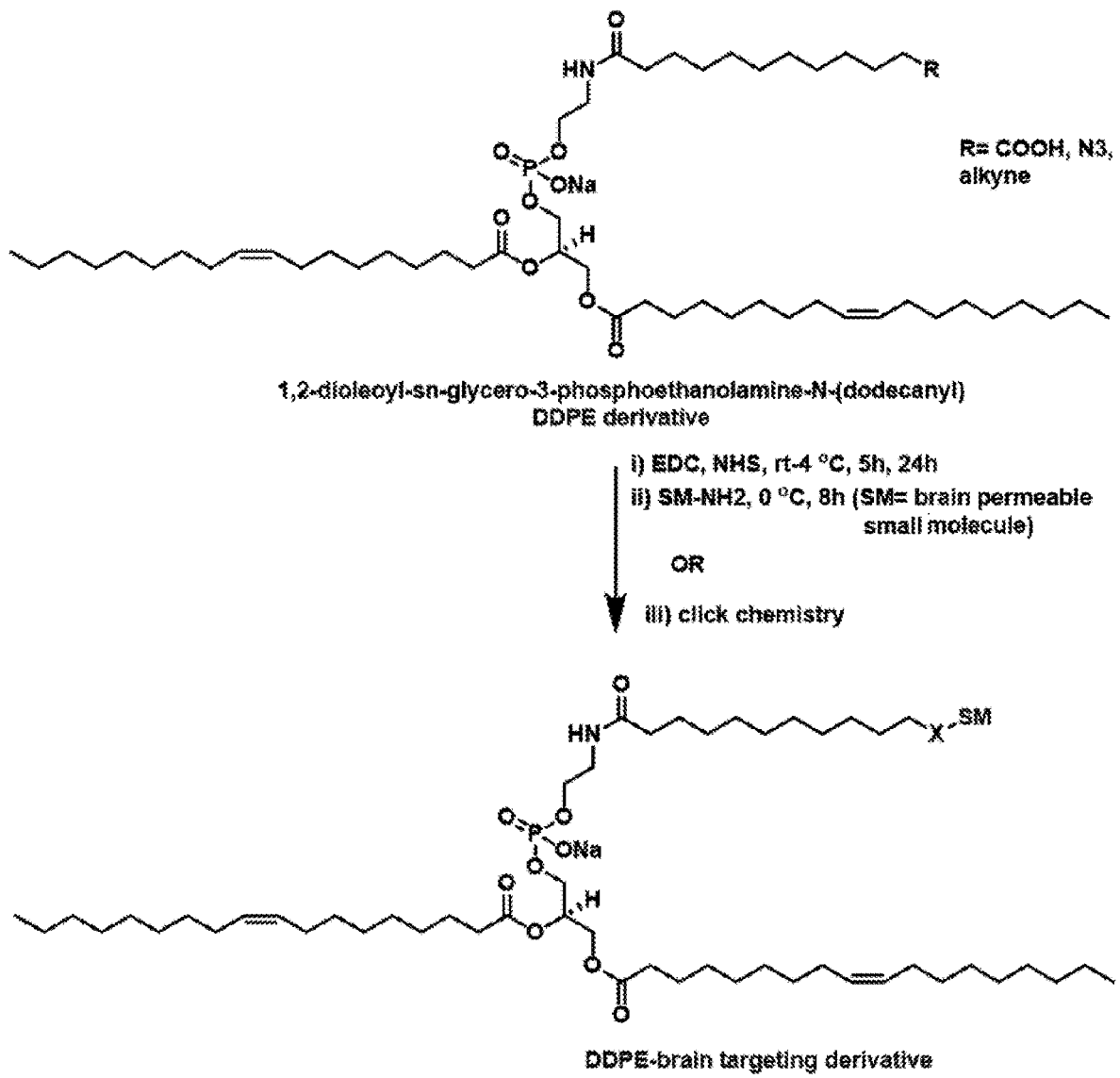

As shown in FIG. 11B, brain permeable small molecule templates with enhanced brain permeability such as benzodiazepines or molecules that use transporters such as neutral amino acid transporters (LAT1) or glucose transporters (GluT1) can be anchored on to DDPE through active ester coupling shown in FIG. 11A or through click chemistry as shown in FIG. 11B. Covalently coupling of the small molecule to the DDPE would be done using the Cu(I)-catalyzed azide-alkyne cycloaddition (CuAAC) or a Cu(I)-free azide click chemistry reaction.

Example 5

Use of DNVs to Generate Stable CNS-Targeted Liposomes Capable of Penetrating the Bloodbrain Barrier (BBB) Such as for Treatment of Glioblastoma Multiformed (GBM)

DNVs may be used to deliver potential therapeutic agents for the treatment of glioblastoma multiforme (GBM), the most aggressive and lethal of all cancers. GBM is refractory to conventional treatment due, in part, to the invasive nature of GBM cells and sequestration of these tumors to the central nervous system (CNS).

As GBM may arise from lower grade gliomas and more than 70% of these have isocitrate dehydrogenase IDH1/2 mutations leading to gain-of-function increases in enzymatic activity, there is interest in IDH1 inhibitors as therapeutics. We are encapsulating commercially available IDH1 inhibitors such as AGI-5198 in DNVs to test efficacy in a variety of glioma cell lines and in vivo models of glioma and GBM.

In addition, as recent studies have shown that mutated tumor-suppressor p53—found in >50% of human tumors—produces aggregation-prone peptides resulting in loss-of-function, we are also encapsulating interrupters of p53 aggregation. Delivery of these peptidic interrupters in the DNVs would enable in vivo evaluation of any anti-tumor effects.

Example 6

Use of DNVs for Delivery of Large Biomolecules Across the BBB for AD sAPPα is a 100 Kd fragment from alpha processing of APP and has recently been shown by the Drug Discovery Lab to inhibit beta secretase BACE1. As BACE inhibitors have potential as Alzheimer's Disease (AD) therapeutics, delivery of sAPPα across the BBB would enable its evaluation as a potential BACE inhibitor. We are generating DNVs to stably encapsulate recombinantly produced sAPPα and will evaluate their efficacy in AD mouse models.

Example 7

Use of DNVs for Delivery of miRNA Across the BBB to the Brain for AD

DNVs can also be used for delivery of micro RNAs (miRNA) such as miRNA-107 (miR-107) in for Alzheimer's disease (AD) treatment. miRNAs are endogenously expressed forms of small interfering RNA (siRNA) that are non-protein coding RNAs which function as regulators of gene expression. miR-107 has been shown to be decreased in cerebral spinal fluid (CSF) in early AD and this decrease may accelerate disease progression through upregulation of BACE expression and activity. Thus increasing the levels of miR-107 in the brain could potentially normalize BACE expression and activity, reduce Aβ peptide production (implicated in AD pathology), increase sAPPα and be a potential therapeutic approach for AD. Delivery of miR-107 in CNS-targeted DNVs prepared in our microfluidic reactor affords the possibility of modulating BACE in vivo. We plan to test these DNVs in AD mice both for BBB permeability and efficacy. Similarly other miRNAs that modulate disease pathology in AD and other CNS disorders can be synthesized and tested in vivo.

Example 8

Use of DNVs for Delivery of Drugs Across the BBB to the Brain by the Transdermal Application for Parkinson's Disease (PD)

DNVs can be used to encapsulate and deliver PD drug pramipexole transdermally to ease delivery and increase compliance. Pramipexole is a low molecular weight therapeutic with good water solubility that stimulates dopamine receptors in the brain. Due to its highly polar hydrophilic nature (log P of 0.4 measured experimentally), transdermal delivery of the free drug across the stratum corneum (outer layer of skin) is difficult. We are encapsulating pramipexole in DNVs to test the ability of these DNV nanoparticles to cross the stratum corneum and allow transdermal delivery of pramipexole to the brain.

Example 9

Use of DNVs for Delivery of Sirtuin 1 (SirT1) Enhancers for Amyotrophic Lateral Sclerosis (ALS)

DNVs can also be used to encapsulate sirtuin 1 (SirT1) enhancers for ALS therapy. In vivo studies in mouse models of ALS have shown that increasing SirT1 levels ameliorates the ALS phenotype. Molecules that increase SirT1 levels will be encapsulated in DNVs for transdermal delivery for the treatment of ALS and will tested in mouse models of ALS.

Example 10

Using Caco-2 Cells to Determine the Permeability of Galangin- and Resveratrol-Containing Deformable Nanovesicles, With and Without Transferrin

Summary of Example 10

A common challenge in treating neurodegenerative disorders such as Alzheimer's disease (AD) is to penetrate the blood brain barrier (BBB) and effectively deliver compounds into the central nervous system. We approach issue by synthesizing deformable nanovesicles (DNVs), with and without transferrin, that encapsulate potential therapeutics that are typically unable to penetrate the BBB. Two such compounds are galangin (see, FIG. 9B) and resveratrol (see, FIG. 14). In order to test the ability of DNVs with and without transferrin to transport these compounds across the BBB, we use Caco-2 cells to mimic the tight junctions that help make up the BBB. Both galangin and resveratrol were better able to penetrate the Caco-2 cells when they were packaged in DNVs, but there was no difference between DNVs that contained transferrin and DNVs that did not contain transferrin.

Background for Example 10

In certain embodiments deformable nanovesicles (DNVs) are liposomes that contain the surfactant Span 80 (FIG. 2).

Figure 15:
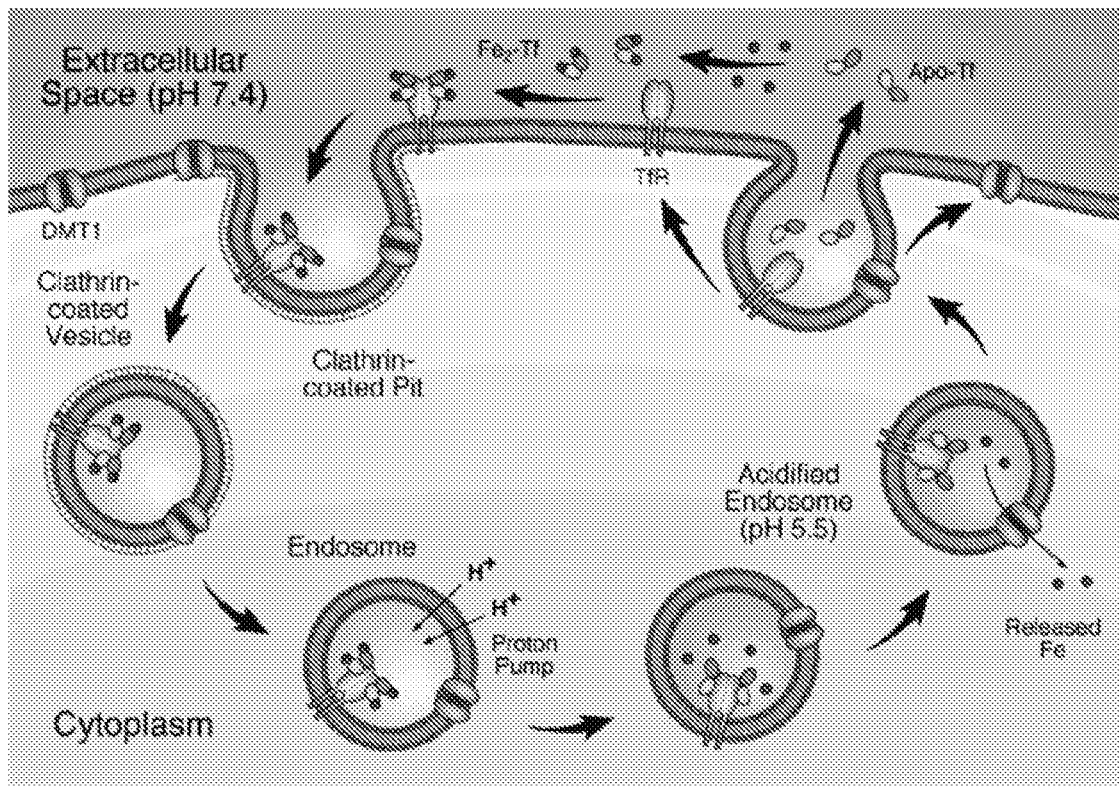
FIG. 15 illustrates that transferrin (Tf) loaded with iron binds to transferrin receptors on the surface of a cell. It is then transported inside the cell via receptor-mediated endocytosis.

We use a microfluidic reactor to encapsulate compounds into these DNVs. Two such compounds are galangin, a bioflavonoid isolated from ginger root, and resveratrol, a stilbene found in red wine, peanuts, and other foods. These compounds have potential therapeutic properties for AD, but they are unable to penetrate the BBB to exhibit their therapeutic effects. In order to potentially enhance the ability of the DNVs to penetrate the BBB, we also add transferrin to them. In previous studies, endothelial cells took up liposomes coupled to transferrin by a receptor-mediated mechanism, as seen in FIG. 15. This pathway may enhance the ability of the DNVs to bind to the Caco-2 cells and then pass through their tight junctions. We use Caco-2 cells (epithelial human colon adenocarcinoma), which form tight junctions similar to those found in the BBB, to test the ability of DNVs with and without transferrin to penetrate the BBB.

Methods.

Figure 16:
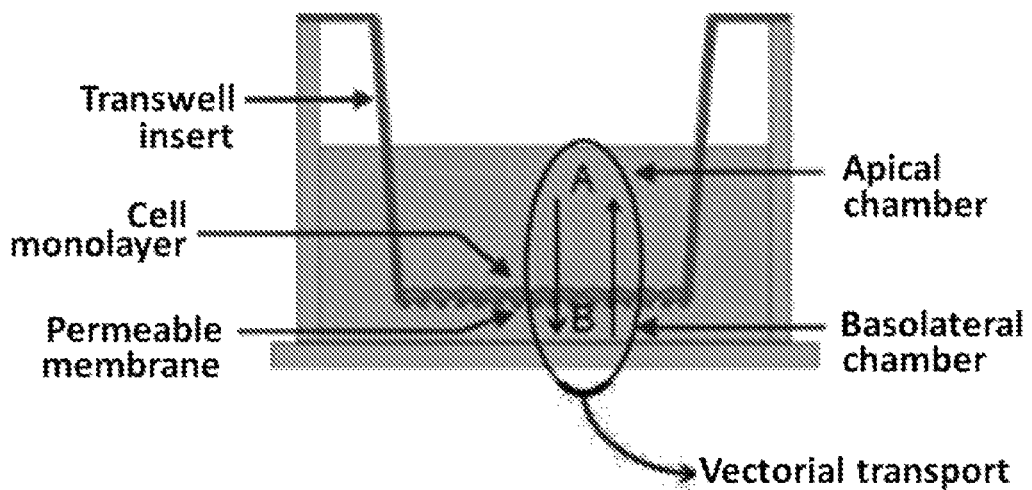
FIG. 16. Permeability testing in Caco-2 cells. The apical chamber contains galangin- or resveratrol-filled DNVs.

DNVs were formed by dissolving DMPC, DCP, and CH (2:2:1) with either galangin or resveratrol in IPA to create a 10 mM solution. To create DNVs with transferrin, transferrin was added at 0.1% of the lipid mass. This solution was then injected into a microfluidic reactor with a flow rate of 500 µL/min, while water is also injected with a flow rate of 5 mL/min. Caco-2 cells were grown for three passages before they were plated as a monolayer on transwell inserts, and are then grown for an additional month. Galangin- and transferrin-packaged DNVs, with and without transferrin, were placed in the apical chamber of each transwell insert, and half of the volume from the basolateral chamber was removed and replaced with HBSS every 15 minutes (FIG. 16). The drug concentration in each of these samples was determined using LC-MS, and the permeability coefficient for passive transfer of each compound was calculated with the equation: $P_{app}=(dQ/dt)(1/(AC_0))$, where dQ/dt is the amount of drug that permeates the membrane over time (cm/s), A is the surface area of the filter (cm$^2$), and $C_0$ is the initial concentration in the donor chamber (µmol/cm$^3$).

Results.

Resveratrol and galangin were better able to penetrate the Caco-2 cells when they were packaged in DNVs, but there was no difference between the ability of DNVs with and without transferrin to penetrate the cells (FIG. 17). Both resveratrol DNVs with transferrin (RTD) and without transferrin (RD) had greater permeability coefficients than free resveratrol (FIG. 18). Galangin DNVs with transferrin (GTD) and without transferrin (GD) reached equilibrium before the first time point of 15 minutes, as seen by the slope of essentially zero in FIG. 17 and the low Papp in FIG. 18.

Conclusion.

These data suggest that DNVs will effectively deliver normally impermeable compounds into the CNS through the BBB.

Example 11

Encapsulation and Testing of GAL-DNV and T-DNVs

Pharmacokinetics of galangin and progalangin in mice are shown in FIGS. 19A and 19B. As shown therein, low brain levels of galangin were observed with a $C_{max}$ of approximately 50 ng/g at 1 h and a low brain to plasma ration (1:10) (FIG. 19A). Galangin was observed to reduce Aβ40 levels, but had no effect on Aβ42 levels (FIG. 19B). Progalangin reduced Aβ40 as well as Aβ42 levels (FIG. 19B).

Having established pharmacokinetics it was decided to see of deformable nanovesicles (DNVs) can more effectively target galangin to the brain. Additionally it was desired to test if transferrin, known to enhance brain permeability, would be useful so Gal-DNV were prepared with and without transferrin.

Phospholipid-based deformable nanovesicles (DNVs) as described herein provides a number of advantages including, but not limited to:

flexibility in shape;
encapsulation of diverse classes of therapeutics; and
localized transdermal delivery while minimizing systemic exposure (see, e.g., FIG. 20).

As illustrated in FIGS. 21A and 21B, a microfluidic reactor was used for the synthesis of the DNVs described herein. Microfluidic reactor based synthesis of DNVs allows alteration of input parameters such as flow speeds, molar and flow rate ratios, and allows fine-tuning of key DNV properties (e.g., size, elasticity and surface charge).

As illustrated in FIG. 21A, using a microfluidic reactor the total flow rate (TFR) and the flow rate ratio (FRR) can be adjusted to fine tune the size of the DNVs. It is noted that the FRR is inversely related to the size of the liposomes.

FIG. 22 illustrates certain differences in composition between conventional liposomes and DNVs, while FIG. 10A, shows differences in the physical properties of DNV(s) and conventional liposomes via DLS and FIG. 10B shows size after recover and encapsulation efficiency of DNV(s) and conventional liposomes.

As noted above, it was decided to prepare DNV(s) functionalized with transferrin. Transferrin is a serum glycoprotein (~80 KDa) that binds to transferring receptors (TR) which are highly expressed in brain, microvascular endothelial cells (BMVECs), and brain glioma cells. Transferring can cross the blood brain barrier via receptor-mediated endocytosis (see, e.g., FIG. 15) and Tf-containing nanoparticles have been used to deliver siRNA to cancer patients and shown to deliver functional siRNA to melanoma tumors in a dose-dependent manner. However the avidity must be modulated appropriately to allow receptor binding from the blood, transcytosis across the BBB, and release from the receptor into the brain parenchyma. Experiments were performed to determine if transferrin functionalized DNVs can improve delivery of a therapeutic agent (e.g., galangin) to the brain.

To prepare transferrin-functionalized DNV(s), DDPE was conjugated to holo-transferrin using carbodiimide chemistry (see, e.g., reaction scheme in FIG. 11). A microfluidic reactor was used to synthesize the functionalized DNV(s) (see, e.g., FIG. 23). Excess NHS, EDC and unconjugated DDPE was removed using dialysis. After purification, DDPE-T conjugate was lyophilized and stored at −20° C. until required for T-DNV synthesis. Tt is stable at −20° C. for many months.

Images of DNV(s), DNV(s) containing galangin, transferrin-functionalized DNV(s), and transferrin-functionalized DNVs are shown in FIG. 24.

Figure 13B:
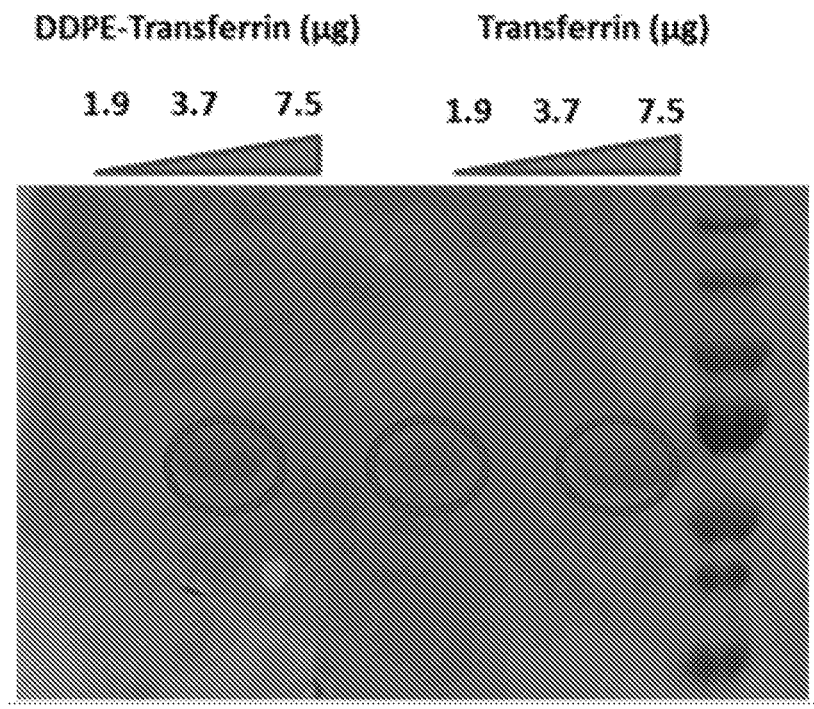
Figure 13C:
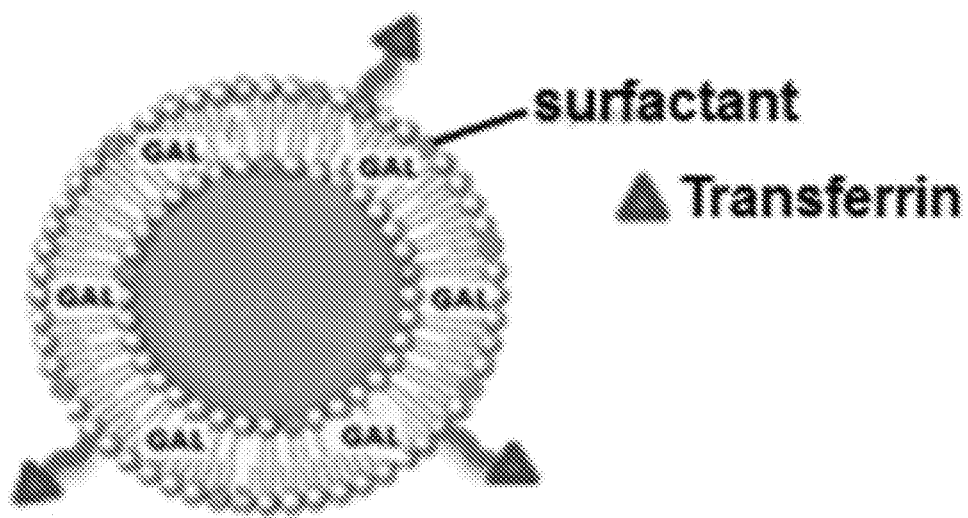

DDPE-T conjugate was characterized by MALDI-TOF after purification and lyophilization (see, e.g., FIG. 13A), and SDS-PAGE showed the similar migration of DDPE-T and transferrin (FIG. 13B). A schematic illustration of the DNV is shown in FIG. 13C.

Cell permeability of GAL-DNV(s) and GAL-T-DNVs was used using a CACO-2 cell model which simulates a blood-brain barrier (see, e.g., FIG. 25).

Transport of the DNVs through the CaCO-2 cell model was evaluated after a period fo culture of 21 days. Test article concentration was 100 μM, cell seeding density was 2.5×105, and TEER>350 Ωcm². The analysis showed that Gal-DNV and Gal-T-DNV have similar permeability in this model (see, e.g., FIG. 26).

Example 12

CNS Delivery Using sAPPα-DNVs sAPPα is a large 678 amino acid protein. DNVs containing sAPPα (sAPPα DNVs) were produced as described herein. Table 4 illustrates the characterization of the sAPPα-DNVs.

TABLE 4

Characterization of sAPPα-DNVs.

| Sample | Average Z-ave (d · nm) | [ ] μM | Encapsulation Efficiency |
|---|---|---|---|
| sAPPα-DNV | 165 | 3.1 | 43 | sAPPα-DNV were tested in CHO-7W cells. sAPPβ and Aβ1-42 was assayed from the media using AlphaLISA detection kits. Reduction of sAPPβ and Aβ1-42 was observed (see, e.g. FIG. 27), indicating that the sAPPα contained in the DNV was functional after the DNV synthesis and exhibited target engagement.

Wild type mice were dosed intravenously with 20 μg of sAPPα-DNV and were euthanized after 1 and 24 h, brains were perfused with saline, homogenized and sAPPα levels were assessed in the brain homogenate using AlphaLISA detection kit. sAPPα was detected in the brain homogenate after 1 h (see, e.g., FIG. 28).

Wild type mice were dosed either subcutaneous (Sub Q) or intraperitoneal (IP) with 20 μg of sAPPα-DNV. Mice were euthanized after 1 and 4 h of dosing, brains were perfused with saline, homogenized and sAPPα levels were assessed in the brain homogenate using an AlphaLISA detection kit. sAPPα was detected in the brain homogenate after 1 h. The results show that possible to detect 1.8 nM of sAPPα in brain at 1 h and 1.85 nM of sAPPα in brain at 4 h by the Sub Q route. By the IP route we could detect 1.7 nM and 1.8 nM sAPPα at 1 and 4h respectively (see, e.g., FIG. 29). In comparison could detect ~12 nM of sAPPα in the brain by the IV route.

E4FAD mice were dosed intravenously with 20 μg of sAPPα-DNV, or 20 μg of sAPPα and empty DNVs (control). Mice were euthanized after 1 h, brains were perfused with saline, homogenized and sAPPα and sAPPβ levels were assessed in the brain homogenate using AlphaLISA detection kits. A trend towards reduction of sAPPβ was observed (P~0.0731) (see, e.g., FIG. 30). sAPPα by itself or vehicle did not cause a reduction in sAPPβ levels.

As illustrated above, in certain embodiments the Deformable Nanoscale Vesicles (DNVs) described herein comprise liposomes of <200 nm that are able to deform while maintaining a payload within. In various embodiments they are composed of GRAS (generally regarded as safe) materials, and are able to encapsulate a variety of molecules including small molecules, both lipophilic and hydrophilic, DNA/RNA/siRNA and peptides/proteins/aptamers and combinations thereof. The surface of the DNVs can be easily modified to include different surface charges, molecules like PEG for longer circulatory half-life and carrier proteins for targeted drug delivery. The DNV can readily be synthesized in a microfluidic reactor which enables us to control their size, zeta potential, and enables scalability and batch-to-batch reproducibility. The DNVs we synthesize can readily be stored as lyophilized powder and we have determined this form is stable in storage at least for six months.

As shown above, we have demonstrated proof-of-concept using a large neurotrophic factor, soluble Amyloid Precursor Protein-α (sAPPα, a 678 amino acid protein) and have shown that with DNV-sAPPα, delivery to the brain of a pharmacological relevant dose of ~12 nM of sAPPα is achieved resulting in target engagement.

Thus, it is demonstrated that the DNV platform can deliver large molecules to the CNS although it will be recognized that the DNVs can be optimized for delivery of particular moieties.

Drug delivery to the central nervous system (CNS) has been difficult especially for large biomolecules. This is specifically true for delivery of antibodies for treatment of Alzheimer's disease (AD) and other neurodegenerative disorders. Similar obstacles are faced for anti-brain tumor therapeutics. Accordingly, in certain embodiments the DNV platform described herein can be used for CNS delivery of large biomolecules which as broad application in neurodegenerative disorders such as AD, Parkinson's disease (PD), amyotrophic lateral sclerosis (ALS), traumatic brain injury (TBI), stroke, postoperative cognitive dysfunction (POCD) and immunotherapy for brain tumors.

Accordingly, In certain embodiments the DNVs described here are believed to be suitable for delivery of an antibody. The antibody can be encapsulated using a microfluidic reactor as described herein. The Ab-DNV can be administered, inter alia, by the intravenous (i.v.) and sub Q routes to determine brain delivery. Where the antibody is labeled, the antibody distribution in the brain can be determined by fluorescence imaging of brain homogenates and slices along with whole animal imaging.

Illustrative antibodies that can be delivered to the CNS using DNVs descried herein include, but are not limited to an scFv, an IgG, a Fab, an (Fab')2, and an (scFv')2.

In certain embodiments the antibody delivered in the DNVs described herein is an antibody believed to have efficacy in the treatment of a neurodegenerative disease (e.g., Alzheimer's disease (AD), amytrophic lateral sclerosis (ALS), cerebral palsy, dementia/Frontotemporal Dementia (FTD), Huntington's disease, mild cognitive impairment (MCI), Parkinson's disease (PD), primary lateral sclerosis (PLS), ischemia/stroke, taupathies, traumatic brain injury (TBI), chronic traumatic encephalopathy (CTE, etc.).

In certain embodiments the antibody is one that binds to a protein selected associated with a neurodegenerative disorder (e.g., beta-amyloid (Aβ), alpha-synuclein (α-syn), tau, APP, and TAR DNA-binding protein 43 (TDP-43), or fragments thereof). In certain embodiments the antibody binds to toxic oligomeric variants of these proteins but do not bind monomeric, fibrillar or non-disease associated forms of said protein.

Illustrative antibodies include, but are not limited to antibodies that bind to Aβ or a fragment thereof and/or a precursor thereof. In certain embodiments the antibody can be an antibody selected from the group consisting of Bapineuzumab (humanized 3D6, Janssen/Pfizer), Solanezumab (humanized m266, Eli Lilly), Gantenerumab (full human, Hoffmann-La Roche), Crenezumab (humanized IgG4, Genentech), BAN2401 (humanized mAb158, Eisai Inc.), GSK 933776 (humanized IgG1, GlaxoSmithKline), AAB-003 (Fc-engineered bapineuzumab, Janssen/Pfizer), SAR228810 (humanized 13C3, Sanofi), BIIB037/BART (full human IgG1, Biogen Idec). Target eiptopes of these antibodies are known to those of skill in the art and described, inter alia, in Table

TABLE 5

Illustrative antibodies that bind to Aβ.

| Compound | Epitope | References |
|---|---|---|
| Bapineuzumab (humanized 3D6) | Amino terminus | Salloway (2012) *Eur J Neurol.* 19: SC312; Sperling (2012) *Eur J Neurol.* 19: SC3012 |
| Solanezumab (humanized m266) | Central (amino acids 16 to 24), accessible only on soluble amyloid-β | Farlow et al. (2012) *Alzheimers Dement.* 8: 261-271; Tayeb et al. (2013) *Expert Opin. Biol. Ther.* 13: 1075-1084 |
| Gantenerumab (full human) | Amino terminus and central portions of amyloid-β | Bohrmann et al. (2012) *J. Alzheimers Dis.* 28: 49-69; Ostrowitzki et al. (2012) *Arch. Neurol.* 69: 198-207 |
| Crenezumab (humanized IgG4) | Conformational epitopes, including oligomeric and protofibrillar forms | Adolfsson et al. (2012) *J. Neurosci.* 32: 9677-9689; Garber (2012) *Nat. Biotechnol.* 30: 731-732 |
| BAN2401 (humanized mAb158) | Binds large-size amyloid-β protofibrils (>100 kDa) | Moreth et al. (2013) *Immun. Ageing.* 10: 18-10; Randomized, Double-blind, Placebo-controlled, Combined Single Ascending Dose and Multiple Ascending Dose Study (www.clinicaltrials.gov/ct2/show/NCT01230853?term=ban2401&rank=2) |
| GSK 933776 (humanized IgG1) | Amino terminus | Moreth et al. (2013) *Immun. Ageing.* 10: 18-10; A Clinical Study to Assess Single and Repeat Doses of a New Medication (GSK933776) in Patients With Alzheimer's Disease (www.clinicaltrials.gov/ct2/show/NCT00459550?term=GSK933776&rank=2) |
| AAB-003 (Fc-engineered bapineuzumab) | Amino terminus | Moreth et al. (2013) *Immun. Ageing.* 10: 18-10; Study Evaluating The Safety Of AAB-003 (PF-05236812) In Subjects With Alzheimer's Disease (www.clinicaltrials.gov/ct2/show/NCT01193608?term=aab003&rank=1 |
| SAR228810 (humanized 13C3) | Protofibrils, and low molecular weight amyloid-β | Moreth et al. (2013) *Immun. Ageing.* 10: 18-10; Single and Repeated Dosing Study to Assess the Safety and the Concentration-time Profile of SAR228810 in Alzheimer's Patients (www.clinicaltrials.gov/ct2/show/NCT01485302?term=SAR228810&rank=1) |
| BIIB037/BART (full human IgG1) | Insoluble fibrillar human amyloid-β | Moreth et al. (2013) *Immun. Ageing.* 10: 18-10; Single Ascending Dose Study of BIIB037 in Subjects With Alzheimer's Disease (www.clinicaltrials.gov/ct2/show/NCT01397539?term=BIIB037&rank=2) |

In certain embodiments the nanoscale drug delivery vehicle contains an inhibitory RNA (e.g., miRNA) and/or an aptamer. In certain embodiments the aptamer is a DNA or protein aptamer that binds to a protein selected from the group consisting of beta-amyloid (Aβ), alpha-synuclein (α-syn), tau, APP, and TAR DNA-binding protein 43 (TDP-43), or fragments thereof. In certain embodiments the inhibitory RNA inhibits expression of a protein selected from the group consisting of beta-amyloid (Aβ), alpha-synuclein (α-syn), tau, APP, and TAR DNA-binding protein 43 (TDP-43), or fragments thereof.

The foregoing antibodies, aptamers, and inhibitory RNAs are illustrative and non-limiting. Using the teachings provided herein the DNVs can readily be used to deliver a number of different moieties including, but not limited to antibodies, proteins, nucleic acids, and the like.

Example 13

Transcutaneous Deliver Through the Oral Mucosa

FIG. 31, illustrates the use of DNVs described herein for transcutaneous drug delivery. As illustrated in FIG. 31, panel A, Deformable Nano-scale Vesicles (DNVs) were designed with a lipid external layer with surfactants to be flexible and change morphology to pass between epithelial cells, while carrying the payload within the DNV. After reaching the underlining connective tissue, DNV releases the payload for local treatment. C AF647-20L DNV. Epidermis is composed of the highly keratinized external layer and the proliferating and differentiating keratinocyte layer (FIG. 31, panel B). DNV can pass through the epithelial tight junction and allow drug delivery to dermis. FIG. 31, panel C) shows fluorescently-labeled bisphosphonate drug zoledronate (AF647-20L) formulated in DNV and non-deformable conventional liposome (nDNV). Confocal laser scanning microscopy demonstrated the AF647 signal in DNV and nDNV. Lyophilized AF647-20L DNV powder was resuspended in medical grade saline solution and applied on the mouse calvarial skin (FIG. 31, panel D). We have demonstrated that DNVs can penetrate the keratinized epidermis of mouse skin. Three days after application of AF647-ZOL in DNV, nDNV or aqueous solution, mouse calvarial specimens were harvested and AF647-ZOL fluorescent signal was measured. DNV delivered AF647-20L to the underlining calvarial bone through the cutaneous tissue (FIG. 31, panel E).

FIG. 32 illustrates intra-oral application through trans-oral mucosa drug delivery. This study was designed to assess the efficacy of DNV to penetrate through mouse maxillary oral mucosa and release the AF647-ZOL payload which is then absorbed on the maxillary bone.

Lyophilized AF647-ZOL DNV powder was resuspended in pure water (MQW) or polyethylene glycol (PEG) solution. To anesthetized mice, AF647-ZOL DNV solution was simply dropped over the palatal mucosa tissue and covered by a custom-made mouth guard for 1 hour (FIG. 32, panel A). Three days after AF647-ZOL DNV application, mouse maxillary bones were harvested and AF647-ZOL adhered to palatal bone surface was measured. This study demonstrated that AF647-ZOL in DNV formula resuspended in MQW achieved significant efficacy for trans-oral mucosa drug delivery (see FIG. 32, panel B)

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A deformable nanoscale drug delivery vehicle consisting of:
   a liposome consisting of a lipid bilayer disposed around an aqueous compartment containing a payload wherein:
   i) said lipid bilayer consists of cholesterol, a non-ionic detergent, a first phospholipid, and either N-(2,3-dioleoyloxy-1-propyl), trimethylammonium (DOTAP) or a second phospholipid independently selected from 1,2-Dipalmitoyl-sn-glycero-3-phosphocholine (DPPC), dihexadecyl phosphate (DHP), and 1,2-Dioleoyl-sn-glycero-3-phosphoethanolamine (DOPE);
   ii) the w/w ratio of lipids, including cholesterol, to non-ionic detergent ranges from 85:10 to about 85:20;
   iii) said liposome has an average diameter of less than 200 nm; and
   iv) said liposome, when administered to a mammal is able to deform and pass through the blood brain barrier while retaining a payload; and
   wherein said payload is one or more therapeutic agents selected from a flavonoid, an isoflavonoid, a neoflavonoid, resveratrol, a resveratrol analog, a quinone oxido reductase (NQO2) inhibitor, a bisphosphonate, an antibody, an aptamer, and an miRNA.

2. The nanoscale drug delivery vehicle of claim 1, wherein said one or more therapeutic agents is selected from hesperidin, quercitrin, rutin, tangeritin, luteolin, apigenin, quercetin, kaempferol, myricetin, fisetin, galangin, isorhamnetin, pachypodol, rhamnazin, a pyranoflavonol, a furanoflavonol, hesperetin, Naringenin, Eriodictyol, Homoeriodictyol, Taxifolin, Dihydrokaempferol, progalangin, 2,3',5',6-tetrahydroxy-trans-stilbene, 3,3',4,4'-tetrahydroxy-trans-stilbene, Bapineuzumab, Solanezumab, Gantenerumab, Crenezumab, BAN2401, GSK 933776, AAB-003, SAR228810, and BIIB037/BART.

3. The nanoscale drug delivery vehicle of claim 1, wherein said first phospholipid is 1,2-Dipalmitoyl-sn-glycero-3-phosphocholine (DPPC).

4. The nanoscale drug delivery vehicle of claim 3, wherein the ratio of DPPC to said DOTAP or second phospholipid ranges from 2:1 to 1:2.

5. The nanoscale drug delivery vehicle of claim 3, wherein the ratio of DPPC to said DOTAP or second phospholipid is about 1:1.

6. The nanoscale drug delivery vehicle of claim 1, wherein:
   the ratio of total phospholipids and DOTAP, if present, to cholesterol ranges from about 12:2 to about 5:4 or about 5:3, or from about 10:2 to about 6:2; or
   the ratio of first phospholipid to DOTAP or second phospholipid to cholesterol is about 4:4:2; or
   the ratio of first phospholipid to DOTAP or second phospholipid is about 5:3; or
   the w/w ratio of lipids, including cholesterol, to detergent is about 85:15.

7. The nanoscale drug delivery vehicle of claim 1, wherein said non-ionic detergent comprises a detergent selected from the group consisting of sorbitan monooleate, polysorbate 20, stearyl poly(10)oxy ethylene ether, stearyl poly(20)oxyethylene ether, oleyl poly(10)oxy ethylene ether, and stearyl poly(21)oxyethylene ether.

8. The nanoscale drug delivery vehicle of claim 7, wherein said drug delivery vehicle comprises about 10% to about 20%, or about 15% sorbitan monooleate by weight.

9. The nanoscale drug delivery vehicle of claim 3, wherein said nanoscale drug delivery vehicle is neutral and said second phospholipid is DOPE.

10. The nanoscale drug delivery vehicle of claim 3, wherein said nanoscale drug delivery vehicle is cationic and comprises DOTAP.

11. The nanoscale drug delivery vehicle of claim 3, wherein said nanoscale drug delivery vehicle is anionic and said second phospholipid is DHP.

12. The nanoscale drug delivery vehicle of claim 1, wherein:
   the DNVs are about 50 nm average diameter, or about 100 nm average diameter, or about 150 nm average diameter.

13. A method of delivering a therapeutic agent to the central nervous system of a mammal, said method comprising administering to said subject the nanoscale drug delivery vehicle of claim 1.

14. The method of claim 13, wherein said nanoscale drug delivery vehicle delivers a cargo across the blood-brain barrier.

15. The method of claim 13, wherein said therapeutic agent comprises galangin.

* * * * *